US011918937B1

(12) United States Patent
Abu-Rejailah et al.

(10) Patent No.: US 11,918,937 B1
(45) Date of Patent: Mar. 5, 2024

(54) SMART DEHYSALTER SYSTEM

(71) Applicant: Saudi Arabian Oil Company, Dhahran (SA)

(72) Inventors: Adel Abu-Rejailah, Dammam (SA); Ahmed T. Al-Gazi, Dammam (SA); Thamer K. Al-Harbi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/093,867

(22) Filed: Jan. 6, 2023

(51) Int. Cl.
*B01D 17/04* (2006.01)
*B01D 17/06* (2006.01)
*C10G 33/02* (2006.01)
*C10G 33/06* (2006.01)

(52) U.S. Cl.
CPC ......... *B01D 17/041* (2013.01); *B01D 17/045* (2013.01); *B01D 17/06* (2013.01); *C10G 33/02* (2013.01); *C10G 33/06* (2013.01); *C10G 2300/201* (2013.01)

(58) Field of Classification Search
CPC .... B01D 17/041; B01D 17/045; B01D 17/06; C10G 33/02; C10G 33/06; C10G 2300/201; B03C 11/00; B03C 2201/02
See application file for complete search history.

(56) References Cited

U.S. PATENT DOCUMENTS

| 3,207,686 A | 9/1965 | Jarvis et al. |
| 3,926,774 A * | 12/1975 | Watson ................... H01B 17/30 174/18 |
| 3,966,603 A | 6/1976 | Grant |
| 4,149,958 A | 4/1979 | Martin |
| 4,242,206 A | 12/1980 | Estabrooke |
| 4,581,134 A | 4/1986 | Richter et al. |
| 11,542,443 B2 | 1/2023 | Collins et al. |

(Continued)

FOREIGN PATENT DOCUMENTS

DE 0806233 A1 * 11/1997

OTHER PUBLICATIONS

Mahdi et al., "Characterization and modeling of a crude oil desalting plant by a statistically designed approach," Journal of Petroleum Science and Engineering, 2008, 61:116-123, 8 pages.

(Continued)

*Primary Examiner* — Liam Royce
(74) *Attorney, Agent, or Firm* — Fish & Richardson P.C.

(57) ABSTRACT

A system includes a vessel containing a crude oil inlet for introducing crude oil into the vessel; a fixed super-hydrophobic mesh subsystem comprising a fixed super-hydrophobic mesh; an inductor cup set system comprising at plurality of inductor cups, each of the plurality of inductor cups comprising a primary coil and a secondary coil, the inductor cups to determine an amount of water in the crude oil based on a comparison of the induced voltage between the primary coil and the secondary coil; a movable super-hydrophobic mesh subsystem comprising a super-hydrophobic mesh coupled to at least one stepper motor, the stepper motor to rotate the mesh by a predefined angle based on the comparison of the induced voltage determined by the inductor cups; and a metal grid subsystem comprising a metal grid electrically coupled to a transformer residing outside of the vessel, the metal grid to electrostatically dehydrate the crude oil.

12 Claims, 47 Drawing Sheets

(56) References Cited

U.S. PATENT DOCUMENTS

2009/0267617 A1 10/2009 Seyfi et al.
2010/0326922 A1* 12/2010 Varanasi ............ B01D 17/0211
  210/708

OTHER PUBLICATIONS

Noik et al., "Design of a Crude Oil Dehydration Unit," SPE 77492, SPE Annual Technical Conference and Exhibition, San Antonio, Texas, Sep. 29-Oct. 2, 2002, 9 pages.

Rasouli et al., "Superhydrophobic and superoleophilic membranes for oil-water separation application: A comprehensive review," Materials & Design., Jun. 2021, 204:109599, 29 pages.

Zheng et al., "Capacitance probe for water holdup measurement in crude oil-water flows," Measurement: Sensors; 2020, 10:100028, 6 pages.

* cited by examiner

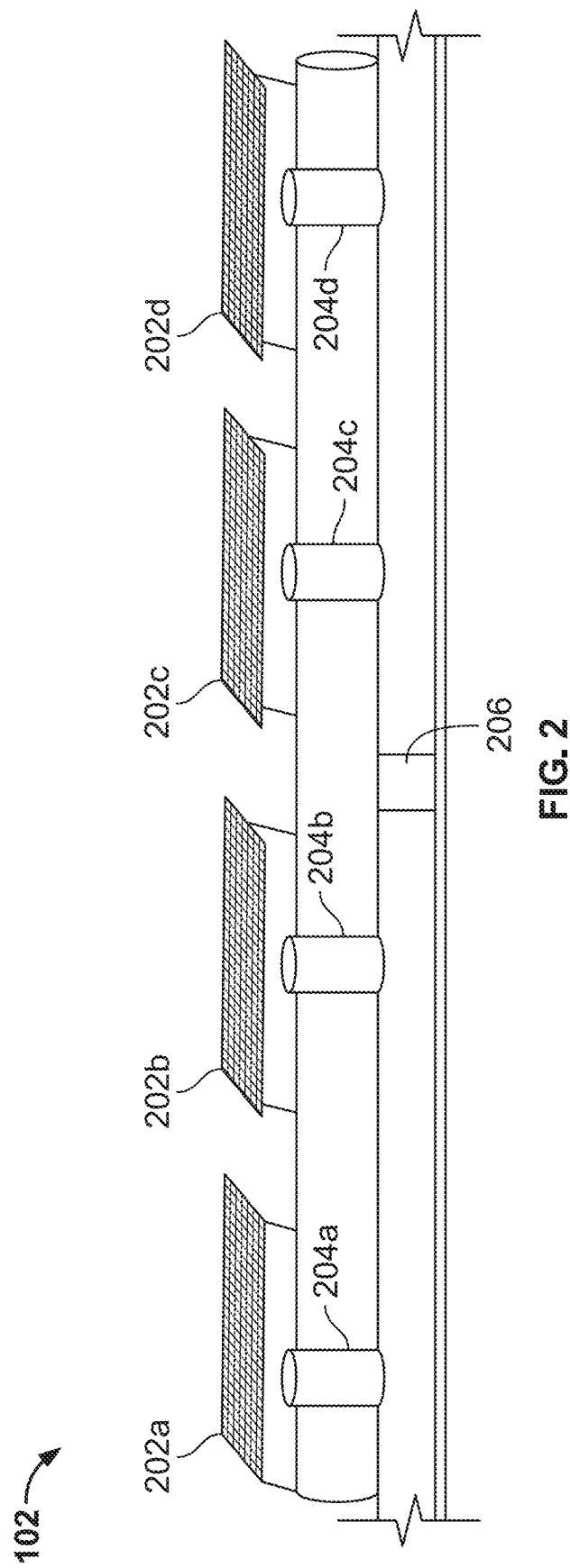

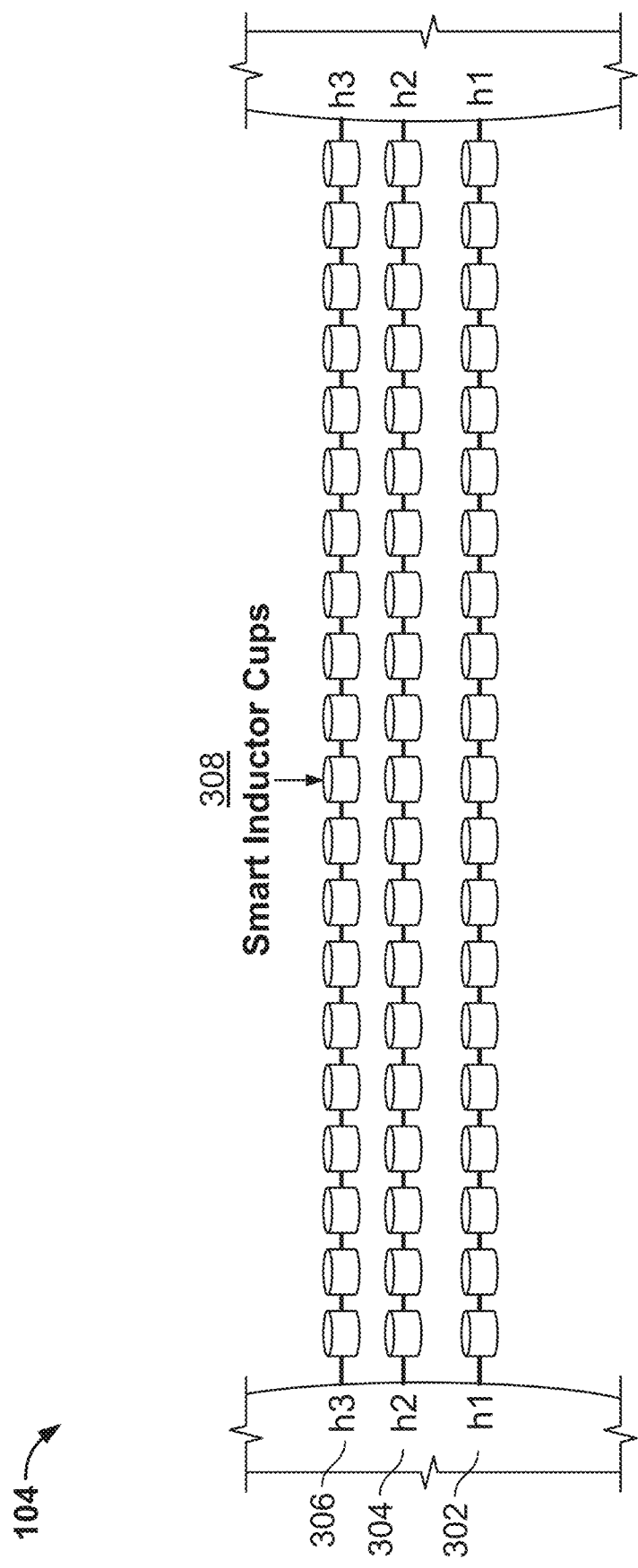

| Grid name | T-01 | T-02 | Responsible Switching Coils and Contacts | | | | | | | |
|---|---|---|---|---|---|---|---|---|---|---|
| | | | Trip Coil#1 | Trip Contact#1 | Trip Coil#2 | Trip Contact#2 | Trip Coil#3 | Trip Contact#3 | Trip Coil#4 | Trip Contact#4 |
| Left Lower Grid | Main | Backup | Through energizing | Through closing | Through energizing | Through closing | | | | |
| Right Lower Grid | Backup | Main | | | Through energizing | Through closing | | | | |
| Left Upper Grid | Backup | Main | | | | | Through energizing | Through closing | | |
| Right Upper Grid | Main | Backup | | | | | Through energizing | Through closing | Through energizing | Through closing |

| No | Contact Symbol | Default Status | Responsible Coil | Default Status | After OFF Mode Selected | Contact Status | Color of Indication Light | Symbol |
|---|---|---|---|---|---|---|---|---|
| 1 | $K_1$ | Normally Closed (NC) | K | De-Energized | The Coil (K) will be same as it is before in the default mode "De-Energized" | $K_1$: Same as it is Closed | Green | G |
| 2 | $K_2$ | Normally opened (NO) | | | | K2: Same as it is Opened | | |
| 3 | $K_3$ | Normally opened (NO) | | | | K3: Same as it is Opened | | |
| 4 | $M_1$ | Normally Closed (NC) | M | De-Energized | The Coil (M) will be same as it is before in the default mode "De-Energized" | $M_1$: Same as it is Closed | | |
| 5 | $M_2$ | Normally opened (NO) | | | | $M_2$: Same as it is Opened | | |
| 6 | $OL_1$ | Normally Closed (NC) | OL | De-Energized | The Coil (OL) will be same as it is before in the default mode "De-Energized" | $OL_1$: Same as it is Closed | | |
| 7 | $OL_2$ | Normally Closed (NC) | | | | $OL_2$: Same as it is Closed | | |
| 8 | $OL_3$ | Normally opened (NO) | | | | $OL_3$: Same as it is Opened | | |
| 9 | $OL_4$ | Normally opened (NO) | | | | $OL_4$: Same as it is Opened | | |
| 10 | $OL_5$ | Normally Closed (NC) | | | | $OL_5$: Same as it is Closed | | |
| 11 | OL-1 | Normally Closed (NC) | | | | OL-1: Same as it is Closed | | |
| 12 | OL-2 | Normally Closed (NC) | | | | OL-2: Same as it is Closed | | |
| 13 | OL-3 | Normally Closed (NC) | | | | OL-3: Same as it is Closed | | |
| 14 | $F_1$ | Normally Closed (NC) | F | De-Energized | The Coil (F) will be same as it is before in the default mode "De-Energized" | $F_1$: Same as it is Closed | | |
| 15 | $F_2$ | Normally Closed (NC) | | | | $F_2$: Same as it is Closed | | |
| 16 | $F_3$ | Normally opened (NO) | | | | $F_3$: Same as it is Opened | | |
| 17 | $F_4$ | Normally opened (NO) | | | | $F_4$: Same as it is Opened | | |
| 18 | $F_5$ | Normally Closed (NC) | | | | $F_5$: Same as it is Closed | | |
| 19 | $D_1$ | Normally opened (NO) | D | De-Energized | The Coil (D) will be same as it is before in the default mode "De-Energized" | $D_1$: Same as it is Opened | | |
| 20 | $D_2$ | Normally Closed (NC) | | | | $D_2$: Same as it is Closed | | |
| 21 | R | Normally Closed (NC) | R | De-Energized | The Coil (R) will be same as it is before in the default mode "De-Energized" | R: Same as its is Closed | | |

FIG. 17

| No | Contact symbol | Default Status | Responsible Coil | Default Status | After Start Mode Selected | Contact Status | Color of Indication Light | Symbol |
|---|---|---|---|---|---|---|---|---|
| 1 | $K_1$ | Normally Closed (NC) | K | De-Energized | The Coil (K) will be Energized and all its contacts status will be changed | $K_1$: Opened | Red | R |
| 2 | $K_2$ | Normally opened (NO) | | | | $K_2$: Closed | | |
| 3 | $K_3$ | Normally opened (NO) | | | | $K_3$: Closed | | |
| 4 | $M_1$ | Normally Closed (NC) | M | De-Energized | The Coil (M) will be Energized and all its contacts status will be changed | $M_1$: Opened | | |
| 5 | $M_2$ | Normally opened (NO) | | | | $M_2$: Closed | | |
| 6 | $OL_1$ | Normally Closed (NC) | OL | De-Energized | The Coil (OL) will be same as it is before in the default mode "De-Energized" | $OL_1$: Same as it is Closed | | |
| 7 | $OL_2$ | Normally Closed (NC) | | | | $OL_2$: Same as it is Closed | | |
| 8 | $OL_3$ | Normally opened (NO) | | | | $OL_3$: Same as it is Opened | | |
| 9 | $OL_4$ | Normally opened (NO) | | | | $OL_4$: Same as it is Opened | | |
| 10 | $OL_5$ | Normally Closed (NC) | | | | $OL_5$: Same as it is Closed | | |
| 11 | OL-1 | Normally Closed (NC) | | | | OL-1: Same as it is Closed | | |
| 12 | OL-2 | Normally Closed (NC) | | | | OL-2: Same as it is Closed | | |
| 13 | OL-3 | Normally Closed (NC) | | | | OL-3: Same as it is Closed | | |
| 14 | $F_1$ | Normally Closed (NC) | F | De-Energized | The Coil (F) will be same as it is before in the default mode "De-Energized" | $F_1$: Same as it is Closed | | |
| 15 | $F_2$ | Normally Closed (NC) | | | | $F_2$: Same as it is Closed | | |
| 16 | $F_3$ | Normally opened (NO) | | | | $F_3$: Same as it is Opened | | |
| 17 | $F_4$ | Normally opened (NO) | | | | $F_4$: Same as it is Opened | | |
| 18 | $F_5$ | Normally Closed (NC) | | | | $F_5$: Same as it is Closed | | |
| 19 | $D_1$ | Normally opened (NO) | D | De-Energized | The Coil (D) will be Energized and its contacts status will be changed | $D_1$: Closed | | |
| 20 | $D_2$ | Normally Closed (NC) | | | | $D_2$: Closed | | |
| 21 | R | Normally Closed (NC) | R | De-Energized | The Coil (R) will be same as it is before in the default mode "De-Energized" | R: Same as its is Closed | | |

| No | Contact Symbol | Default Status | Responsible Coil | Default Status | After Stop Mode Selected | Contact Status | Color of Indication Light | Symbol |
|---|---|---|---|---|---|---|---|---|
| 1 | K₁ | Normally Closed (NC) | K | De-Energized | The Coil (K) will be same as it is before in the default mode "De-Energized" | K₁: Same as it is Closed | | |
| 2 | K₂ | Normally opened (NO) | | | | K2: Same as it is Opened | | |
| 3 | K₃ | Normally opened (NO) | | | | K3: Same as it is Opened | | |
| 4 | M₁ | Normally Closed (NC) | M | De-Energized | The Coil (M) will be same as it is before in the default mode "De-Energized" | M₁: Same as it is Closed | | |
| 5 | M₂ | Normally opened (NO) | | | | M₂: Same as it is Opened | | |
| 6 | OL₁ | Normally Closed (NC) | OL | De-Energized | The Coil (OL) will be same as it is before in the default mode "De-Energized" | OL₁: Same as it is Closed | | |
| 7 | OL₂ | Normally Closed (NC) | | | | OL₂: Same as it is Closed | | |
| 8 | OL₃ | Normally opened (NO) | | | | OL₃: Same as it is Opened | | |
| 9 | OL₄ | Normally opened (NO) | | | | OL₄: Same as it is Opened | | |
| 10 | OL₅ | Normally opened (NO) | | | | OL₅: Same as it is Opened | | |
| 11 | OL-1 | Normally Closed (NC) | | | | OL-1: Same as it is Closed | | |
| 12 | OL-2 | Normally Closed (NC) | | | | OL-2: Same as it is Closed | | |
| 13 | OL-3 | Normally Closed (NC) | | | | OL-3: Same as it is Closed | | |
| 14 | F₁ | Normally Closed (NC) | F | De-Energized | The Coil (F) will be same as it is before in the default mode "De-Energized" | F₁: Same as it is Closed | | |
| 15 | F₂ | Normally Closed (NC) | | | | F₂: Same as it is Closed | | |
| 16 | F₃ | Normally opened (NO) | | | | F₃: Same as it is Opened | | |
| 17 | F₄ | Normally opened (NO) | | | | F₄: Same as it is Opened | | |
| 18 | F₅ | Normally Closed (NC) | | | | F₅: Same as it is Closed | | |
| 19 | D₁ | Normally opened (NO) | D | De-Energized | The Coil (D) will be same as it is before in the default mode "De-Energized" | D₁: Same as it is Opened | | |
| 20 | D₂ | Normally Closed (NC) | | | | D2: Same as it is Closed | | |
| 21 | R | Normally Closed (NC) | R | De-Energized | The Coil (R) will be Energized and its contact status will be changed | R: Opened | Green | G |

FIG. 21

| No | Contact Symbol | Default Status | Responsible Coil | Default Status | During Overload Trip | Contact Status | Color of Indication Light | Symbol |
|---|---|---|---|---|---|---|---|---|
| 1 | $K_1$ | Normally Closed (NC) | K | De-Energized | The Coil (K) will be same as it is before in the default mode "De-Energized" | $K_1$: Same as it is Closed | | |
| 2 | $K_2$ | Normally opened (NO) | | | | K2: Same as it is Opened | | |
| 3 | $K_3$ | Normally opened (NO) | | | | K3: Same as it is Opened | | |
| 4 | $M_1$ | Normally Closed (NC) | M | De-Energized | The Coil (M) will be same as it is before in the default mode "De-Energized" | $M_1$: Same as it is Closed | | |
| 5 | $M_2$ | Normally opened (NO) | | | | $M_2$: Same as it is Opened | | |
| 6 | $OL_1$ | Normally Closed (NC) | OL | De-Energized | The Coil (OL) will be Energized and its contacts status will be changed | $O_{L1}$: Opened | Yellow | Y |
| 7 | $OL_2$ | Normally Closed (NC) | | | | $O_{L2}$: Opened | | |
| 8 | $OL_3$ | Normally opened (NO) | | | | $O_{L3}$: Closed | | |
| 9 | $OL_4$ | Normally opened (NO) | | | | $O_{L4}$: Closed | | |
| 10 | $OL_5$ | Normally Closed (NC) | | | | $O_{L5}$: Opened | | |
| 11 | OL-1 | Normally Closed (NC) | | | | OL-1: Opened | | |
| 12 | OL-2 | Normally Closed (NC) | | | | OL-2: Opened | | |
| 13 | OL-3 | Normally Closed (NC) | | | | OL-3: Opened | | |
| 14 | $F_1$ | Normally Closed (NC) | F | De-Energized | The Coil (F) will be same as it is before in the default mode "De-Energized" | $F_1$: Same as it is Closed | | |
| 15 | $F_2$ | Normally Closed (NC) | | | | $F_2$: Same as it is Closed | | |
| 16 | $F_3$ | Normally opened (NO) | | | | $F_3$: Same as it is Opened | | |
| 17 | $F_4$ | Normally opened (NO) | | | | $F_4$: Same as it is Opened | | |
| 18 | $F_5$ | Normally Closed (NC) | | | | $F_5$: Same as it is Closed | | |
| 19 | $D_1$ | Normally opened (NO) | D | De-Energized | The Coil (D) will be same as it is before in the default mode "De-Energized" | $D_1$: Same as it is Opened | | |
| 20 | $D_2$ | Normally Closed (NC) | | | | D2: Same as it is Closed | | |
| 21 | R | Normally Closed (NC) | R | De-Energized | The Coil (R) will be same as it is before in the default mode "De-Energized" | R:Same as it is Closed | | |

FIG. 23

| No | Contact Symbol | Default Status | Responsible Coil | Default Status | During Phase/ Ground Fault | Contact Status | Color of Indication Light | Symbol |
|---|---|---|---|---|---|---|---|---|
| 1 | $K_1$ | Normally Closed (NC) | K | De-Energized | The Coil (K) will be same as it is before in the default mode "De-Energized" | $K_1$: Same as it is Closed | | |
| 2 | $K_2$ | Normally opened (NO) | | | | K2: Same as it is Opened | | |
| 3 | $K_3$ | Normally opened (NO) | | | | K3: Same as it is Opened | | |
| 4 | $M_1$ | Normally Closed (NC) | M | De-Energized | The Coil (M) will be same as it is before in the default mode "De-Energized" | $M_1$: Same as it is Closed | | |
| 5 | $M_2$ | Normally opened (NO) | | | | $M_2$: Same as it is Opened | | |
| 6 | $OL_1$ | Normally Closed (NC) | OL | De-Energized | The Coil (OL) will be same as it is before in the default mode "De-Energized" | $OL_1$: Same as it is Closed | Yellow | Y |
| 7 | $OL_2$ | Normally Closed (NC) | | | | $OL_2$: Same as it is Closed | | |
| 8 | $OL_3$ | Normally opened (NO) | | | | $OL_3$: Same as it is Opened | | |
| 9 | $OL_4$ | Normally opened (NO) | | | | $OL_4$: Same as it is Opened | | |
| 10 | $OL_5$ | Normally Closed (NC) | | | | $OL_5$: Same as it is Opened | | |
| 11 | OL-1 | Normally Closed (NC) | | | | OL-1: Same as it is Closed | | |
| 12 | OL-2 | Normally Closed (NC) | | | | OL-2: Same as it is Closed | | |
| 13 | OL-3 | Normally Closed (NC) | | | | OL-3: Same as it is Closed | | |
| 14 | $F_1$ | Normally Closed (NC) | F | De-Energized | The Coil (F) will be Energized and its contacts status will be changed | $F_1$: Opened | | |
| 15 | $F_2$ | Normally Closed (NC) | | | | $F_2$: Opened | | |
| 16 | $F_3$ | Normally opened (NO) | | | | $F_3$: Closed | | |
| 17 | $F_4$ | Normally opened (NO) | | | | $F_4$: Closed | | |
| 18 | $F_5$ | Normally Closed (NC) | | | | $F_5$: Opened | | |
| 19 | $D_1$ | Normally opened (NO) | D | De-Energized | The Coil (D) will be same as it is before in the default mode "De-Energized" | $D_1$: Same as it is Opened | | |
| 20 | $D_2$ | Normally Closed (NC) | | | | D2: Same as it is Closed | | |
| 21 | R | Normally Closed (NC) | R | De-Energized | The Coil (R) will be same as it is before in the default mode "De-Energized" | R: Same as it is Closed | | |

| No | Contact Symbol | Default Status | Responsible Coil | Default Status | After the fault cleared/ During Restart mode | Contact Status | Color of Indication Light | Symbol |
|---|---|---|---|---|---|---|---|---|
| 1 | $K_1$ | Normally Closed (NC) | K | De-Energized | The Coil (K) will be Energized and its contacts status will be changed | $K_1$: Opened | | |
| 2 | $K_2$ | Normally opened (NO) | | | | $K_2$: Closed | | |
| 3 | $K_3$ | Normally opened (NO) | | | | $K_3$: Closed | | |
| 4 | $M_1$ | Normally Closed (NC) | M | De-Energized | The Coil (M) will be Energized and its contacts status will be changed | $M_1$: Opened | | |
| 5 | $M_2$ | Normally opened (NO) | | | | $M_2$: Closed | | |
| 6 | $OL_1$ | Normally Closed (NC) | OL | De-Energized | The Coil (OL) will be same as it is before in the default mode "De-Energized" | $OL_1$: Same as it is Closed | Red | R |
| 7 | $OL_2$ | Normally Closed (NC) | | | | $OL_2$: Same as it is Closed | | |
| 8 | $OL_3$ | Normally Closed (NC) | | | | $OL_3$: Same as it is Opened | | |
| 9 | $OL_4$ | Normally opened (NO) | | | | $OL_4$: Same as it is Opened | | |
| 10 | $OL_5$ | Normally Closed (NC) | | | | $OL_5$: Same as it is Opened | | |
| 11 | $OL-1$ | Normally Closed (NC) | | | | $OL-1$: Same as it is Closed | | |
| 12 | $OL-2$ | Normally Closed (NC) | | | | $OL-2$: Same as it is Closed | | |
| 13 | $OL-3$ | Normally Closed (NC) | | | | $OL-3$: Same as it is Closed | | |
| 14 | $F_1$ | Normally Closed (NC) | F | De-Energized | The Coil (F) will be same as it is before in the default mode "De-Energized" | $F_1$: Same as it is Closed | | |
| 15 | $F_2$ | Normally Closed (NC) | | | | $F_2$: Same as it is Closed | | |
| 16 | $F_3$ | Normally opened (NO) | | | | $F_3$: Same as it is Opened | | |
| 17 | $F_4$ | Normally opened (NO) | | | | $F_4$: Same as it is Opened | | |
| 18 | $F_5$ | Normally Closed (NC) | | | | $F_5$: Same as it is Closed | | |
| 19 | $D_1$ | Normally opened (NO) | D | De-Energized | The Coil (D) will be Energized and its contacts status will be changed | $D_1$: Closed | | |
| 20 | $D_2$ | Normally Closed (NC) | | | | $D_2$: Opened | | |
| 21 | R | Normally Closed (NC) | R | De-Energized | The Coil (R) will be same as it is before in the default mode "De-Energized" | R: Same as it is Closed | | |

FIG. 27

| Time (Second) | VS (Volt) | VT (Volt) | Valve#1 | Valve#2 | Valve#3 | Valve#4 | Valve#5 | Valve#6 |
|---|---|---|---|---|---|---|---|---|
| 0 | 120 | 0 | Closed | Closed | Closed | Closed | Closed | Closed |
| 5 | 120 | VT1 | Opened | Closed ||| Pm Exceed P0 | Closed | Closed | Opened | Opened |
| 10 | 120 | VT2 | Opened | Closed ||| Pm Exceed P0 | Closed | Closed | Opened | Opened |
| 15 | 120 | VT3 | Opened | Closed ||| Pm Exceed P0 | Closed | Closed | Opened | Opened |
| 20 | 120 | VT4 | Opened | Closed ||| Pm Exceed P0 | Closed | Closed | Opened | Opened |
| 25 | 120 | VT5 | Opened | Closed ||| Pm Exceed P0 | Closed | Closed | Opened | Opened |
| 30 | 120 | VT6 | Opened | Closed ||| Pm Exceed P0 | Closed | Closed | Opened | Opened |
| 35 | 120 | VT7 | Opened | Closed ||| Pm Exceed P0 | Closed | Closed | Opened | Opened |
| 40 | 120 | VT8 | Opened | Closed ||| Pm Exceed P0 | Closed | Closed | Opened | Opened |
| 45 | 120 | VT9 | Opened | Closed ||| Pm Exceed P0 | Closed | Closed | Opened | Opened |
| 50 | 120 | VT10 | Opened | Closed ||| Pm Exceed P0 | Closed | Closed | Opened | Opened |
| 55 | 120 | VT11 | Opened | Closed ||| Pm Exceed P0 | Closed | Closed | Opened | Opened |
| 60 | 120 | VT12 | Opened | Closed ||| Pm Exceed P0 | Closed | Closed | Opened | Opened |
| After One Minute | 0 | 0 | Closed | Closed | Opened | Opened | Closed | Closed |

FIG. 30

| Symbol | Meaning | Output Value | |
|---|---|---|---|
| | | 0 | 1 |
| PLC | Programmable Logic Control | It will Not Change the Status of the Contact. It will Keep the Status in the Default Mode. | It will Change the Status of the Contact from Closed to Opened or from Opened to Closed |

| NO | Symbol | Refence Value |
|---|---|---|
| 1 | VN1,2,3&4 | The Normal Voltage (VN) should be = the Secondary Voltage pf the Transformer The Accepted Voltage Drops Start from 1% to 5%a Beyond this Range, it Considers an Overload Trip |
| 2 | IN1,2,3&4 | The Normal Current (IN) should be = 0-1 A if the Oil is Very Pure but in the Normal Case the Oil Coming Always Mix with Saltwater and Other Impurities. These Impurities Increase the Current Value and Setting Current Value could be 10A to 15A, it Depends on the Proponent Setting. |

| | Vm1 | Vm2 | Im1 | Im2 | Mot1 | Mot2 | Contact Trip1 | Contact Trip2 |
|---|---|---|---|---|---|---|---|---|
| Left Lower Grid | 0.95Vn1<Vm1 ≤0.975Vn1 | | Im1=In1 | | Start Rotation from 0 to 90 Degree and Stop when Vm1 > 0.975Vn1 | Start Rotation from 0 to 90 Degree and Stop when Vm1 > 0.975Vn1 | | |
| Left Lower Grid | Vm1 <0.95Vn1 | | Im1=In1 | | Start Rotation from 0 to 90 Degree and Stop when Vm1 > 0.975Vn1 | Start Rotation from 0 to 90 Degree and Stop when Vm1 > 0.975Vn1 | | The Contact Trip2 will be Closed and the Grid will be Fed by T-02 though Trip2 Coil |
| Left Lower Grid | Vm1=Vn1 | | In1x1.02≤Im1 ≤In1x1.05 | | Start Rotation from 0 to 90 Degree and Stop when Im1 <In1x1.02 | Start Rotation from 0 to 90 Degree and Stop when Im1 <In1x1.02 | | |
| Left Lower Grid | Vm1=Vn1 | | Im1>In1x1.05 | | Start Rotation from 0 to 90 Degree and Stop when Im1 <In1x1.02 | Start Rotation from 0 to 90 Degree and Stop when Im1 <In1x1.02 | | The Contact Trip2 will be Closed and the Grid will be Fed by T-02 though Trip2 Coil |
| Right Lower Grid | | 0.95Vn2<Vm2 ≤0.975Vn2 | | Im2=In2 | Start Rotation from 0 to 90 Degree and Stop when Vm2 > 0.975Vn2 | Start Rotation from 0 to 90 Degree and Stop when Vm2 > 0.975Vn2 | | |
| Right Lower Grid | | Vm2 <0.95Vn2 | | Im2=In2 | Start Rotation from 0 to 90 Degree and Stop when Vm2 > 0.975Vn2 | Start Rotation from 0 to 90 Degree and Stop when Vm2 > 0.975Vn2 | | |
| Right Lower Grid | | Vm2=Vn2 | | In2x1.02≤Im2 ≤In2x1.05 | Start Rotation from 0 to 90 Degree and Stop when Im2 <In2x1.02 | Start Rotation from 0 to 90 Degree and Stop when Im2 <In2x1.02 | The Contact Trip1 will be Closed and the Grid will be Fed by T-01 though Trip1 Coil | |
| Right Lower Grid | | Vm2=Vn2 | | Im2>In2x1.05 | Start Rotation from 0 to 90 Degree and Stop when Im2 <In2x1.02 | Start Rotation from 0 to 90 Degree and Stop when Im2 <In2x1.02 | The Contact Trip1 will be Closed and the Grid will be Fed by T-01 though Trip1 Coil | |

| | Vm3 | Vm4 | Im3 | Im4 | Mot1 | Mot2 | Contact Trip3 | Contact Trip4 |
|---|---|---|---|---|---|---|---|---|
| Left Lower Grid | 0.95Vn3<Vm3 ≤0.975Vn3 | | Im3=In3 | | Start Rotation from 0 to 90 Degree and Stop when Vm3 > 0.975Vn3 | Start Rotation from 0 to 90 Degree and Stop when Vm3 > 0.975Vn3 | | |
| Left Lower Grid | Vm3 <0.95Vn3 | | Im3=In3 | | Start Rotation from 0 to 90 Degree and Stop when Vm3 > 0.975Vn3 | Start Rotation from 0 to 90 Degree and Stop when Vm3 > 0.975Vn3 | | The Contact Trip4 will be Closed and the Grid will be Fed by T-02 though Trip4 Coil |
| Left Lower Grid | Vm3=Vn3 | | In3x1.02≤Im3 ≤In3x1.05 | | Start Rotation from 0 to 90 Degree and Stop when Im3<In3x1.02 | Start Rotation from 0 to 90 Degree and Stop when Im3<In3x1.02 | | |
| Left Lower Grid | Vm3=Vn3 | | Im3>In3x1.05 | | Start Rotation from 0 to 90 Degree and Stop when Im3<In3x1.02 | Start Rotation from 0 to 90 Degree and Stop when Im3<In3x1.02 | | The Contact Trip4 will be Closed and the Grid will be Fed by T-02 though Trip4 Coil |
| Right Lower Grid | | 0.95Vn4<Vm4 ≤0.975Vn4 | | Im4=In4 | Start Rotation from 0 to 90 Degree and Stop when Vm4 > 0.975Vn4 | Start Rotation from 0 to 90 Degree and Stop when Vm4 > 0.975Vn4 | | |
| Right Lower Grid | | Vm4 <0.95Vn4 | | Im4=In4 | Start Rotation from 0 to 90 Degree and Stop when Vm4 > 0.975Vn4 | Start Rotation from 0 to 90 Degree and Stop when Vm4 > 0.975Vn4 | | |
| Right Lower Grid | | Vm4=Vn4 | | In4x1.02≤Im4 ≤In4x1.05 | Start Rotation from 0 to 90 Degree and Stop when Im4<In4x1.02 | Start Rotation from 0 to 90 Degree and Stop when Im4<In4x1.02 | The Contact Trip3 will be Closed and the Grid will be Fed by T-01 though Trip3 Coil | |
| Right Lower Grid | | Vm4=Vn4 | | Im4>In4x1.05 | Start Rotation from 0 to 90 Degree and Stop when Im4<In4x1.02 | Start Rotation from 0 to 90 Degree and Stop when Im4<In4x1.02 | The Contact Trip3 will be Closed and the Grid will be Fed by T-01 though Trip3 Coil | |

FIG. 33B

| $V_{average}$ | Mot1 | Mot2 | Wash Water Valve (WW) | Motor Pump | Water Valve (LCV1) | Water Valve (LCV2) | Water Valve (LCV3) | Water Valve (LCV4) |
|---|---|---|---|---|---|---|---|---|
| $V_{average} \geq 0$ ON Spec | It will Not Take Action | It will Not Take Action | Closed | It will Not Take Action | 0-50 | 0-50 Spare (Closed) | 50-100 | 50-100 Spare (Closed) |
| $V_{average} < 0$ OFF Spec | Start Rotation from 0 to 90 Degree and Stop when $V_{average} \geq 0$ | Start Rotation from 0 to 90 Degree and Stop when $V_{average} \geq 0$ | Opened | Start Pumping the Water | 0-50 | 0-50 Spare (Opened) | 50-100 | 50-100 Spare (Opened) |

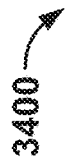

| Transformers Status 4002 | | |
|---|---|---|
| T-01: ON Mode ▨ | OFF Mode ▨ | Trip Mode ▨ |
| T-02: ON Mode ▨ | OFF Mode ▨ | Trip Mode ▨ |

| Smart Inductors Cups Status 4004 | System Alarms 4006 |
|---|---|
| Voltage of 1st Layer of Inductor Cups: -0.03 V | No Alarm Recording |
| Voltage of 2nd Layer of Inductor Cups: -0.02 V | |
| Voltage of 3rd Layer of Inductor Cups: -0.01 V | |
| Average Voltage Of Inductor Cups: -0.02 V | On Spec ▨   OFF Spec ▨ |

Upper Mesh & Auto Salt Analyzer Status 4008

Stepper Motor (Mot1): ON Mode ▨   OFF Mode ▨   Trip Mode ▨
Stepper Motor (Mot2): ON Mode ▨   OFF Mode ▨   Trip Mode ▨
Auto Salt Analyze Test: ON Spec ▨   OFF Spec ▨   VS=120V AC
Upper Mesh Angle: 45°                           VT=-0.02V AC at 1 Minute

| Lower Grids Status 4010 | | Upper Grids Status 4012 | |
|---|---|---|---|
| Vm1=23KV AC | Vm2=23KV AC | Vm3=23KV DC | Vm4=23KV DC |
| Left | Right | Left | Right |
| Im1=4A AC | Im2=4A AC | Im3=4A DC | Im4=4A DC |

| Grids Transformers Connections Status 4014 | | | |
|---|---|---|---|
| Left Lower Grid | Right Lower Grid | Left Upper Grid | Right Upper Grid |
| T=01 ▨ | T=01 ▨ | T=01 ▨ | T=01 ▨ |
| T=02 ▨ | T=02 ▨ | T=02 ▨ | T=02 ▨ |

FIG. 40

SMART DEHYSALTER SYSTEM

TECHNICAL FIELD

The present disclosure applies to a smart dehydrator and desalter (dehysalter) system.

BACKGROUND

Salts can be present in crude oil and can cause corrosion in piping and machinery used in oil refining processes. Desalting of a crude oil feedstock is therefore one of the initial steps performed during an oil refining process. A desalter is a process unit in an oil refinery that removes salt from the crude oil. A dehydrator is used to remove water contained within the crude oil to provide a dehydrated crude oil. The dehydrator can also be used as part of the desalter process.

Removing the residual water from the crude oil can remove salts and other water-soluble impurities from the crude oil. To remove the residual salt water from the crude oil, fresh water can be combined with crude oil to create an oil/water mixture, which can then be pumped into a pressure vessel of the desalter/dehydrator system. The fresh water is mixed with crude oil to ensure that there is enough water dispersion to dissolve all of the salts and other impurities.

SUMMARY

The present disclosure describes techniques that can be used for desalting and dehydrating processes for removing impurities from crude oil prior to refinement.

In some implementations, a computer-implemented method includes the following.

Aspects of the embodiments are directed to a system for dehydrating and desalting oil that includes a vessel containing a crude oil inlet for introducing crude oil into an interior space of the vessel; a fixed super-hydrophobic mesh subsystem including at least one fixed, unmovable super-hydrophobic mesh, the fixed super-hydrophobic mesh subsystem residing within the interior space of the vessel; an inductor cup set system secured above the fixed super-hydrophobic mesh subsystem, the inductor cup set including at plurality of inductor cups, each of the plurality of inductor cups including a primary coil and a secondary coil, the inductor cups to determine an amount of water in the crude oil based on a comparison of the induced voltage between the primary coil and the secondary coil; a movable super-hydrophobic mesh subsystem including a super-hydrophobic mesh coupled to at least one stepper motor, the stepper motor to rotate the mesh by a predefined angle of rotation based on the comparison of the induced voltage determined by the inductor cups, the movable super-hydrophobic mesh subsystem residing above the inductor cup set within the interior of the vessel; and a metal grid subsystem above the movable super-hydrophobic mesh subsystem within the interior of the vessel, the metal grid subsystem including at least one metal grid electrically coupled to a transformer residing outside of the vessel, the electrified grid to electrostatically dehydrate the crude oil. Aspects of the embodiments are also directed to individual components described herein, including but not limited to smart inductor cups, automatic salt-in-crude analysis system, electrical grid system, movable mesh system and static mesh system.

In some embodiments, the fixed super-hydrophobic mesh subsystem includes a plurality of fixed, unmovable super-hydrophobic meshes.

In some embodiments, the fixed, unmovable super-hydrophobic mesh includes super-hydrophobic mesh.

In some embodiments, the inductor cup set subsystem includes three parallel sets of inductor cups separated from each other by a fixed distance.

In some embodiments, the movable super-hydrophobic mesh subsystem maintains a rotational angle of the mesh when the induced voltage at the primary coil matches the induced voltage at the secondary coil.

In some embodiments, the movable super-hydrophobic mesh subsystem rotates the mesh when the comparison between the induced voltage at the primary coil and the secondary coil results in a different induced voltage between the primary coil and the secondary coil.

In some embodiments, the metal grid subsystem includes a left lower grid; a right lower grid; a left upper grid; and a right upper grid.

In some embodiments, the left lower grid and the right lower grid are biased using an alternating current.

In some embodiments, the left upper grid and the right upper grid are biased using a direct current.

In some embodiments, the metal grid subsystem includes a first rectifier circuit coupled to the left upper grid and a second rectified circuit coupled to the right upper grid.

In some embodiments, the transformer is a first transformer, and the right upper grid and the left lower grid are electrically connected to the first transformer.

In some embodiments, the right lower grid and the left upper grid are electrically connected to a second transformer, different from the first transformer.

In some embodiments, the vessel includes a first interior chamber to house the fixed super-hydrophobic mesh subsystem, the inductor cup set system, the movable super-hydrophobic mesh, and the metal grid subsystem, the vessel including a second interior chamber in fluid isolation from the first interior chamber, wherein the metal grid is coupled to a first electrode in the first interior chamber; the first electrode is coupled to a second electrode residing within the second interior chamber, the second electrode isolated from fluids in the first interior chamber; the first electrode coupled to a power cable through an exterior wall of the vessel, the power cable connected to the transformer and to supply electricity to the metal grid.

Aspects of the embodiments are directed to a method that includes directing crude oil into an interior chamber of a vessel of a dehydrator and desalter system; performing a first liquid phase separation of water from the crude oil using a fixed super-hydrophobic mesh subsystem that includes at least one fixed super-hydrophobic mesh; determining a residual water content in the crude oil using one or more inductor cup sets; determining, based on the residual water content in the crude oil from the one or more inductor cup sets, whether to rotate a movable super-hydrophobic mesh for a second liquid phase separation process; performing the second liquid phase separation of water from the crude oil using the movable super-hydrophobic mesh; performing a first electrostatic dehydration process on the crude oil using a first set of electrified metal grids; performing a second electrostatic dehydration process on the crude oil using a second set of electrified metal grids; and causing the crude oil to exit the vessel.

Some embodiments can include testing the crude oil for salt content using an auto salt analyzer circuit.

Some embodiments can include adding water wash to the crude oil if the salt content in the crude oil is above a threshold amount.

In some embodiments, the first set of electrified metal grids is biased using an alternating current.

In some embodiments, the second set of electrified metal grids is biased using a direct current.

Some embodiments can include rotating the movable super-hydrophobic mesh by a predetermined angle of rotation based on an induced voltage mismatch between a primary inductor coil and a secondary inductor coil for at least one set of inductor cups.

In some embodiments, the first set of electrified metal grids is biased using an alternating current; and the second set of electrified metal grids is biased using a direct current.

The described implementation is implementable using a computer-implemented method; a non-transitory, computer-readable medium storing computer-readable instructions to perform the computer-implemented method; and a computer-implemented system including a computer memory interoperable coupled with a hardware processor configured to perform the computer-implemented method/the instructions stored on the non-transitory, computer-readable medium.

The subject matter described in this specification can be implemented in particular implementations, so as to realize one or more of the following advantages. Aspects of the embodiments can mitigate transformer failures for dehydration and desalting processing. It will also potentially save processing time of oil by 20 min per Gas-Oil separation plant (GOSP) and optimize running times for plants partial, minimizing total outages. Failure statistics indicate that entry bushings are the major contributor in transformers failures followed by the configuration of the grids and float switch assembly. This disclosure describes a design of dehydrator vessel internals to provide additional features. Such features can include two transformers installed on the sides of the vessel instead of the top of the vessel to dispense with the entry bushing. The electrodes and transformer cable conductors can be connected in the safe area (with a larger gap) on the side of the vessel to ensure this conductor will not touch water, which is one of the crude oil contents. The dehysalter system described herein includes a fixed super-hydrophobic ["hydrophobic mesh" was replaced with "super-hydrophobic mesh"] mesh and a movable super-hydrophobic mesh, both of which are used as filters that allow the oil to pass through the mesh while preventing the water and salt to pass. The dehysalter system described herein has three layers of smart inductor cups that are used to measure the emulsion in the oil content through the voltage drop across theses cups. Also, the dehysalter system described herein uses a connection between the transformer and grids (cross connection) to increase the reliability of the grids. In case one of the two transformers is lost, the other transformer will provide the power to the grid. In addition, if one grid is lost, the dehysalter does not lose a complete side of the new dehydrator. Both sides of the dehydrator system have an energized grid to do the separation. The dehysalter system described herein has a smart auto salt analyzer that measures the salt amount in the crude oil to ensure that the crude oil output is high quality to protect the electrical grids from large amount of water in the oil. Aspects of the present disclosure can reduce operation time by removing manual sampling and can result in higher accuracy readings.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

BRIEF DESCRIPTION OF THE DRAWINGS

FIG. 2 is a schematic diagram of an example fixed super-hydrophobic mesh system of the dehysalter system in accordance with embodiments of the present disclosure.

FIG. 3A is a schematic diagram of an example three-stage inductor cup system of the dehysalter system in accordance with embodiments of the present disclosure.

FIG. 15 is a diagram mapping grid and power transformer connections in accordance with embodiments of the present disclosure.

FIG. 17 is a diagram mapping the control circuit in an OFF condition in accordance with embodiments of the present disclosure.

FIG. 19 is a diagram mapping the control circuit in a START mode condition in accordance with embodiments of the present disclosure.

FIG. 21 is a diagram mapping the control circuit in a STOP mode condition in accordance with embodiments of the present disclosure.

FIG. 23 is a diagram mapping the control circuit in an OVERLOAD condition in accordance with embodiments of the present disclosure.

FIG. 25 is a diagram mapping the control circuit in a FAULT/SHORT CIRCUIT condition in accordance with embodiments of the present disclosure.

FIG. 27 is a diagram mapping the control circuit in after a FAULT/SHORT CIRCUIT condition is cleared in accordance with embodiments of the present disclosure.

FIG. 30 is a diagram mapping the relationship between salt in crude readings and water discharge values in accordance with embodiments of the present disclosure.

FIG. 31 is a table describing the values of the programmable logic controller during operations in accordance with embodiments of the present disclosure.

FIG. 32 is a table describing accepted values of voltages and currents for electrostatic grids in accordance with embodiments of the present disclosure.

FIGS. 33A-33B are diagrams mapping the relationship between the grids and the stepper motors in accordance with embodiments of the present disclosure.

FIG. 34 is a diagram mapping the relationship between the stepper motors and the smart inductor cups in accordance with embodiments of the present disclosure.

FIG. 40 is a schematic diagram of an example transformer interface panel in accordance with embodiments of the present disclosure.

Like reference numbers and designations in the various drawings indicate like elements.

DETAILED DESCRIPTION

The following detailed description describes techniques for removing impurities from, e.g., crude oil by desalting and dehydrating mechanisms. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Figure 1:
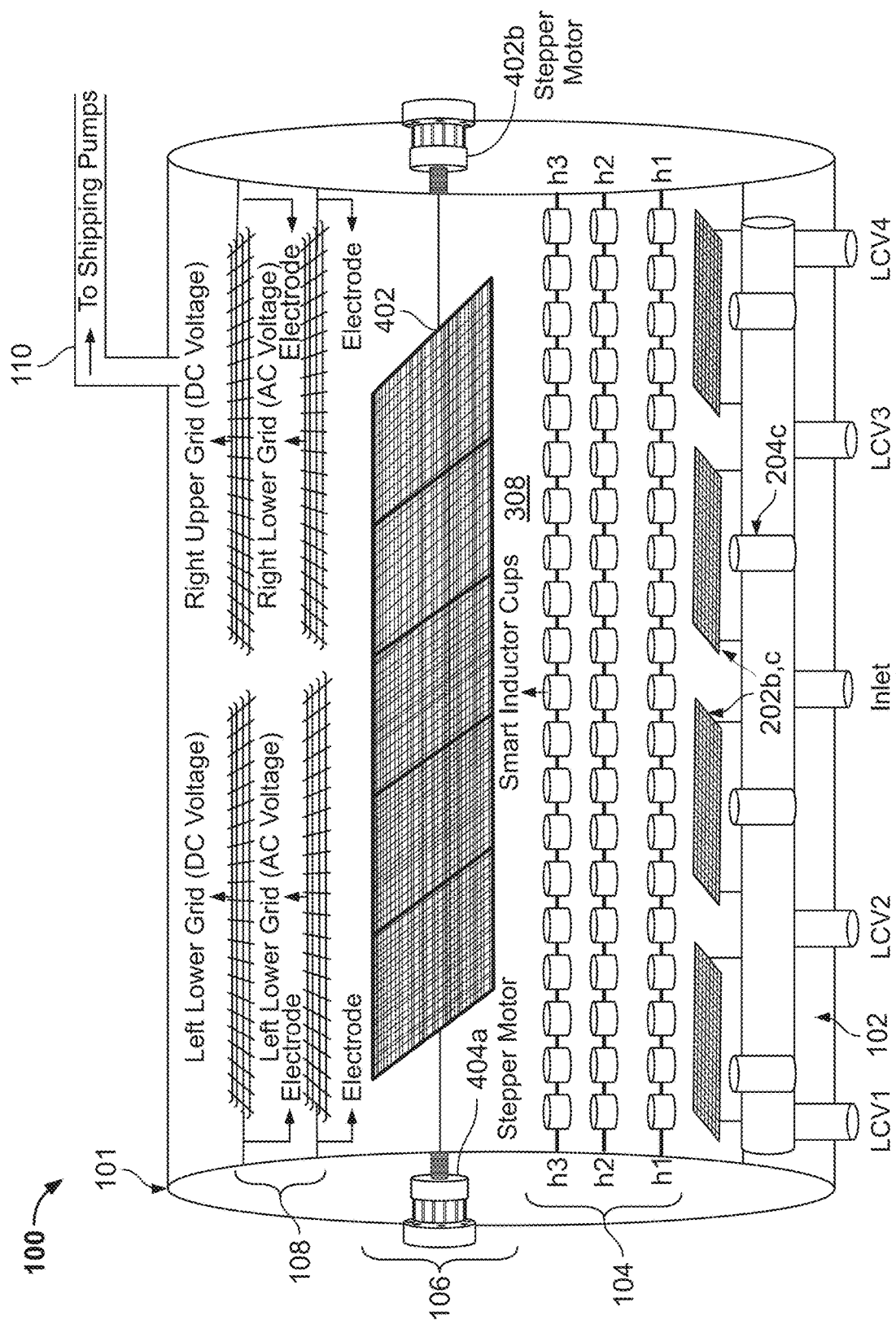
FIG. 1 is a schematic diagram of an example embodiment of a dehysalter system in accordance with embodiments of the present disclosure.

This disclosure describes a dehydrator+desalter hybrid system (referred to herein as a dehysalter or dehysalter system). FIG. 1 is a schematic diagram of an example embodiment of a dehysalter system in accordance with embodiments of the present disclosure. The dehysalter system 100 includes a vessel 101. Vessel 101 can include walls that contain fluid, such as crude oil and water, as well as the various operational components of the dehysalter system 100. The operational components of the dehysalter system 100 include: static super-hydrophobic mesh subsystem 102, a three-stage smart inductor cup subsystem 104, a movable super-hydrophobic mesh subsystem 106, and a powered, two-stage electric grid subsystem 108. Each of these subsystems will be described in more detail below. Generally, crude oil and water can be introduced to the vessel 101 through inlet pipe 206 and distributed to a static mesh through flow piping 204a-d. The crude oil can exit the vessel through an outlet pipe 110.

FIG. 2 is a schematic diagram of an example fixed super-hydrophobic mesh system 102 of the dehysalter system 100 in accordance with embodiments of the present disclosure. During operation, the crude immerses the fixed or static meshes 202a,b,c,d. The static meshes 202a-d are used as the first layer of water oil separation. The static meshes 202a-d are placed above the dehysalter 100 crude feed inlet pipes 204a,b,c,d. The material of the static mesh 202a-d can be made of stainless steel or copper coated by a super-hydrophobic material to allow the passing of only oil and repelling water. The repelled water will fall down and divert to water outlet line of the vessel 101. The design of the mesh 202a-d can include a water contact angle of more than 150 degrees and an oil contact angle of 0 degrees. The mesh 202a-d can demonstrate a water removal efficiency of 99%, while also demonstrating high reusability.

Figure 3B:
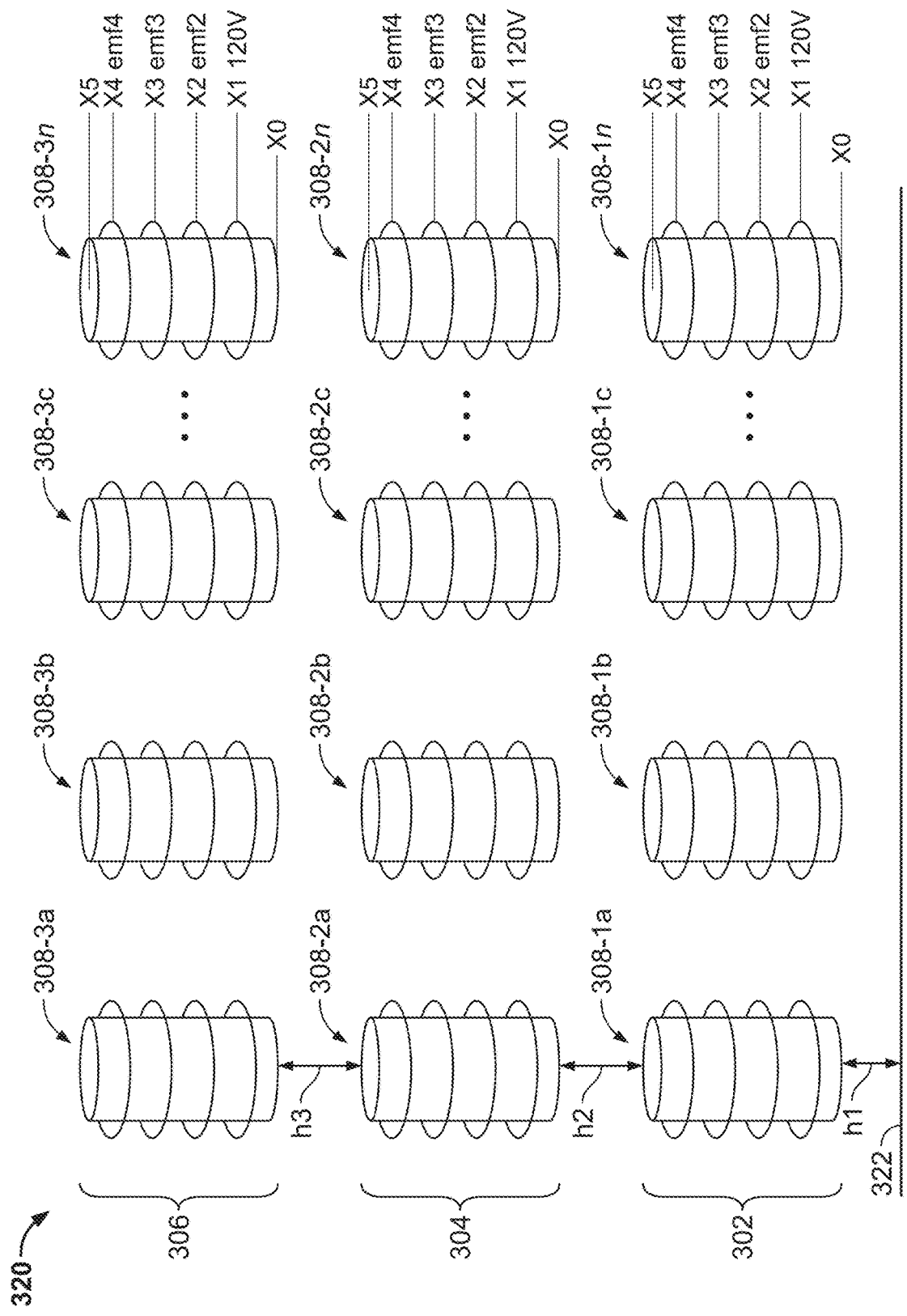
FIG. 3B is a schematic diagram of three layers of inductor cups in accordance with embodiments of the present disclosure.
Figure 3C:
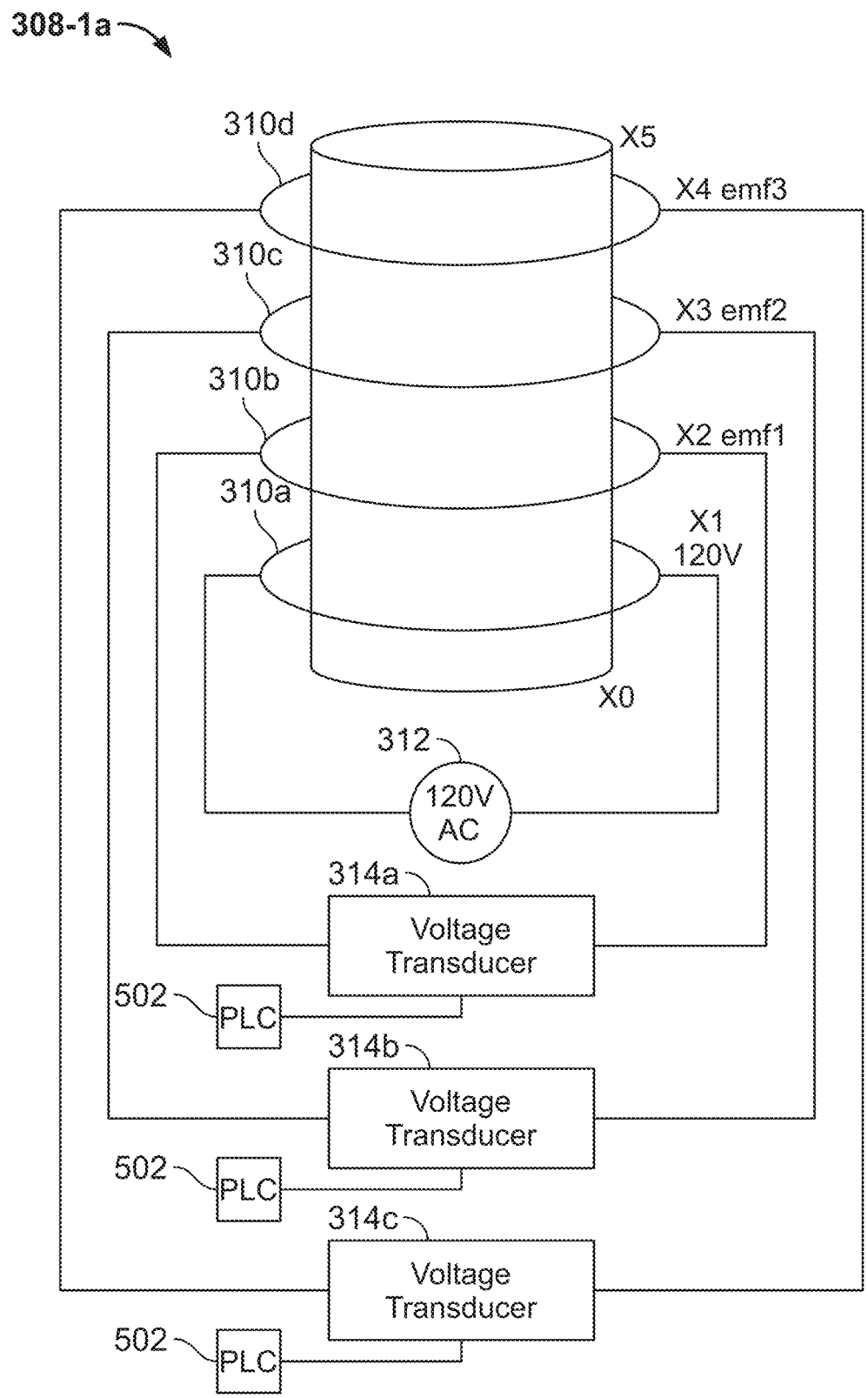
FIG. 3C is a schematic diagram of an example inductor cup in accordance with embodiments of the present disclosure.

FIG. 3A is a schematic diagram of an example three-stage smart inductor cup system 104 of the dehysalter system 100 in accordance with embodiments of the present disclosure. FIG. 3B is a schematic diagram 320 of three layers of inductor cups in accordance with embodiments of the present disclosure. FIG. 3C is a schematic diagram of an example inductor cup 308-1a in accordance with embodiments of the present disclosure.

The smart inductor cup sensors 104 are placed above the feed inlet distributor to sense the water/emulsion. Inductor cups 308 are less expensive as a capacitor for performing the sensor function, as they use coils. The three-stage smart inductor cup system 104 includes three parallel layers of individual inductor cups 308, including layer 1 302, layer 2 304, and layer 3 306. As shown in FIG. 3B, layer 1 302 is separated from the static grid layer 108 or the bottom of the vessel 101 by a distance h1. A second layer, layer 2 304, is separated from layer 1 302 by h2, and layer 3 306 is separated by layer 2 304 by h3 (distance h can be in feet or meters). Each layer 302-306 contains a number of smart inductor cups 308, the exact number of which is implementation specific (e.g., the number of inductor cups can depend of the length of the vessel 101). For example, as shown in FIG. 3B, layer 1 302 includes smart cups 308-1a, 308-1b, 308-1c, . . . through 308-1n. Likewise, layer 2 304 includes smart cups 308-2a, 308-2b, 308-2c, . . . through 308-2n. And layer 3 304 includes smart cups 308-3a, 308-3b, 308-3c, . . . through 308-3n. These inductor cups 308 can sense the water in crude after the static meshes.

Detail of one inductor cup 308-1a is shown in FIG. 3C. Each cup includes a primary coil (Lower) 310a and secondary coils coil 2 310b, coil 3 310c, and coil 4 310d. In FIG. 3C, the inductor cup 308-1a includes a primary coil 310a and three secondary coils 310b, 310c, and 310d. The primary coil 310a is connected to a 120 volt alternating current source 312. Secondary coils 310b-d are connected to voltage transducers 314a-c (secondary coil 310b is connected to voltage transducer 314a; secondary coil 310c is connected to voltage transducer 314b; secondary coil 310d is connected to voltage transducer 314c). Based on Faraday's Law, whenever a conductor is placed in a varying magnetic field, an electromotive force is induced (emf). So, when the primary coil 310a is energized by the 120 volt AC source 312, the primary coil 310a will produce a varying magnetic field. A secondary coil, coil 2 310b, resides at a location on the cup that would intersect these magnetic fields, and emf1 will be produced with same value of voltage source 120V. The emf1 will produce magnetic fields that interacts with the coil 3 310c and emf2 will be produced with same value of voltage source 120V. This emf3 will produce magnetic fields and these interacts with the coil 4 310d and emf2 will be produced with same value of voltage source 120V.

A voltage transducer 314a can monitor the voltage associated with emf1. A voltage transducer 314b can monitor the voltage associated with emf2. A voltage transducer 314c can monitor the voltage associated with emf3. When the crude oil has some water & some impurities and crude passes the cup, the value of emf1, 2, and 3 will be less than 120V. Three layers of inductor cups can be used because the crude oil can essentially have three layers, which are pure oil, oil mixed with some water and impurities, and pure water.

As shown in FIG. 3B, these layers of cups 302, 304, and 306 are separated by a distance of h feet between each layer. Each of the three layers has a number of cups; the number of cups can be based on the length of the tank or other internal vessel and/or the length of the upper fixed super hydrophobic mesh 402. Each one of these cups has some number of coils (e.g. 4 coils) separated with a distance of X feet between each coil, where the total size of the cup is equal to X5 minus X in FIG. 3C. The purpose of having more than one cup to increase the accuracy of reading and increasing the reliability level. If one of the cups is lost, others represent redundancies. The purpose of having more than one coil to measure exactly the limits of the emulsion. The following table is an example shows the philosophy of computing the induced voltages of inductor cups (e.g. 4 cups) in same layer. The average value of emf will be considered as a reference to measure the limits of the emulsion.

TABLE 1

Average emf Values for Layer 1 with 4 cups.

| $1^{st}$ layer | Cup#1 | Cup#2 | Cup#3 | Cup#n | emf avg | Height |
|---|---|---|---|---|---|---|
| emf1 | V11 | V12 | V13 | V14 | (V11 + V12 + V13 + V14)/4 | X1 |
| emf2 | V21 | V22 | V23 | V24 | (V21 + V22 + V23 + V24)/4 | X2 |
| emf3 | V31 | V32 | V33 | V34 | (V31 + V32 + V33 + V34)/4 | X3 |

The table above table uses the notation: V(emf #)(cup #). For V13, the voltage detected cup 3 of layer 1 by transducer 314a from emf1.

When the crude passes the cups, a voltage transducer will measure the voltage in the primary coil and compare it with the secondary coil. If the average voltage results of all cups in the first and second layers are matching between the lower and upper coils, the movable mesh 402 will remain at 90-degree position (perpendicular to the vessel horizontal line), no action is taken. Otherwise, the movable mesh 402 can be caused to rotate to a certain angle degree by a controlling system until the voltage reading between the primary and the secondary coils are matching, which means the oil does not contain water (or contains water below a threshold level). Therefore, the main objective of the smart inductor cups 308 is to sense the water in oil and if necessary, to cause the rotation the movable super-hydrophobic mesh subsystem 106 (e.g., by stepper motors 404a and/or 404b) for further perform water-oil separation prior reaching the tertiary water oil separation by the electrostatic grid subsystem 108.

Figure 4:
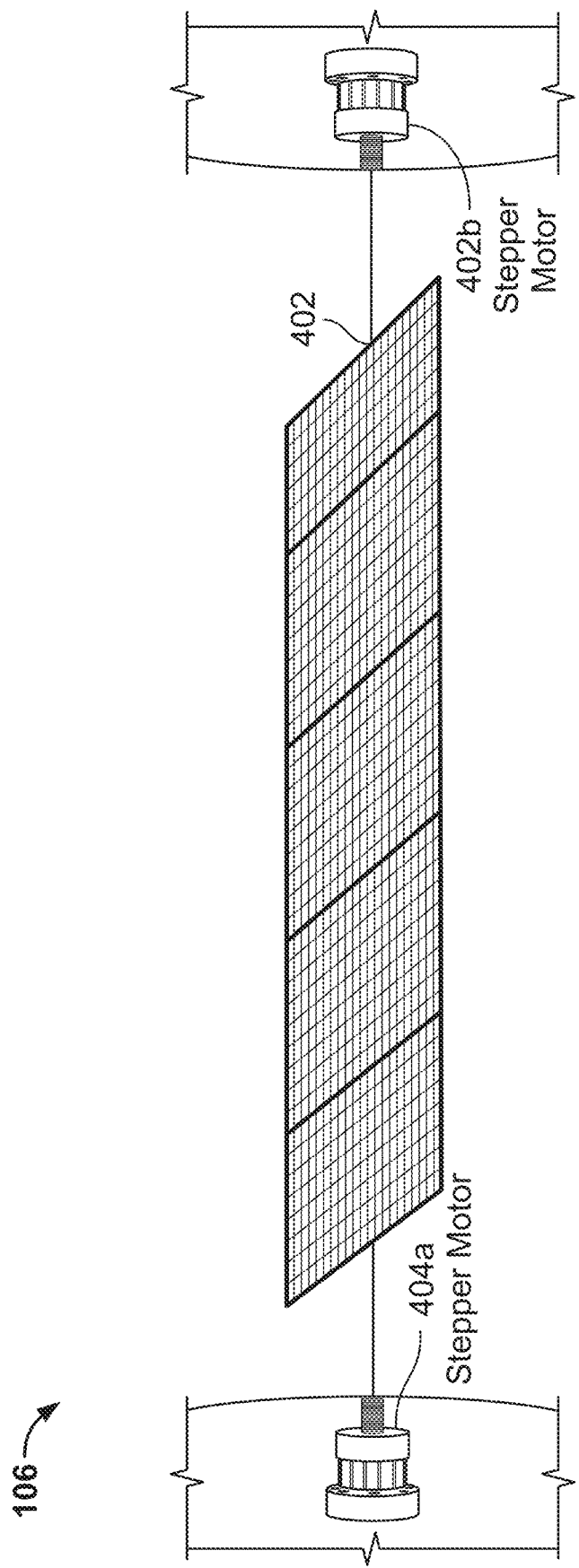
FIG. 4 is a schematic diagram of an example movable super-hydrophobic mesh system of the dehysalter system in accordance with embodiments of the present disclosure.
Figure 6:
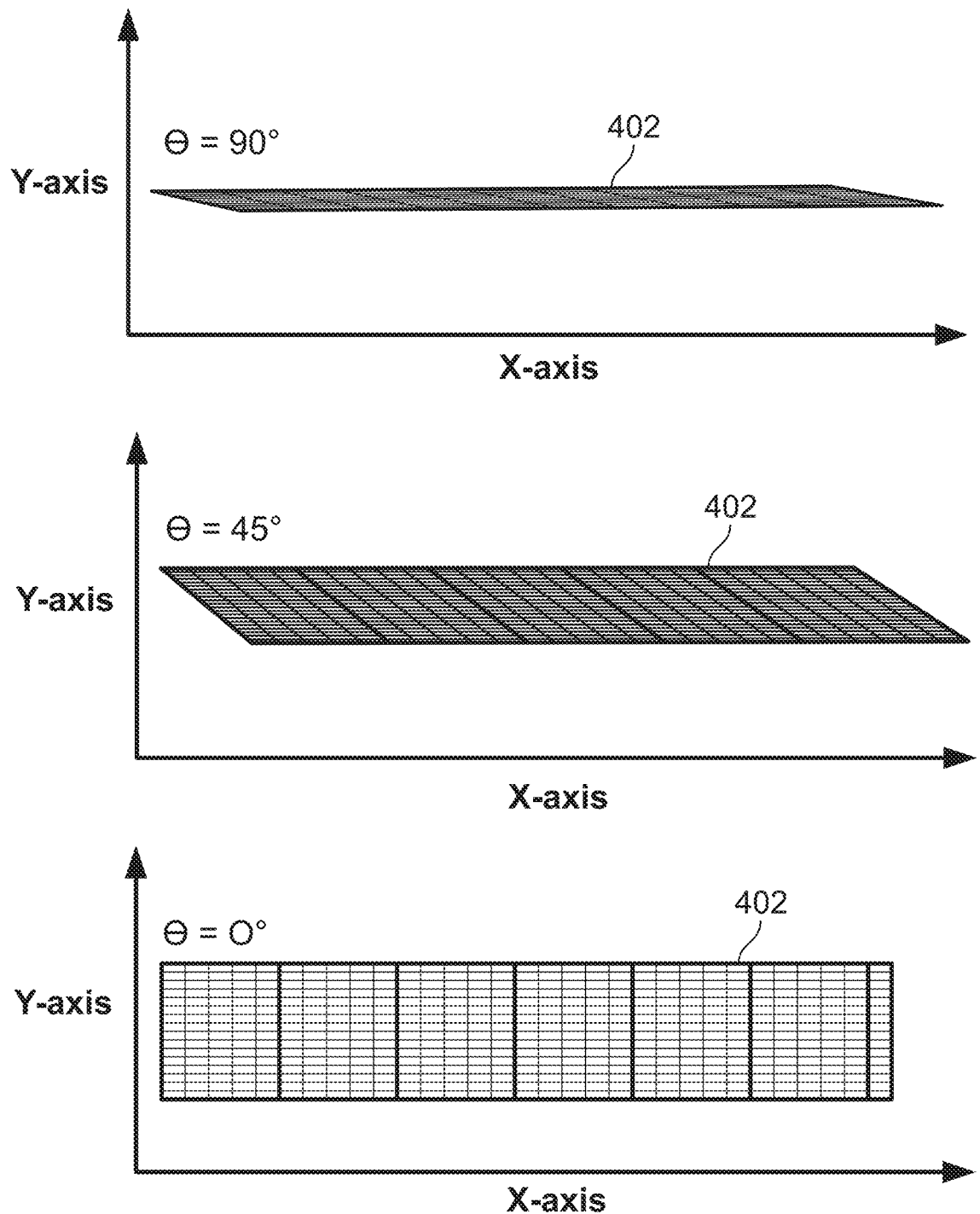
FIG. 6 is a schematic diagram illustrating example mesh angle positions for the movable super-hydrophobic mesh system in accordance with embodiments of the present disclosure.

FIG. 4 is a schematic diagram of an example movable super-hydrophobic mesh subsystem 106 of the dehysalter system 100 in accordance with embodiments of the present disclosure. The movable mesh 402 can be made of the same or similar material as the static mesh 202a-d. The movable mesh 402 can be placed between the lower grid and above the Normal Liquid Level (NLL). The mesh length will be 80% of the vessel TL-TL length and will be connected to two stepper motors those supported on vessel ends for rotation. The default angle of the movable mesh will be 90 degree which is perpendicular to the vessel horizontal line. The mesh 402 can be rotated using stepper motors 404a and/or 404b with step angle of 15° to a specific angle based on the content of the water within the crude emulsion layer as measured by the smart inductor cups 308. The maximum angle degree of the movable mesh is 0 degree which will be flat and parallel to the vessel horizontal line. FIG. 6 is a schematic diagram illustrating example (non-limiting) mesh angle positions for the movable super-hydrophobic mesh 402 in accordance with embodiments of the present disclosure.

Figure 5:
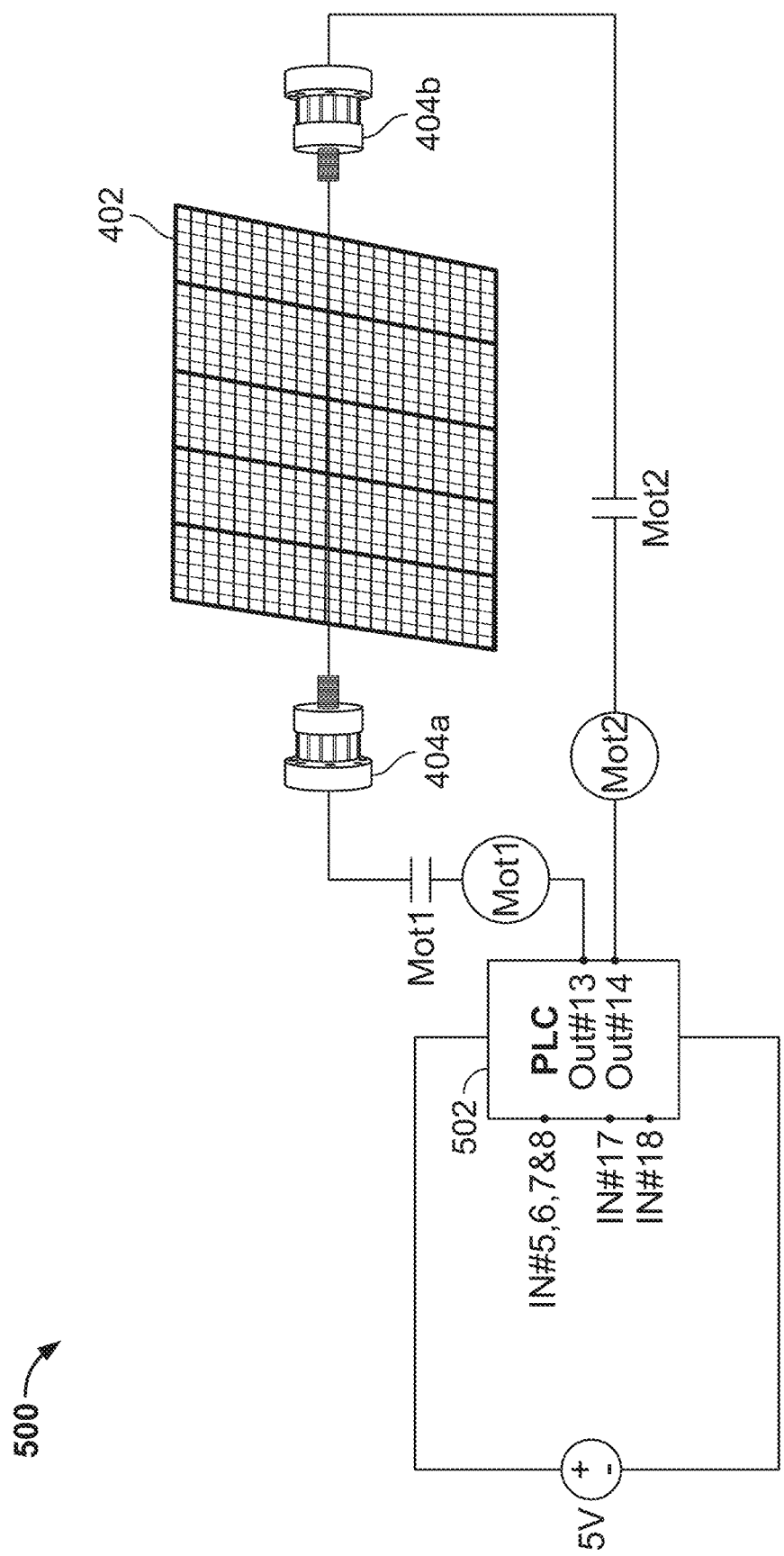
FIG. 5 is a schematic diagram of movable super-hydrophobic mesh system with stepper motors and a programmable logic controller of the dehysalter system in accordance with embodiments of the present disclosure.

FIG. 5 is a schematic diagram of movable super-hydrophobic mesh system 106 with stepper motors 404a and 404b, and a programmable logic controller (PLC) 502 of the dehysalter system 100 in accordance with embodiments of the present disclosure. The output of the auto salt analyzer, VT, and the average voltage drop of the smart inductor cups 308, $V_{D,ave}$, are reflected to the central PLC though pin IN #17 &IN18 to do the comparison. Based on the comparison results, the central PLC 502 either energizes the coil #Mot1 & 2 to close their contacts to operate the stepper motors 404a and 404b, respectively, for rotating the movable mesh 402 from 0 to 90°; or the results of the comparison can cause the PLC 502 to keep the mesh 402 at the whatever angle it is or to set it to 0°. Also, the stepper motors 404a and 404b will rotate the mesh 402 when the current of the electric grids (702a,b, 704a,b) exceed the setting limits and the measured amps of the grids (702a,b, 704a,b) are reflected to the central PLC 502 through IN #5, 6, 7 & 8.

Figure 7:
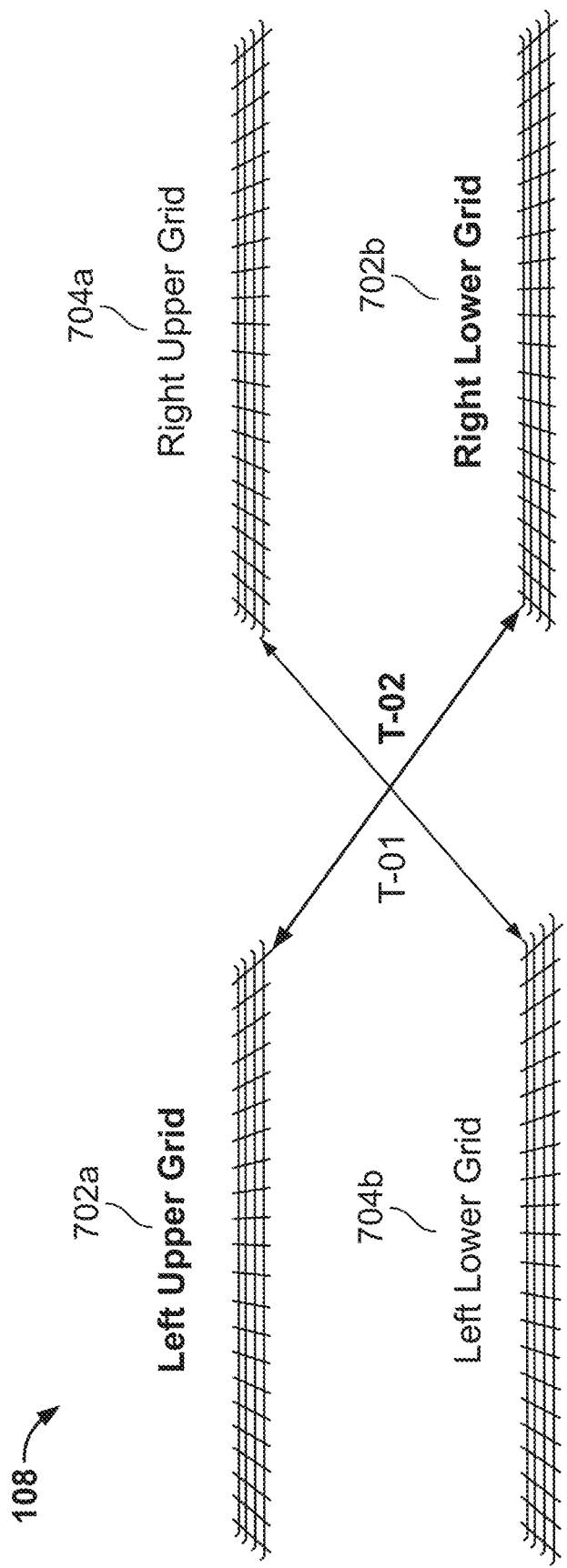
FIG. 7 is a schematic diagram of an example electrical grid configuration for the dehysalter system in accordance with embodiments of the present disclosure.
Figure 8:
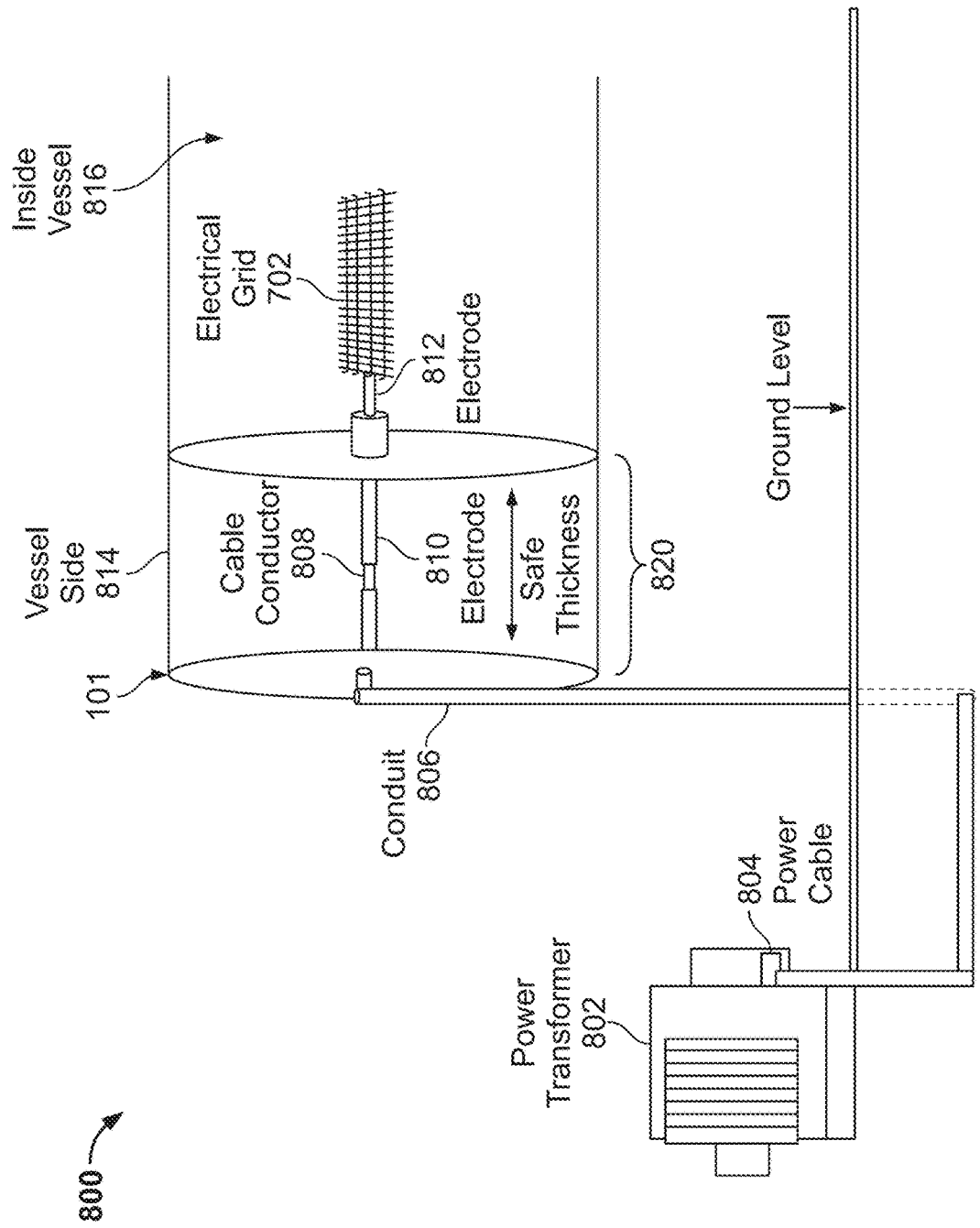
FIG. 8 is a schematic diagram of an example power configuration for the electrical grid configuration in accordance with embodiments of the present disclosure.

FIG. 7 is a schematic diagram of an example electrical grid configuration for the dehysalter system in accordance with embodiments of the present disclosure. FIG. 8 is a schematic diagram of an example power configuration for the electrical grid configuration in accordance with embodiments of the present disclosure. In the dehysalter system 100, two grid layers are connected to two external transformers. The idea of the external transformers is to avoid transformers bushing failures when exposing to water emulsion by removing the entry bushings. This happens when the two-power transformer installed on the sides of the vessel and connected to electrodes directly without entry bushing, as shown in FIG. 8. FIG. 8 shows how one power transformer 802 can be connected on one side of the vessel 101. A second power transformer can be connected to an opposite side of the vessel 101. The power transformer 802 can be coupled to the vessel 101 by a conduit 806. The conduit 806 permits the power cable 804 to reach the vessel 101 and sometimes be buried for safety. The power cable 804 can be coupled to the electrode 810 by a cable conductor within the safe zone 820 of the vessel 101. The dehysalter has two transformers installed on the sides of the vessel 101 instead of the top of the vessel to dispense with entry bushing. The electrodes (e.g., 810) and transformer cable conductors (e.g., 808) are connected in the safe area (safe thickness) 820 on the side 814 of the vessel 101 to ensure this conductor will not touch a water within the inside vessel 816, water being a component of the crude oil contents.

Within the inside vessel 816, the electrode 812, which is electrically connected to electrode 810, can be electrically connected to the electrical grid 702. As shown in FIG. 7, there are four electrical grids: two in a lower configuration (e.g., left lower grid 704b and wright lower grid 702b) and two in an upper configuration (e.g., left upper grid 702a and right upper grid 704a). Each grid 702a,b and 704a,b is coupled to an electrode in a similar manner as shown for grid 702 in FIG. 8. Also, the connection between the transformer and grids (cross connection) increases the reliability of the grids. For example, in case of a loss of one of the two transformers, the other transformer will provide the power to the lost grid. Also, if one of these grids is lost, both sides of the vessel will still have at least one active grid. The cross-connection is shown in FIG. 7. Each side of the dehysalter 100 has an energized grid to do a separation, as long as one transformer is operational. As mentioned above, the dehysalter has a smart inductor analyzer that measures the water and salt amount in the crude oil to ensure that there is a high level of the quality of pure crude oil contacting the grids to protect the electrical grids from large water content in the oil.

Figure 9:
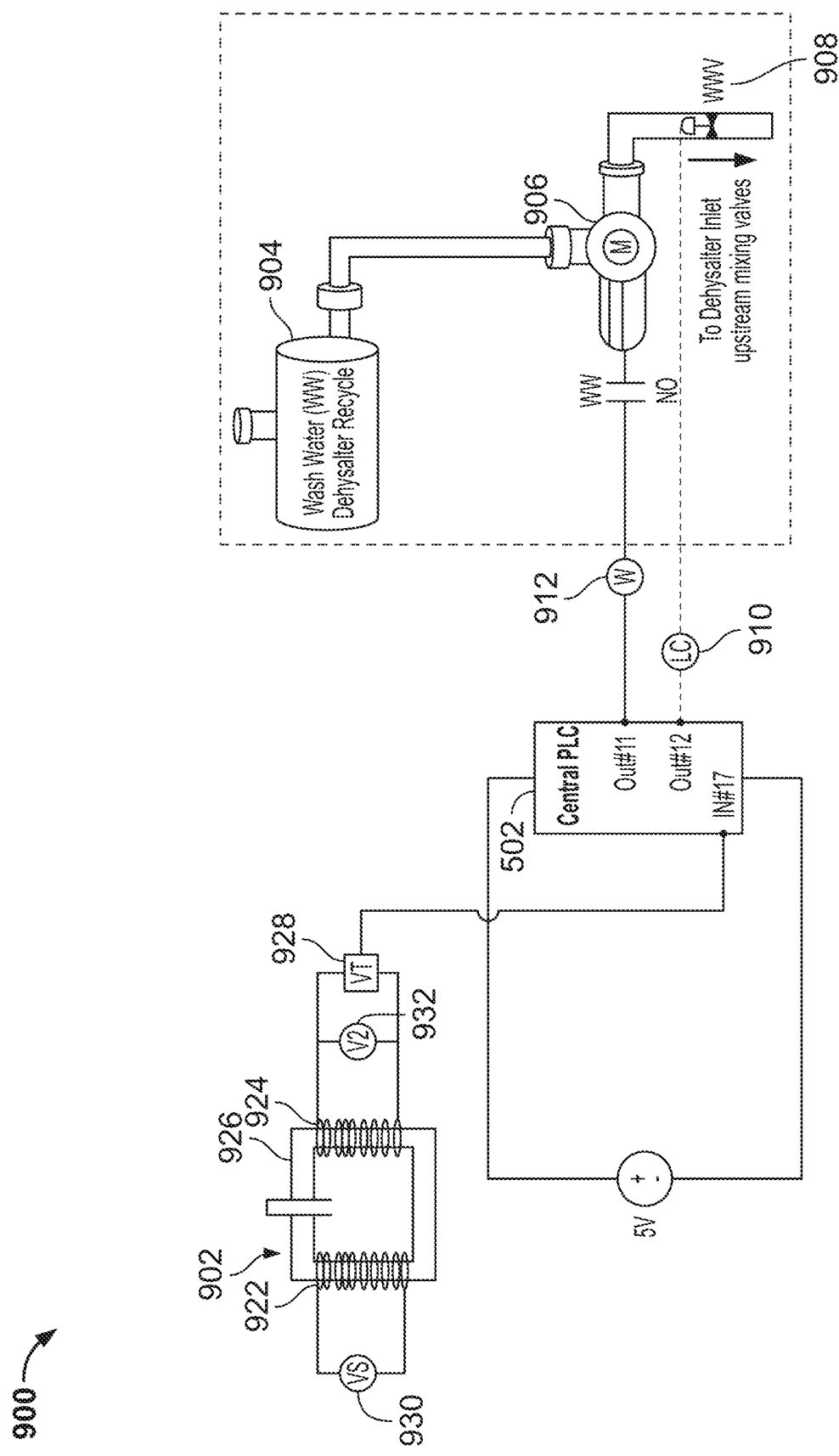
FIG. 9 is a schematic diagram of an example smart inductor circuit with wash water dehysalter recycling in accordance with embodiments of the present disclosure.
Figure 10A:
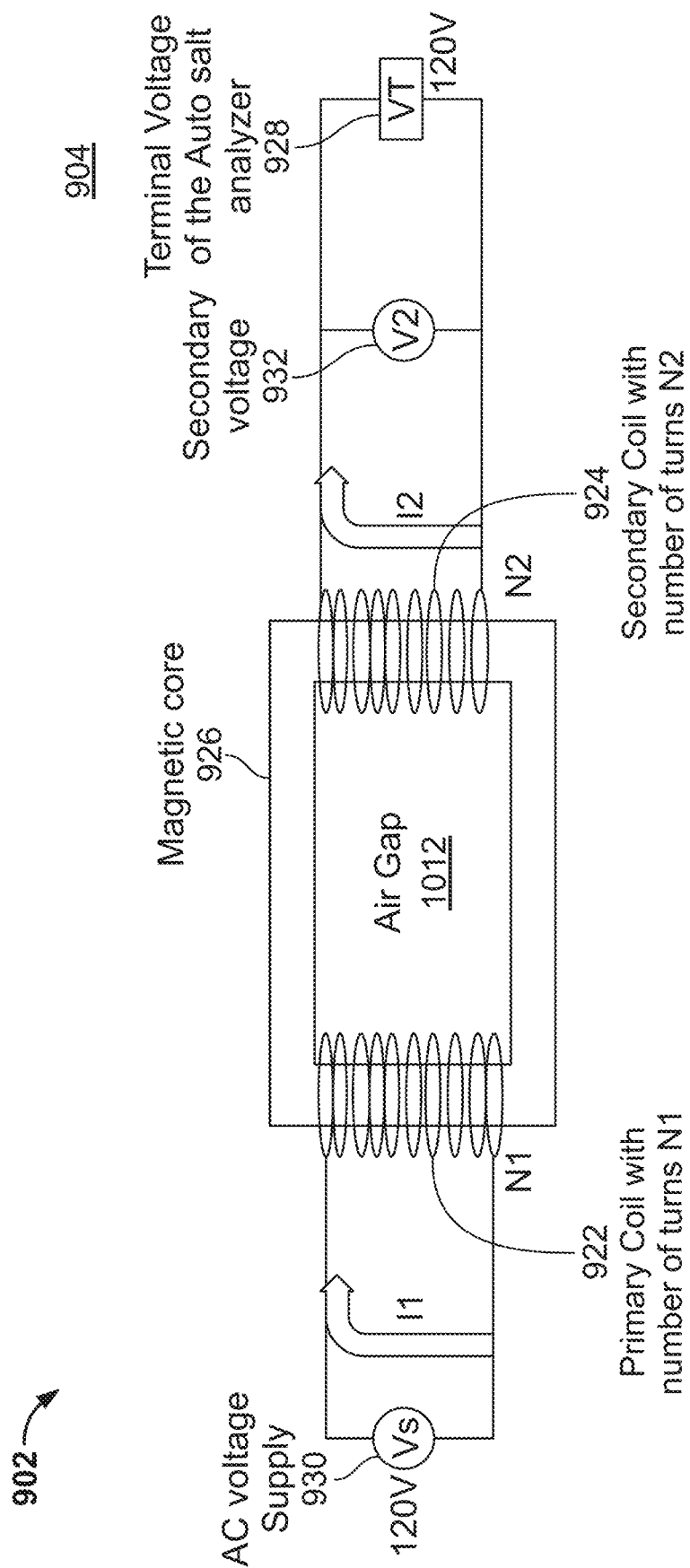
FIG. 10A is a schematic diagram of an example smart inductor with an air gap in accordance with embodiments of the present disclosure.
Figure 10B:
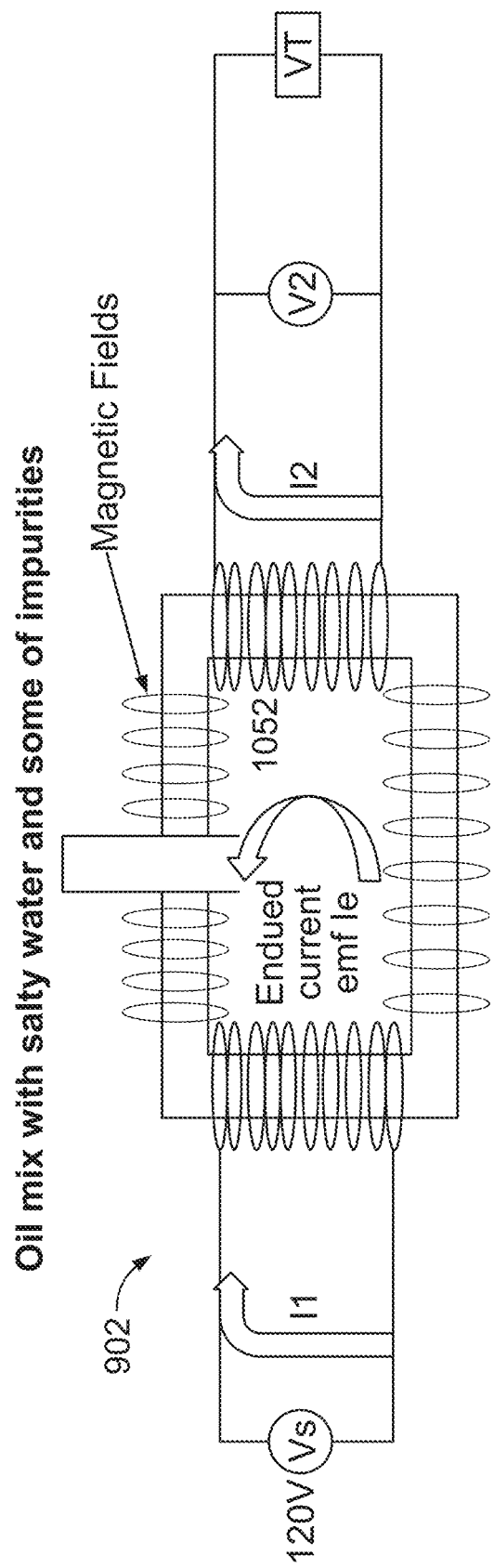
FIG. 10B is a schematic diagram of an example smart inductor with an oil gap in accordance with embodiments of the present disclosure.
Figure 11:
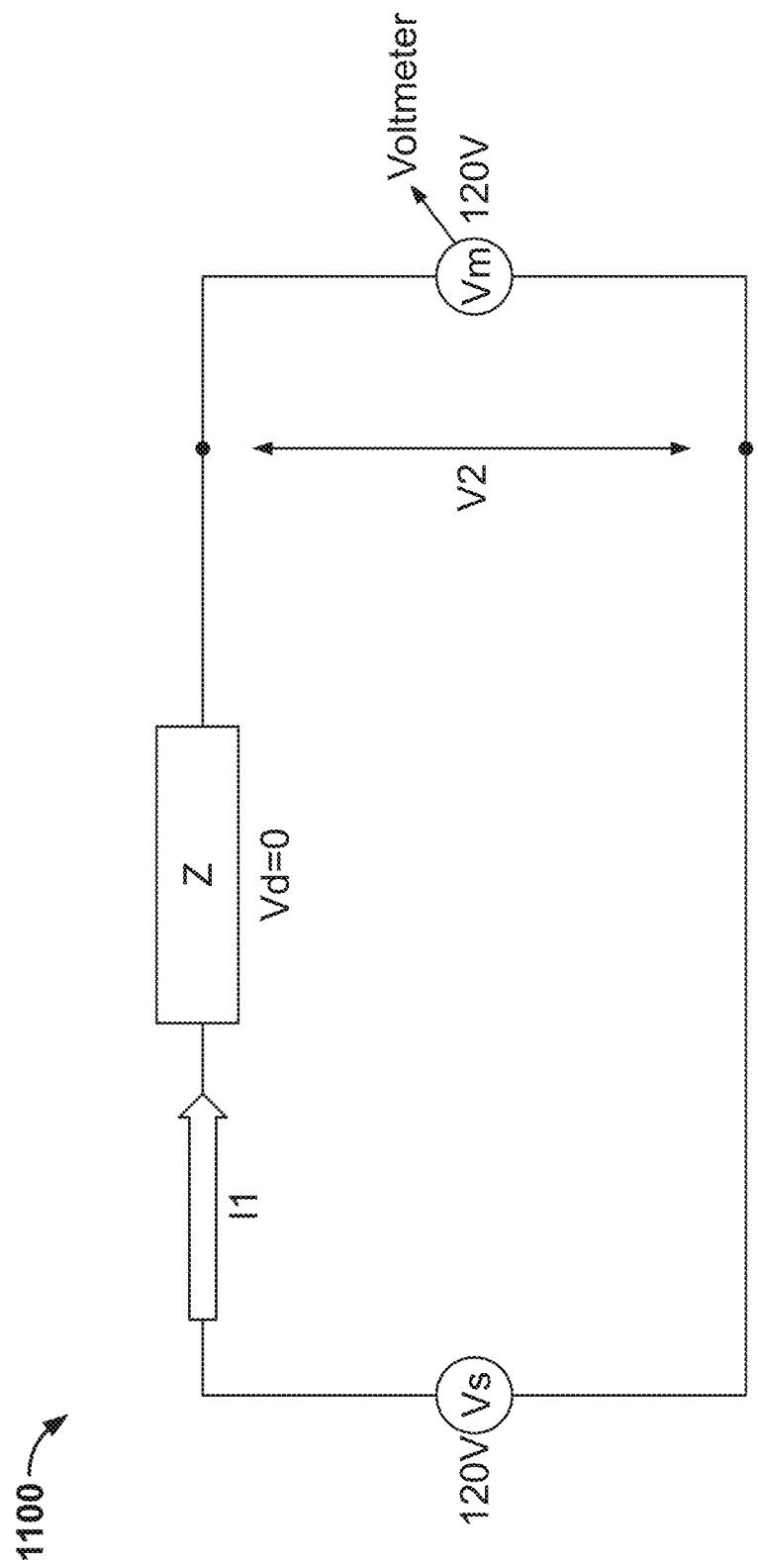
FIG. 11 is an example equivalent circuit for the smart inductor analyzer in accordance with embodiments of the present disclosure.
Figure 12:
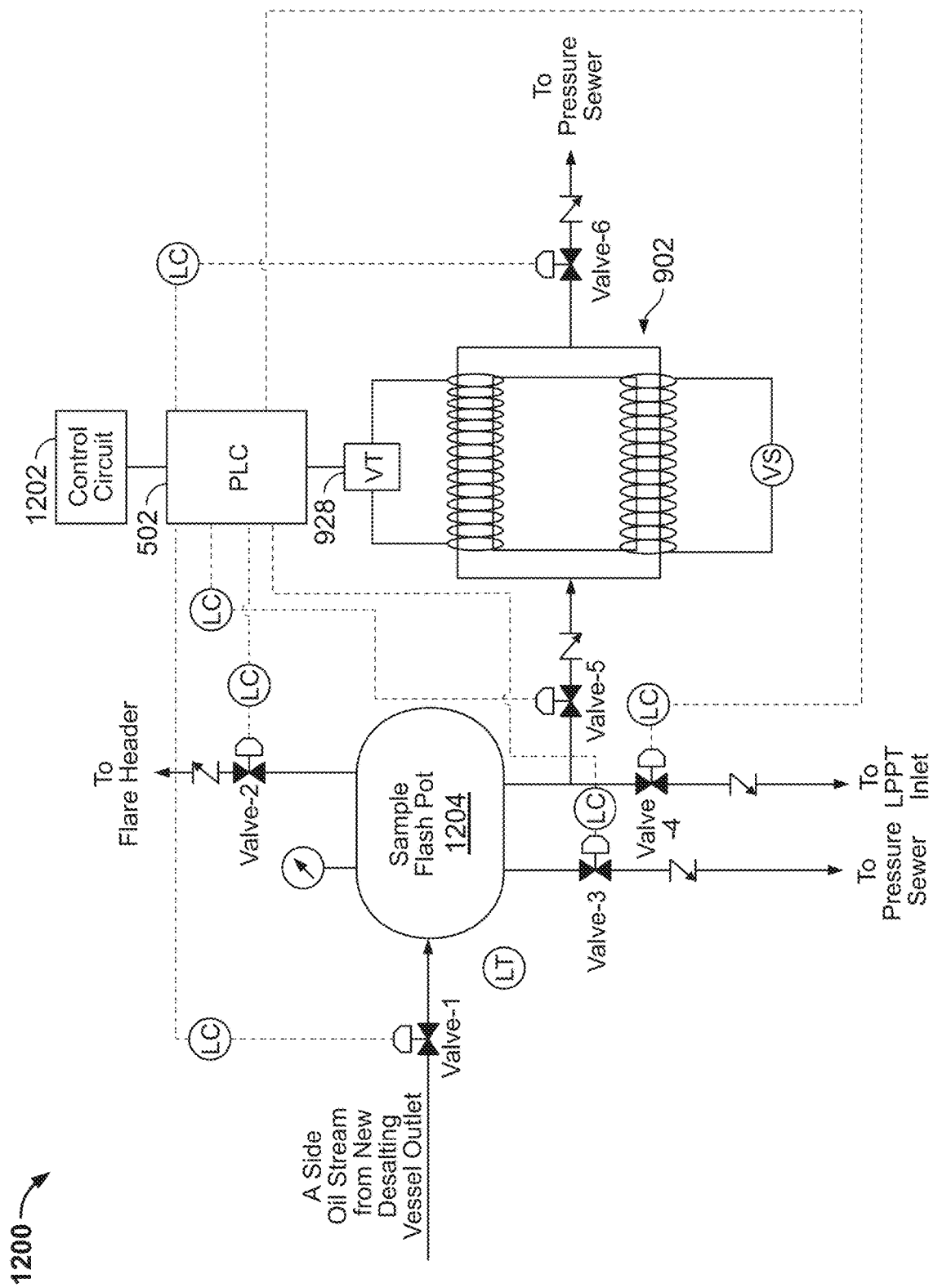
FIG. 12 is a schematic diagram of an example automatic salt analyzer in accordance with embodiments of the present disclosure.

FIG. 9 is a schematic diagram of an example smart inductor circuit with wash water dehysalter recycling in accordance with embodiments of the present disclosure. FIG. 10A is a schematic diagram of an example smart inductor with an air gap in accordance with embodiments of the present disclosure. FIG. 10B is a schematic diagram of an example smart inductor with an oil gap in accordance with embodiments of the present disclosure. FIG. 11 is an example equivalent circuit for the smart inductor analyzer in accordance with embodiments of the present disclosure. FIG. 12 is a schematic diagram of an example automatic salt analyzer in accordance with embodiments of the present disclosure.

The auto salt in crude sampling system consists of a sample flash pot (e.g., a flash pot of 6 inches diameter and 16 inches TL) (shown in FIG. 12 as 1204), electromagnetic circuit 902 (including magnetic core 926 with two coils 922, 924, with number of turns installed on both sides of the magnetic core 926), AC voltage supply 120V 930, and associated control valves 910, 912, with PLC 502. The purpose of this analyzer is to ensure the oil outlet from desalting train is meeting the specification of 10 PTB salt in crude. At predetermined times, the auto salt in crude analysis cycle is repeated to analyze the salt in crude. The output results of the salt in crude analysis will control the wash water injection rate from wash water tank 904 and recycle any off-spec oil to low pressure production tap (LPPT) inlet. The sampling procedure is listed below:

1) Valve-4 will open while other valves are normally closed.
2) Valve-1 will open to divert a side oil stream from the new single stage Dehydrator/Desalting vessel to the sample flash pot 1204. The crude will flow to LPPT for 5 minutes to ensure no debris/contamination in the stream from the pot 1204.
3) After a proper flushing, Valve-4 will close.
4) Valve-2 will open to allow the sample to de-gas to flare header. If the sample pot pressure dropped to atmospheric pressure, Valve-2 will close.
5) Valve-6 and Valve-5 will open and the sample will enter the circuit. During this, the circuit will measure the voltage differences between the primary and secondary voltage elements. If the secondary voltage equals primary 120V, it means the oil is pure without any salt content. If the primary and secondary voltage equals or is about 119.99672V, it means the passing oil is meeting the salt in crude specification of 10 PTB. If the secondary voltage is below this value 119.99672V, it means the salt in crude content is exceeding 10 PTB. The duration of the analyzing is 1 minute with 12 reading points every 5 seconds that will be averaged to record the salt in crude content in PTB.
6) After analyzing the crude for 1 minute, Valve-1 will close as well as Valve-5 and 6.
7) Valve-3 will open to drain any residual crude in the sample flash pot for a specific time. After that, Valve-3 will close. Every 30 minutes, the cycle is repeated to analyze the salt in crude.

The output results of the salt in crude analysis, will control the wash water injection rate and recycle any off-spec oil to the LPPT inlet.

In FIG. 12, the output of the Auto salt analyzer VT 928 is reflected to the central PLC 502 though IN #17 to do the comparison. Based on the comparison results, the central PLC 502 either energizes the coil #W 912 to close the contact #WW to operate the motor 906 for pumping the water and opening the valve #WWV 908 (to inject more recycled water from wash water container 904 as a wash water into the dehysalter 100 to dilute the oil in the dehysalter vessel); or the PLC 502 can keep it as it is in the de-energizing mode. The pin #Out11 is responsible for energizing/de-energizing the coil #W 912 and pin #Out12 is responsible for opening/closing the valve #WWV 908.

As shown in more detail in FIG. 10A, the electromagnetic circuit 902 includes a magnetic core 926 with two coils: a primary coil 922 and a secondary coil 924, and each coil 922 and 924 has number of turns N1 & N2 located on different sides of the magnetic core 926 and are separated by a dielectric, such as an air gap 1012. Primary coil 922 can be connected to a voltage source 930. Voltage source Vs can supply 120 V AC across the primary coil 922.

The concept of the auto salt-in-crude analyzer is based on the Faraday's and Lenz's law. Faraday's Law states that whenever a conductor is placed in a varying magnetic field, an electromotive force is induced. If the conductor circuit is closed, a current is induced, which is called induced current. Lenz's law states that the direction of the electric current induced in a conductor by a changing magnetic field is such that the magnetic field created by the induced current opposes changes in the initial magnetic field. In other words, if an AC voltage Vs=120 V is supplied to the primary coil 922 with number of turns N1 and the secondary coil 924 has same numbers N2=N1, the output voltage V2 932 will equal Vs=120 V, since the air gap 1012 is an excellent insulator and there is no voltage induced in the air gap. If a voltage is induced in the air gap 1012 as per Faraday law, this voltage will induce current has opposite direction of the original current and then it causes a voltage drop and the output voltage V2 will equal less than 120V because of the voltage drop. If the apparent power VA=120VA and to make it simple, the above electromagnetic circuit 902 components is reflected to the equivalent circuit 1100 shown in FIG. 11.

From the apparent power VA, compute the current I1 through VA=V×I and get the value of voltage and value of VA. So, the I1=VA/V=120VA/120V=1 A The voltage drop Vd as per above circuit equals zero since V2=VS=120V and that means the impedance value Z is almost Zero. So, if Z=1×10-9Ω, to calculate current I2 through the below formulas:

For an ideal transformer where Vs=V1:
V1/V2=N1/N2=I2/I1. Since N1=N2, then V2=V1. So, the I1/I2=V1/V2; then I2=I1=1 A.

The case #1 indicates that the supply voltage Vs will equal the terminal voltage VT or secondary voltage V2 when the gap between the primary and secondary sides is filled by air. Since the primary coil and secondary coil has same number of turns N1=N2 and there is no voltage induced in the air gap since the air is dealt as insulator.

In FIG. 10B, the circuit 1050 has oil 1052 in air gap 1012. Oil 1052 can be introduced to the electromagnetic circuit 902 by an oil inlet 1054, which can be connected to vessel 101. Note that the air gap 1012 is filled by oil 1052 that has some level of salt which changes the oil properties from insulating material to conductive material. Based on the Faraday and Lenz laws, whenever a conductor is placed in a varying magnetic field, an electromotive force is induced as emf (120V), and the direction of the electric current, Ie, induced in a conductor by a changing magnetic field is such that the magnetic field created by the induced current opposes changes in the initial magnetic field.

R=PL/A, G=1/R, P=1/σ. The salt in crude content specification is 10 PTB which is equivalent to 0.00445 S/m where S is Siemens and m is meter.

So, σ=0.00445 S/m then, P=1/σ, P=1/(0.00445)=224.72 Ωm.

If the 10 AWG is selected as a size of the coil conductor and the length L of the conductor is 1 m.

Then, based on American-Wire-Gauge-AWG-Sizes-and-Properties-Table below:

Area A=5.26 mm$^2$, A=5.26×10-6 m$^2$, then R=PL/A= (224.72 Ω·m×1 m)/(5.26×10-6 m2)=42.72MΩ

Ie=emf/ROil=120V/42.721\11=2.8 uA

Then, the voltage drops in the oil gap Vdoil=(I1−Ie)×Z where Z=1, I1=1A and Ie=2.8 uA as mentioned above.

Vdoil=(I1−Ie)×Z=(1A−2.8 uA)×1×10-9=9.999972×10-10V.

Now, the voltage drop for 10 AWG conductor is determined and the value of the resistor for this size is 3.28Ω per 1 km. The length of the conductor which used is 1 m and the resistor value of the conductor for 1 m is 0.00328Ω and the voltage drop of the conductor is Vd=IR, Vdconductor=1A× 0.00328 Ω=0.00328V The terminal voltage VT or secondary voltage=Voltage Supply (VS)−Vd-conductor−Vd-oil. Thus, VT=120−0.00328−9.999972×10-10=119.99672V at 10 PTB. This reference voltage will be used in the Auto Salt Analyzer and in the Smart Inductor Cups to decide if the incoming crude oil is on Spec (10 PTB and below) or OFF spec (more than 10 PTB).

The formula used in the PLC 502 to do the comparison is:
VT=VM−119.99672V where VM is a measured voltage.

If the VT≥0, it means the crude oil ON spec and otherwise the crude oil is OFF spec.

Put simply, if the VT is greater than 119.99672V, then the amount of salt in the crude oil sample is less than detectable amounts. The crude oil can be determined to be free of salt. If VT is equal to 119.99672V (within some margin for error), then the amount of salt in the crude oil sample is less than or equal to 10 PTB (and is ON spec). If VT is less than 119.99672V, then the amount of salt in the crude oil sample is greater than 10 PTB (and is OFF spec).

Figure 13A:
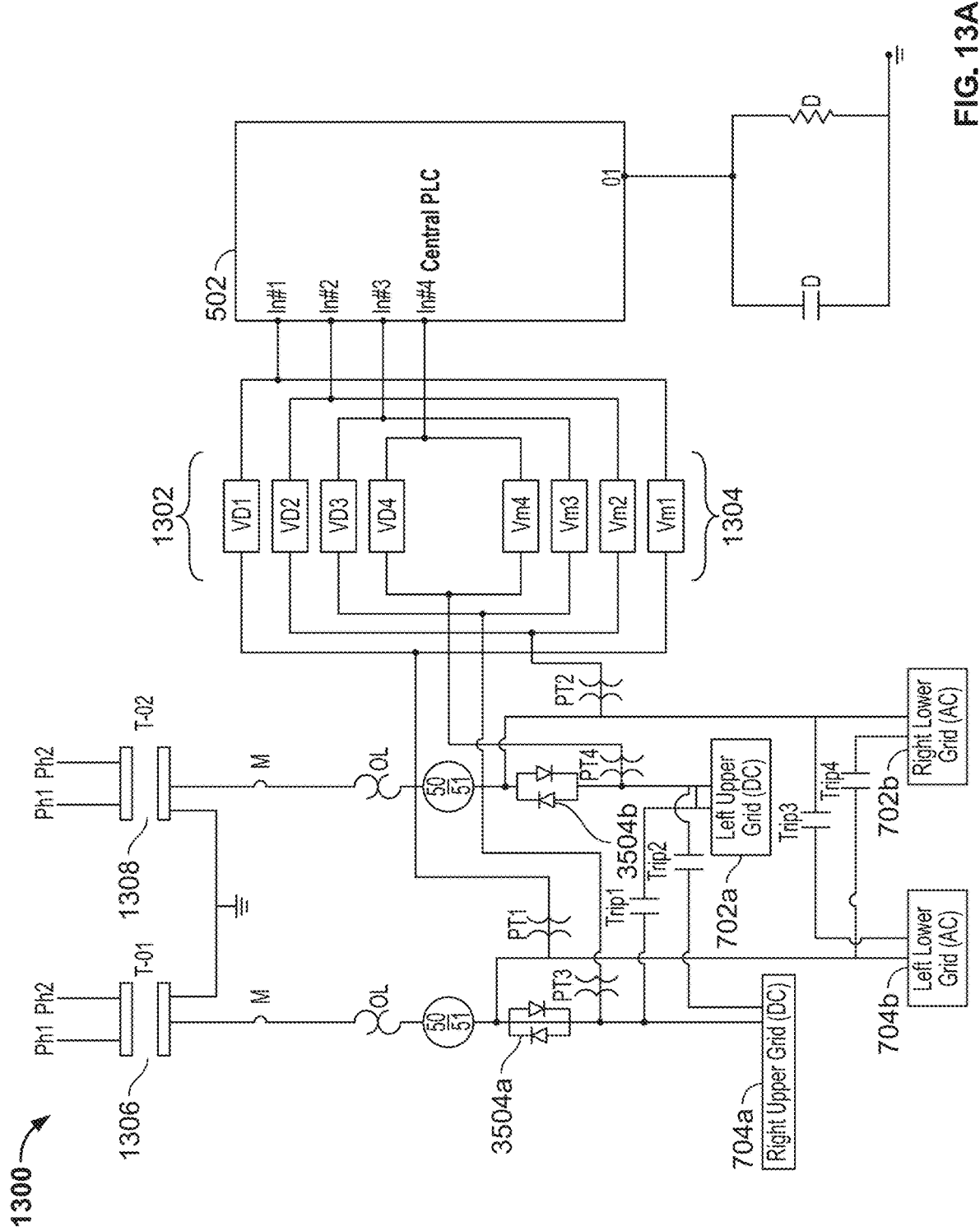
FIGS. 13A-13B are example wiring diagrams for a power transformer, potential transformers, and protection relays in accordance with embodiments of the present disclosure.
Figure 13B:
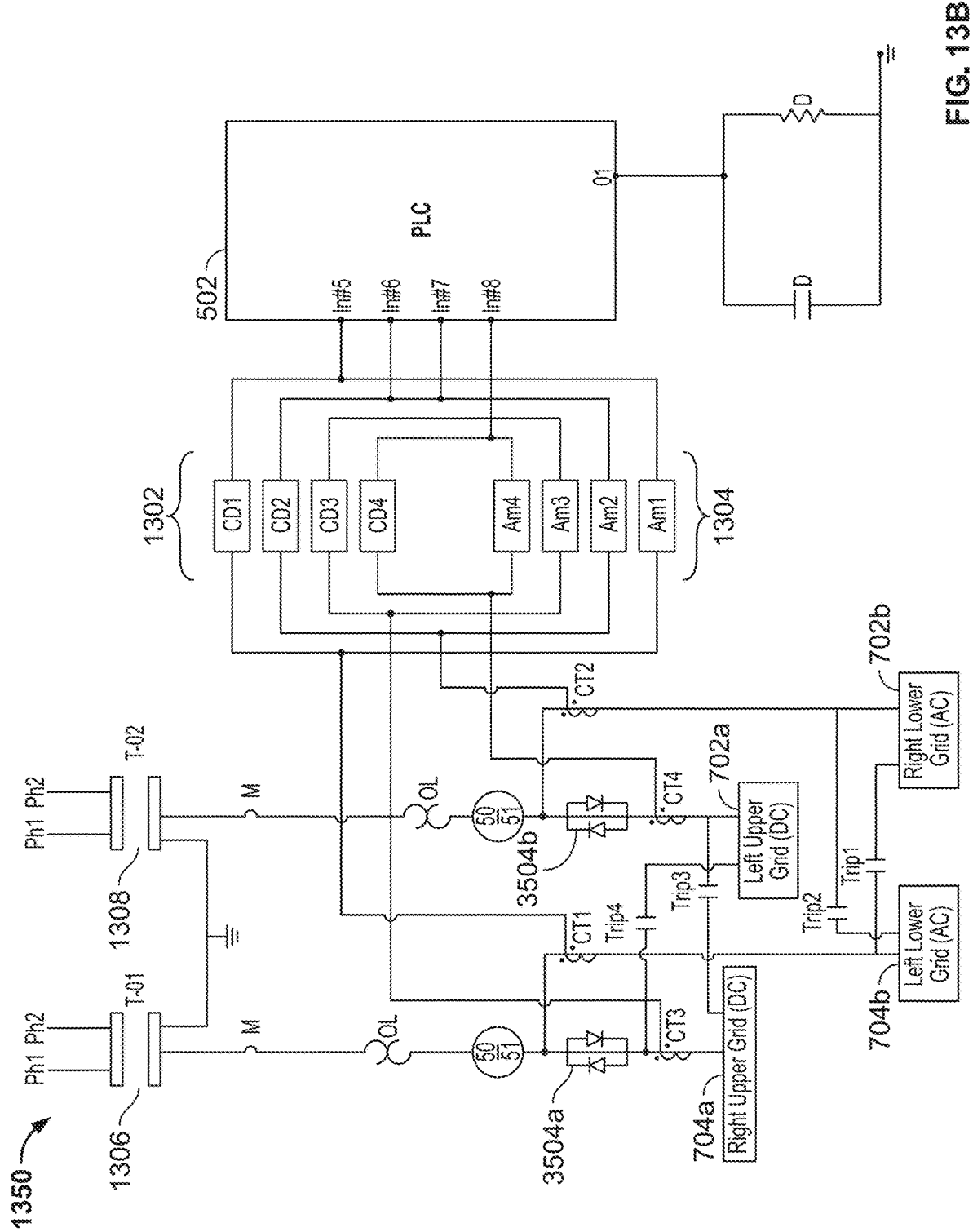

FIGS. 13A-13B are example wiring diagrams 1300 and 1350 respectively for a power transformer, potential transformers, and protection relays in accordance with embodiments of the present disclosure. The wiring diagrams 1300 and 1350 in FIGS. 13A-13B, respectively, indicate that there are two transformers T-01 1306 & T-02 1308, and each of these transformers are connected to Main contacts (M) normally opened (NO). Then, the circuits 1300 and 1350 include overload relays (OL) and ground instantaneous/time delay overcurrent relays. So, the transformers T-01 1306 & T-02 1308 feed the power directly to Left Lower Grid 704*b* and Right Lower Grid 702*b* without any changing of the form of the voltage AC form. For Upper Grids Left 702*a* and Right 704*a*, the output from the transformers 1306 and 1308 will be rectified through two diodes 1304*a* and 1304*b* in opposite direction to supply DC Voltage. The function of the grids 702*a,b* and 704*a,b* is providing the electrical shocks to have an efficient separation. The voltage of the upper and lower grids 702*a,b* 704*a,b* is equal to the secondary voltage of the transformers 1306, 1308, which is approximately 23 KV. The current values of these grids 702*a,b* 704*a,b* depends on the availability and level of the salt and the impurities in the oil. If the oil is very pure, the current value will be zero or almost zero but in normal case, the oil always has a certain of the salt and some of the impurities. So, the current value usually ranges between 5A to 15A depending on the purity of the oil. The voltage and current of the grids are monitored by central PLC 502 through voltage & current transducers (VD) 1302 in FIG. 13A, (CD) 1352 in FIG. 13B, respectively. The output of these transducers will be saved in the PLC 502 to do the comparison with the setting values. Based in the comparison results, the central PLC 502 will decide through sending a signal to energize/de-energize the coil #D. If the results of the comparison are accepted, the PLC 502 will energize the coil #D 1310 to close its contact #D through a signal its value equals 1 from pin #O1 and its contact #D. After the contact #D closed, the control circuit of transformer will be energized to feed the power to the grids. Otherwise, if the results of the comparison are not accepted greater than setting values, the central PLC 502 will de-energize the coil #D 1310 to open the contact #D. Then, the control circuit (1202) of the transformer will show an alarm notification in a display (e.g., LCD) with yellow indication alarm as it indicated in FIGS. 23, 25, 27. The potential and current transformers (PT), (CT) are used to transform the high values of the voltage and current to small scales to help the transducers (VD) 1302, (CD) 1352 to read. Also, the digital voltammeters and ammeters (Vm) 1304, (Am) 1354 are used to measure the values of the voltage and current of the grids.

Figure 14:
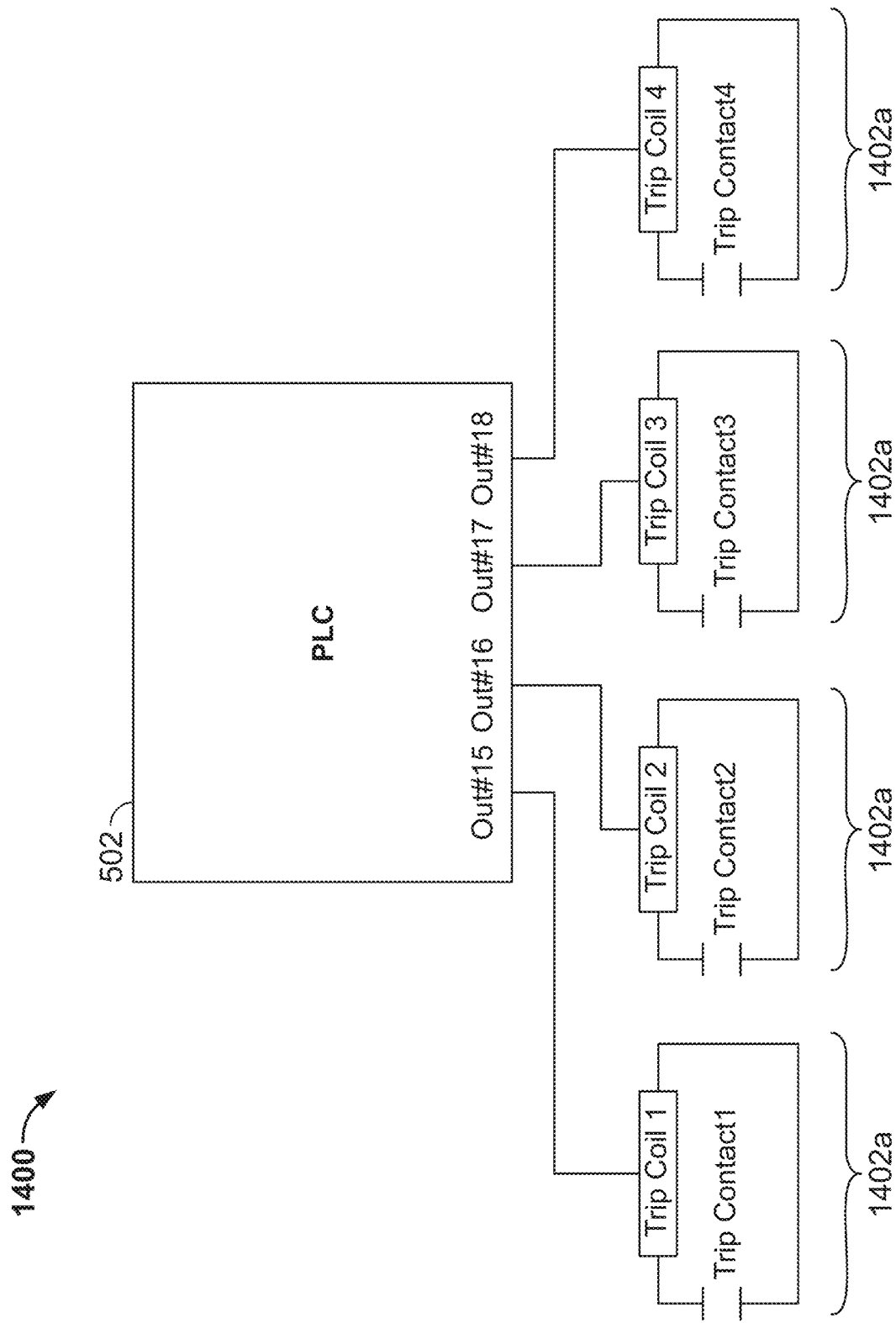
FIG. 14 is a schematic wiring diagram for a programmable logic controller (PLC) with trip coils in accordance with embodiments of the present disclosure.

From reliability perspective, the four grids 702*a,b*, 704*a,b* are connected to the power transformers (T-01) 1306, (T-02) 1308 in cross way as is shown in FIG. 7 and in the wiring diagrams 13A-13B. The left lower grid 704*b* and right upper grid 704*a* are fed by T-01 1306, where the right lower grid 702*b* and left upper grid 702*a* are fed by T-02 1308. In case one of the two transformers is tripped, the oil separation by electrical shock will occur at two sides of the vessel. Also, each one of these transformers 1306, 1308 can feed the power to all four grids 702*a,b*, 704*a,b*, in case if one of two transformers is tripped as shown in the wiring diagrams 13A-13B. Since central PLC 502 knows that there is a technical issue in one of the two transformers, it will energize one of the switching coils (Trip #1, 2, 3 and 4) through sending a signal with value 1 from one of the output pins Out #15, 16, 17 and 18 as is shown in the below circuit. Also, the table of FIG. 15 explains how these grids are connected to the power transformers T-01 1306 & T-02 1308 in normal and switching case. FIG. 14 is a schematic wiring diagram 1400 for a PLC 502 with trip coil circuits 1402*a-d*, in accordance with embodiments of the present disclosure.

Figure 16:
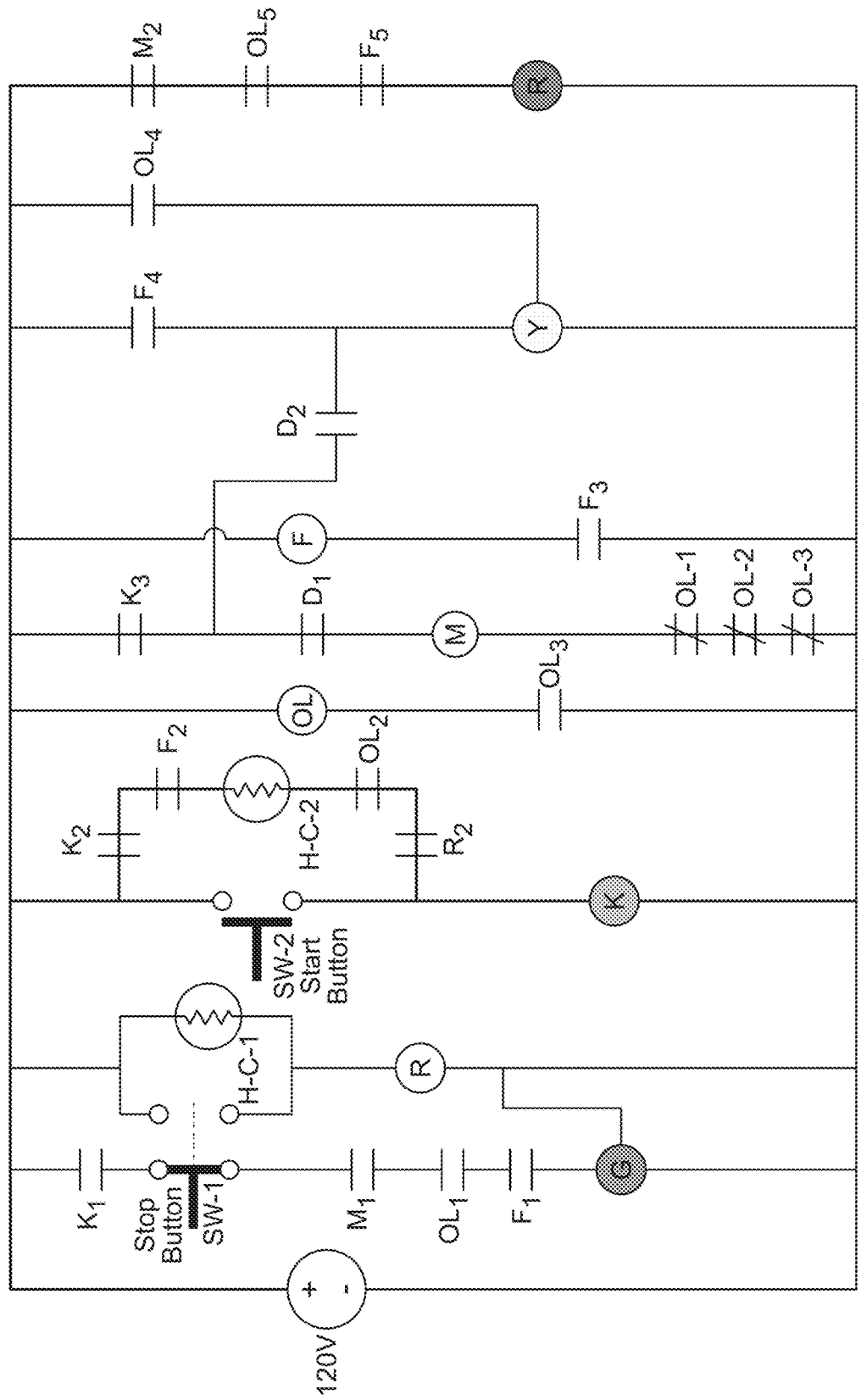
FIG. 16 is a schematic diagram of a control circuit for power transformer and grids in accordance with embodiments of the present disclosure.
Figure 18:
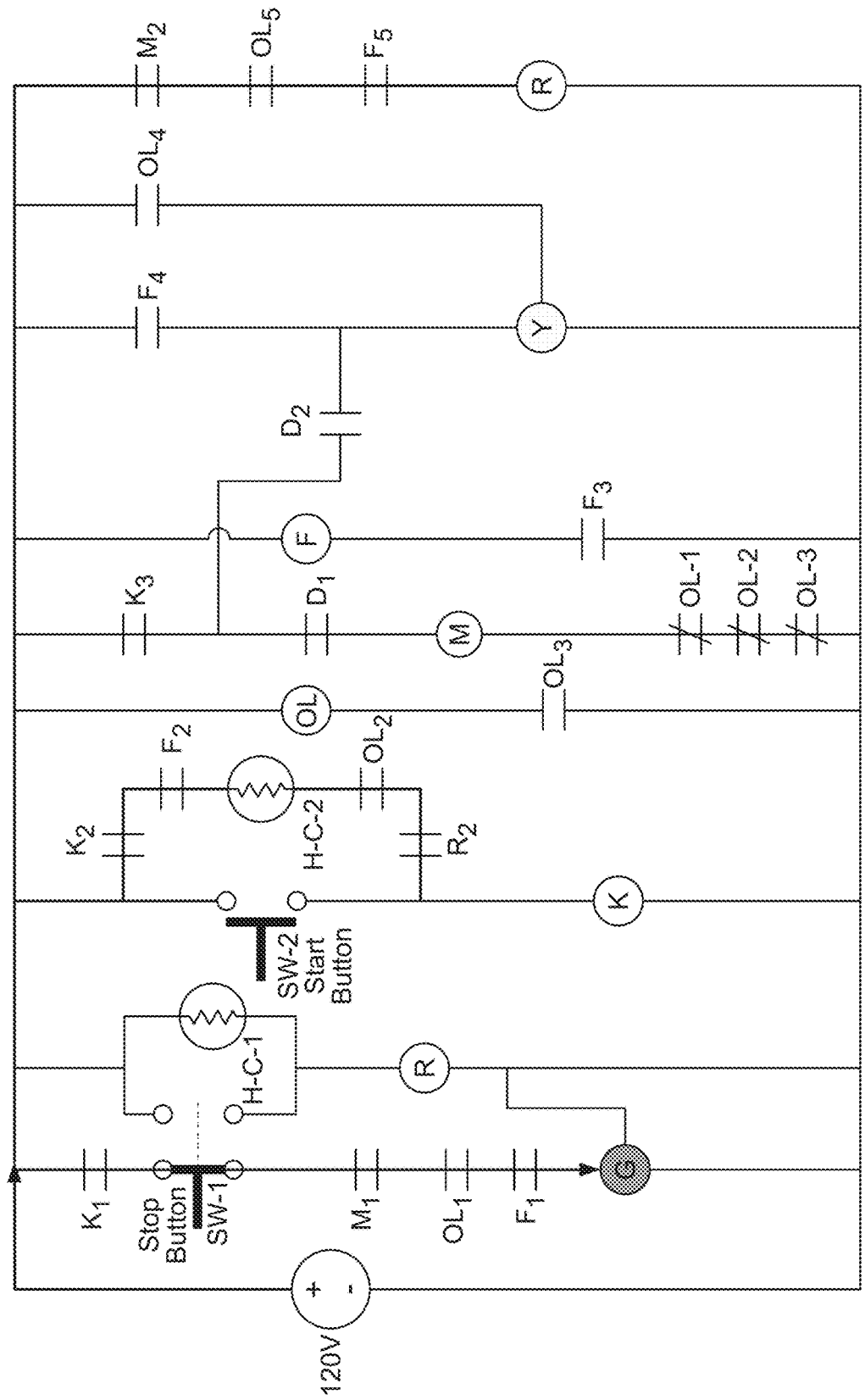
FIG. 18 is a schematic diagram of a control circuit for power transformer and grids in an OFF condition in accordance with embodiments of the present disclosure.
Figure 20:
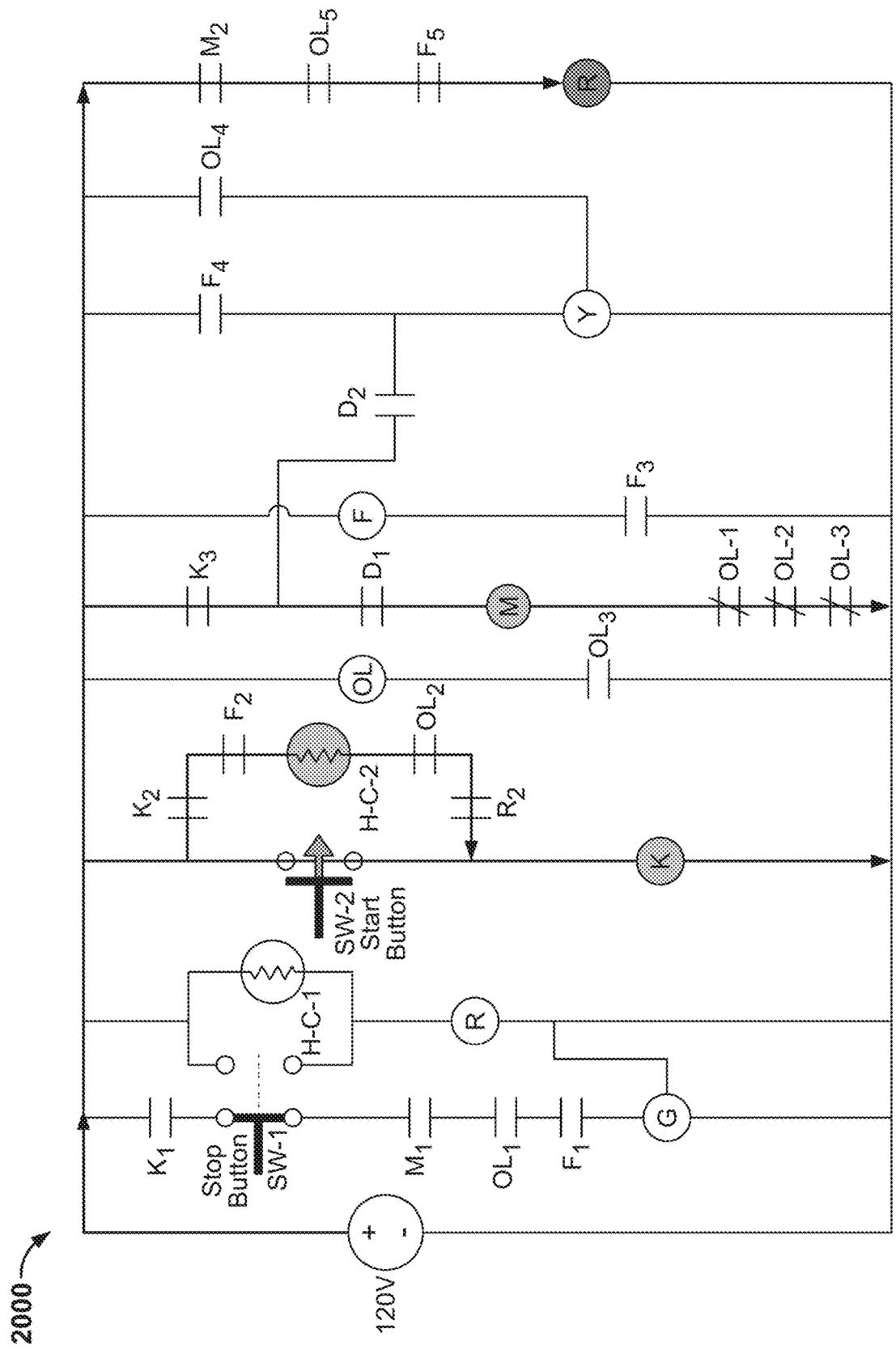
FIG. 20 is a schematic diagram of a control circuit for power transformer and grids in a START mode condition in accordance with embodiments of the present disclosure.
Figure 22:
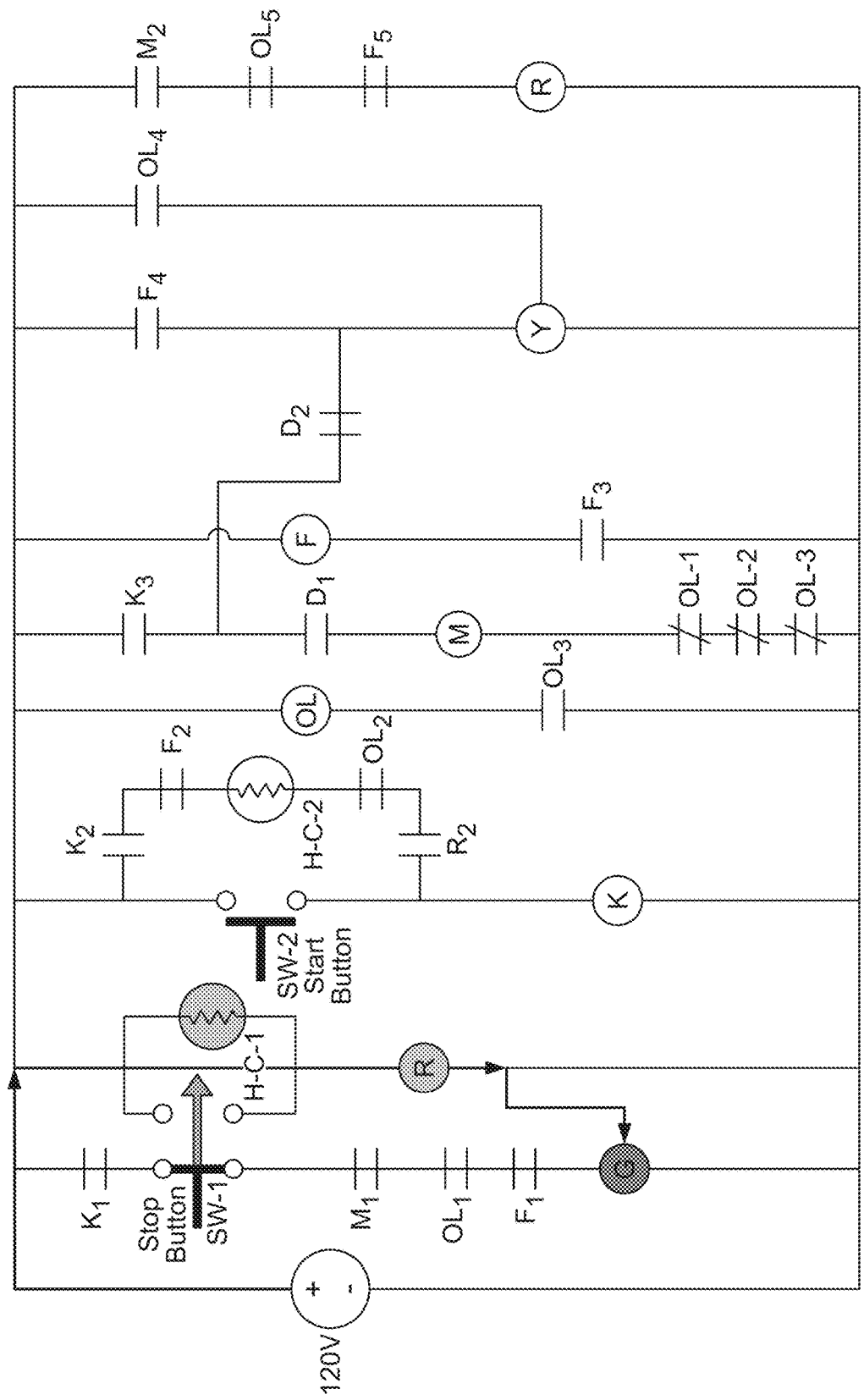
FIG. 22 is a schematic diagram of a control circuit for power transformer and grids in a STOP mode condition in accordance with embodiments of the present disclosure.
Figure 24:
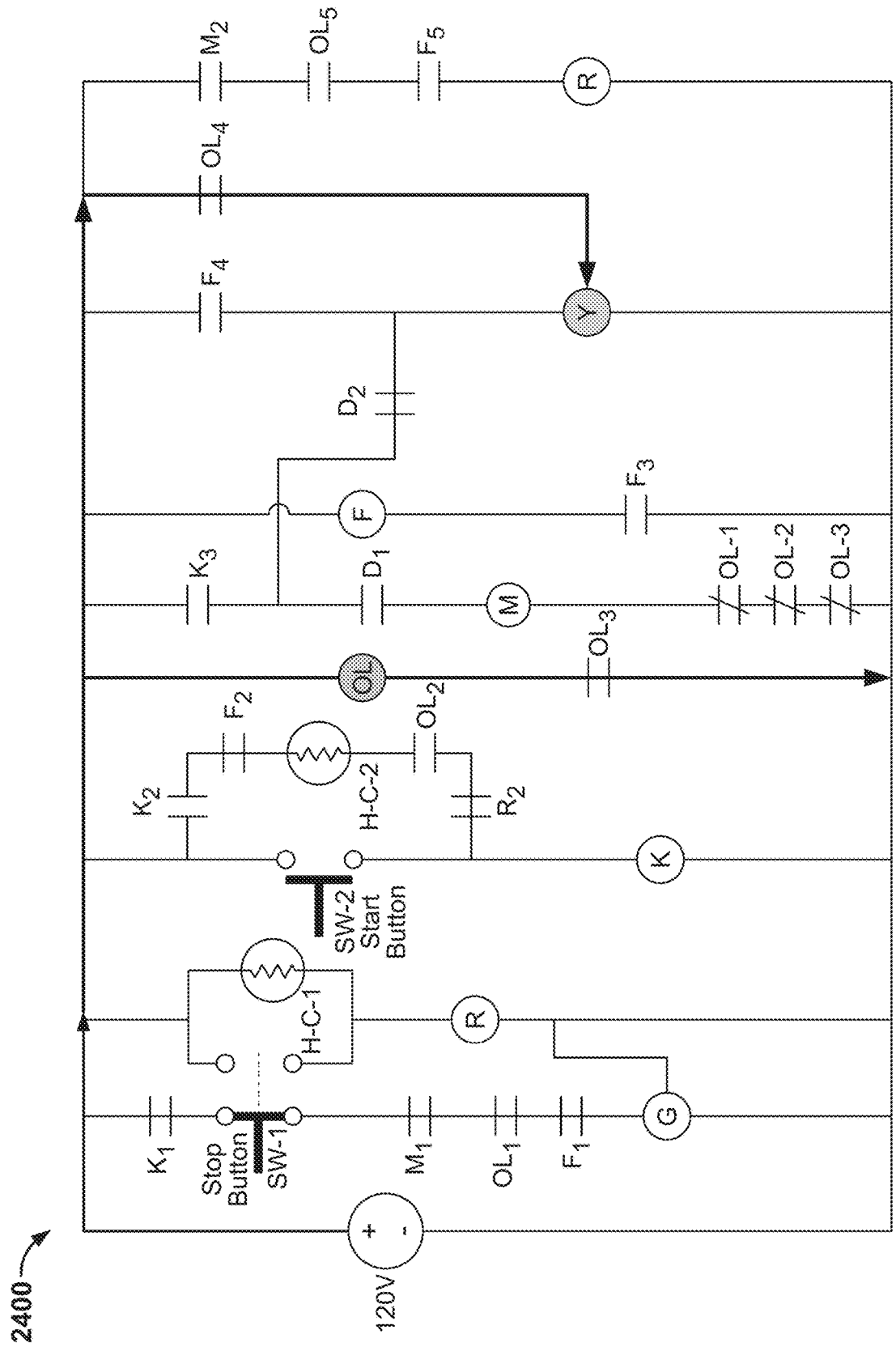
FIG. 24 is a schematic diagram of a control circuit for power transformer and grids in an OVERLOAD condition in accordance with embodiments of the present disclosure.
Figure 26:
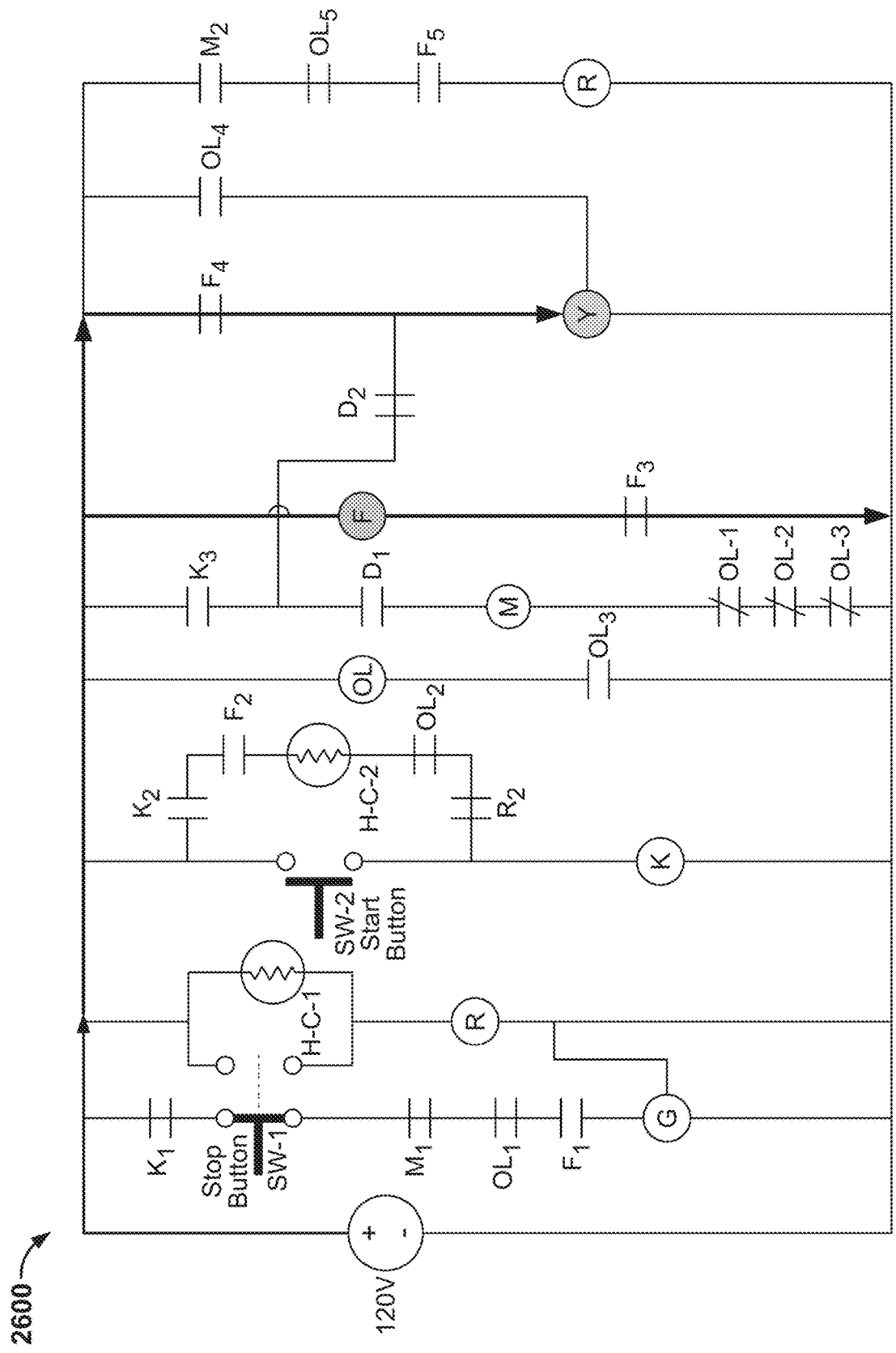
FIG. 26 is a schematic diagram of a control circuit for power transformer and grids in a FAULT/SHORT CIRCUIT condition in accordance with embodiments of the present disclosure.
Figure 28:
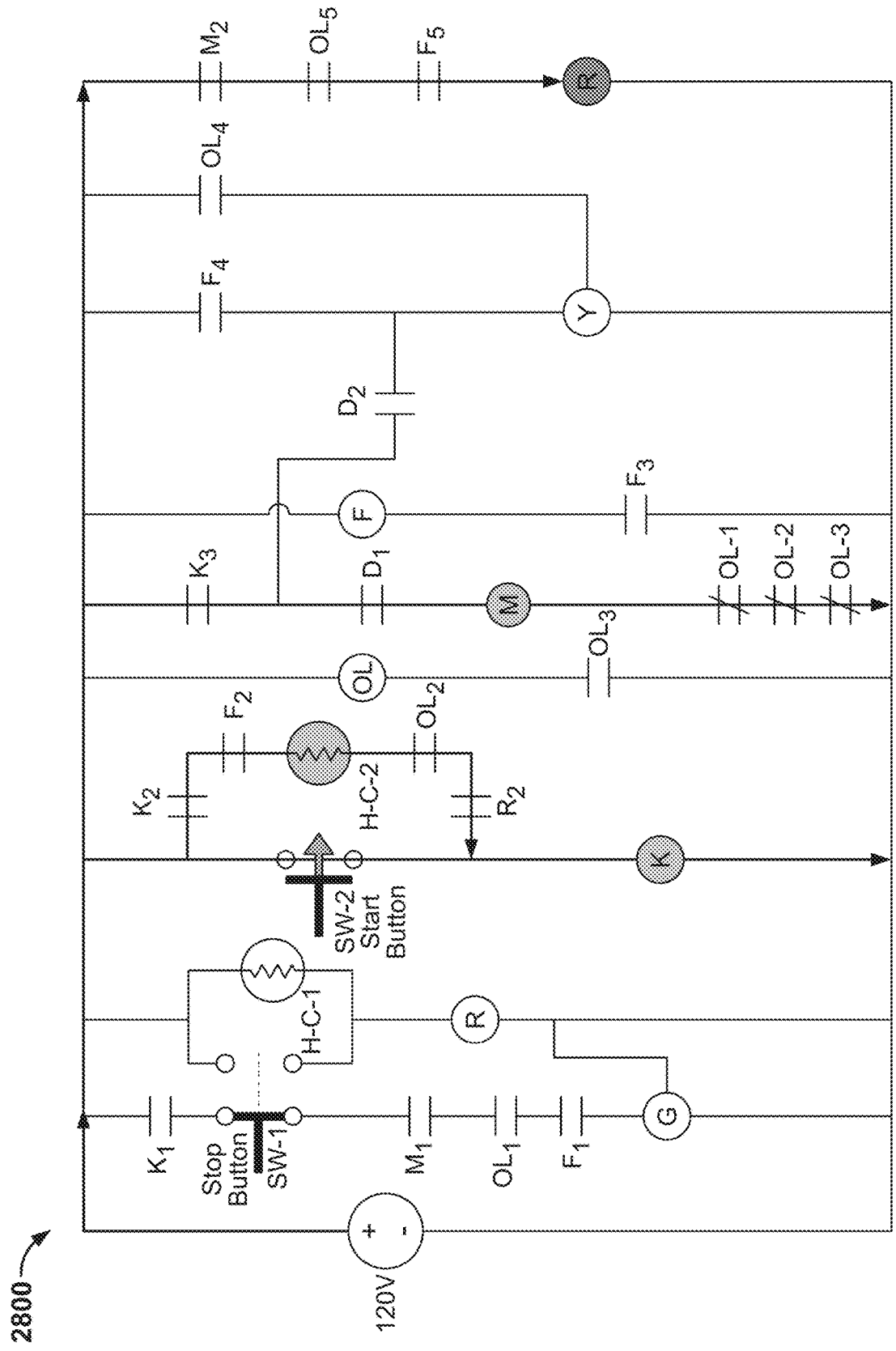
FIG. 28 is a schematic diagram of a control circuit for power transformer and grids after a FAULT/SHORT CIRCUIT condition is cleared in accordance with embodiments of the present disclosure.

FIG. 15 is a table mapping grid and power transformer connections in accordance with embodiments of the present disclosure. FIG. 16 is a schematic diagram of a control circuit for power transformer and grids in accordance with embodiments of the present disclosure. FIG. 17 is a diagram mapping the control circuit in an OFF condition in accordance with embodiments of the present disclosure. FIG. 18 is a schematic diagram of a control circuit for power transformer and grids in an OFF condition in accordance with embodiments of the present disclosure. FIG. 19 is a diagram mapping the control circuit in a START mode condition in accordance with embodiments of the present disclosure. FIG. 20 is a schematic diagram of a control circuit for power transformer and grids in a START mode condition in accordance with embodiments of the present disclosure. FIG. 21 is a diagram mapping the control circuit in a STOP mode condition in accordance with embodiments of the present disclosure. FIG. 22 is a schematic diagram of a control circuit for power transformer and grids in a STOP mode condition in accordance with embodiments of the present disclosure. FIG. 23 is a diagram mapping the control circuit in an OVERLOAD condition in accordance with embodiments of the present disclosure. FIG. 24 is a schematic diagram of a control circuit for power transformer and grids in an OVERLOAD condition in accordance with embodiments of the present disclosure. FIG. 25 is a diagram mapping the control circuit in a FAULT/SHORT CIRCUIT condition in accordance with embodiments of the present disclosure. FIG. 26 is a schematic diagram of a control circuit for power transformer and grids in a FAULT/SHORT CIRCUIT condition in accordance with embodiments of the present disclosure. FIG. 27 is a diagram mapping the control circuit in after a FAULT/SHORT CIRCUIT condition is cleared in accordance with embodiments of the present disclosure. FIG. 28 is a schematic diagram of a control circuit for power transformer and grids after a FAULT/SHORT CIRCUIT condition is cleared in accordance with embodiments of the present disclosure.

The control circuit 1600 includes two switch buttons for start and stop and also has multiple of the coils and contacts. Some of these contacts are normally opened and some of them are normally closed. The purpose of the circuit to monitor and control the power circuit in the wiring diagram FIGS. 13A-13B, and shows the condition of the system including the power transformers and the grids if they are in the service or not or if they have some technical issues. The control circuit 1600 has 3 types of indication lights green, red and yellow. The green light means the system is in the off mode for doing the preventive maintenance activities (PM) and the red light means the system is in then service without any technical issue. The yellow light means the system in the trip mode for having a technical issue either for an overload or for a short circuit. The coil which is responsible for an overload trip is OL and its contacts are OL1, 2, 3, 4& 5 and OL-1.2 & 3. Once this coil is energized, the yellow light will be shown in the LCD as an alarm indication with specifying the type of the trip which is overload trip. The coil which is responsible for a short circuit/fault trip is F and its contacts are F1, 2, 3, 4, and 5. Once this coil is energized, the yellow light will be shown in the LCD as an alarm indication with specifying the type of the trip which is Fault/short circuit trip. For D contacts D1 and D2, their coil (D) is connected directly to central PLC and which was explained in the wiring diagram FIGS. 13A-13B. The coil D when it energized, it means the system is in the service. The control circuit is needed a DC voltage to operate it and its value usually is 120V. Tables of FIGS. 17, 19, 21, 23, 25, and 27 show there 6 cases system conditions:

OFF Mode
Start Mode
Stop Mode
Overload Trip
Fault/Short circuit Trip
After Fault cleaned Each one of above condition is explained in detail in the tables corresponding to the control circuit diagrams, and each one of these tables is shown with a control circuit diagram with an indicated path of the electrical power in the circuit elements.

Figure 29:
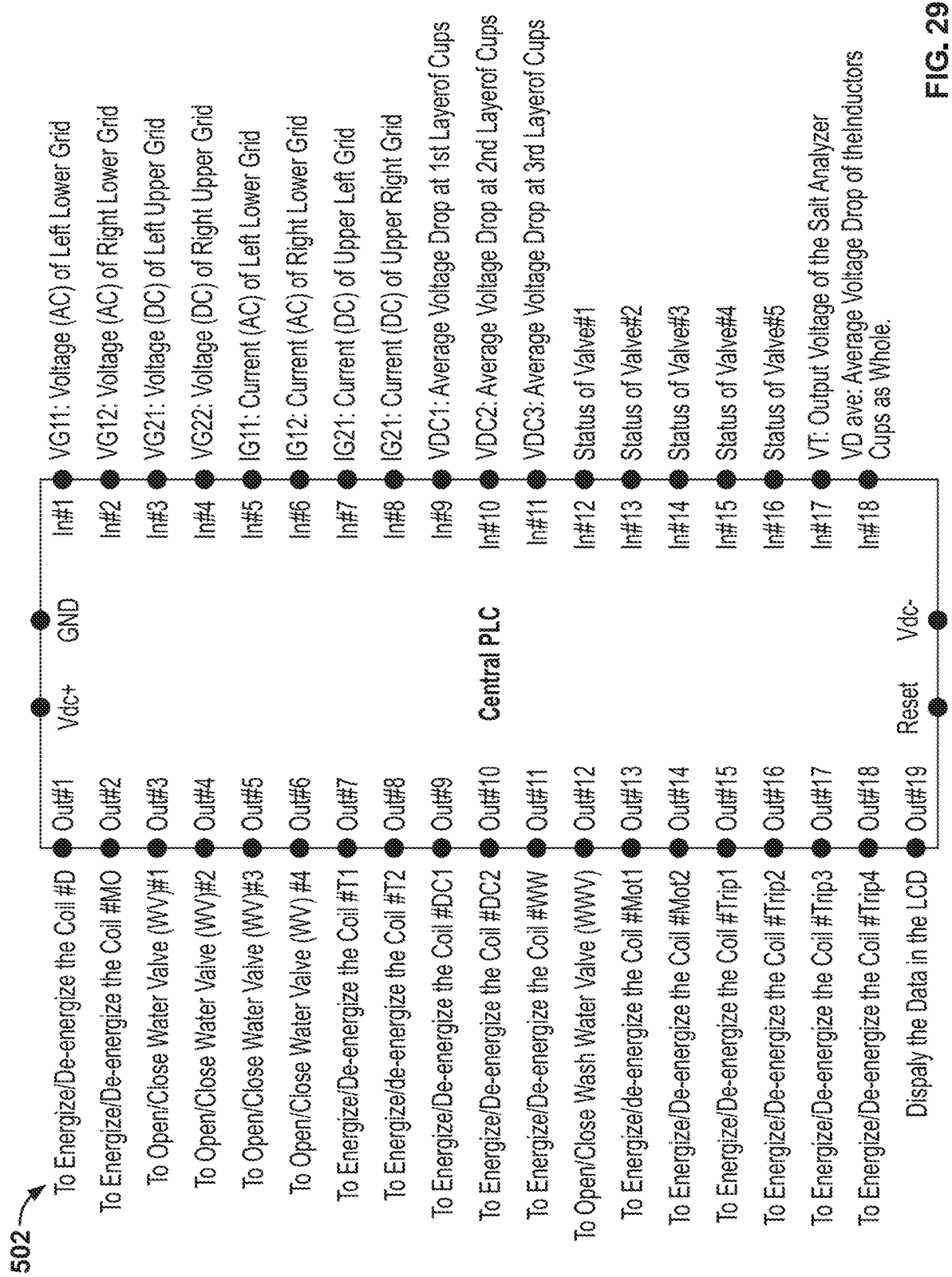
FIG. 29 is a schematic diagram of example programmable logic controller inputs and outputs in accordance with embodiments of the present disclosure.

FIG. 29 is a schematic diagram of example programmable logic controller 502 and inputs and outputs in accordance with embodiments of the present disclosure. A programmable logic controller (PLC) or programmable controller is a hardware computing device that has been adapted for the control of various processes that rely on high reliability, ease of programming, and process fault diagnosis. PLC 502 can be a small modular device that includes tens of I/Os. For example, PLC 502 includes 19 outputs and 18 inputs, as well as power inputs, and reset inputs.

FIG. 30 is a diagram mapping the relationship between salt in crude readings and water discharge values in accordance with embodiments of the present disclosure. $VT=VM-119.99672V$ where VM is measured voltage $$VT=(VT1+VT2+VT3+VT4+VT5+VT6+VT7+VT8+VT9+VT10+VT11+VT12)/12$$

FIG. 31 is a table describing the values of the programmable logic controller during operations in accordance with embodiments of the present disclosure.

FIG. 32 is a table describing accepted values of voltages and currents for electrostatic grids in accordance with embodiments of the present disclosure.

FIGS. 33A-33B are diagrams mapping the relationship between the grids and the stepper motors in accordance with embodiments of the present disclosure. V Inductor Cups for n layer=$VM-119.99672V$ where Vm value measured in the cups and n is the number of rank layers. V Inductor Cups Layers average=$(V1+V2+V3)/3$ FIG. 34 is a diagram mapping the relationship between the stepper motors and the smart inductor cups in accordance with embodiments of the present disclosure.

Figure 35A:
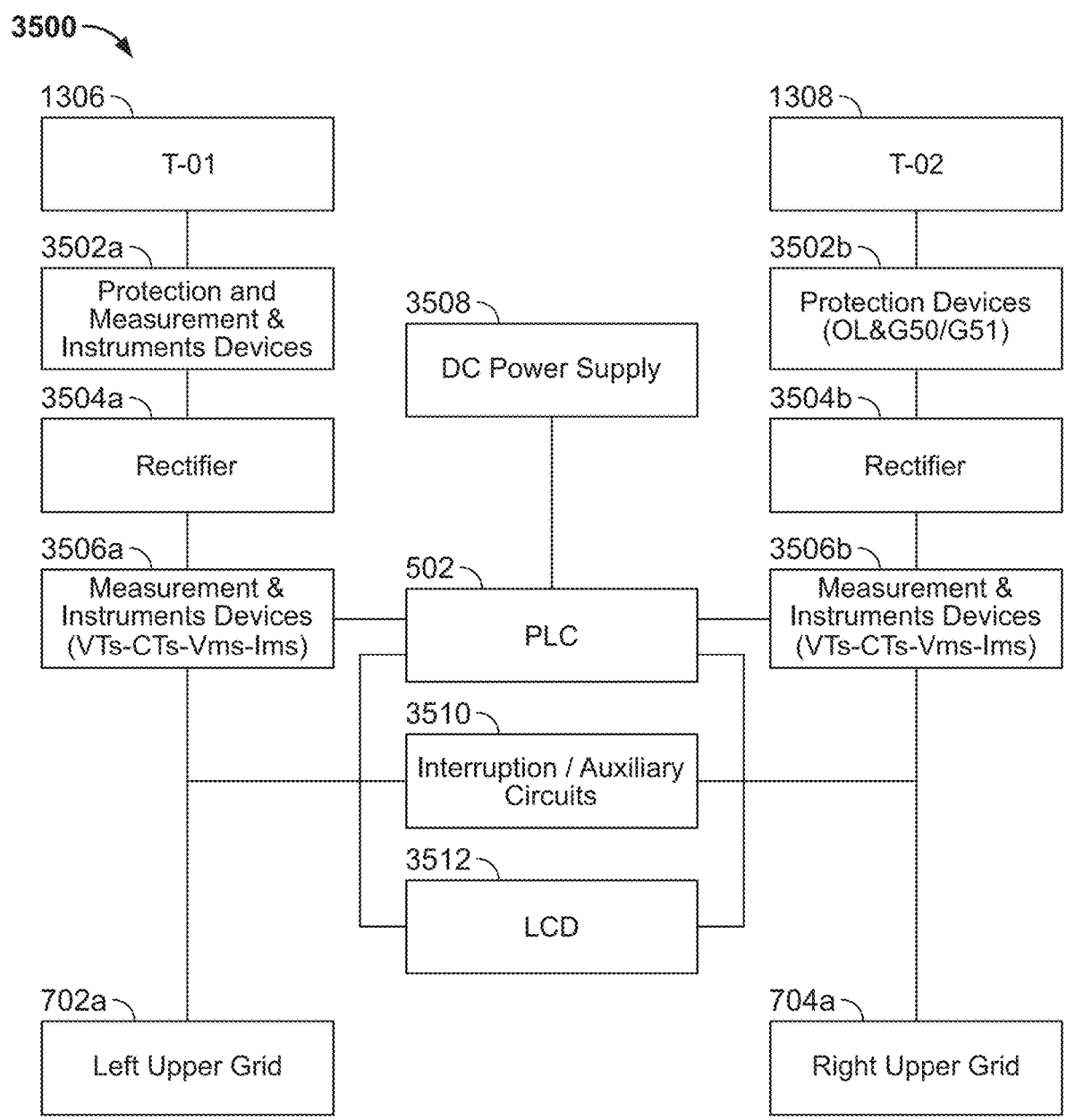
FIG. 35A is a schematic diagram of a protection circuit flowchart for transformers of the upper grids in accordance with embodiments of the present disclosure.
Figure 35B:
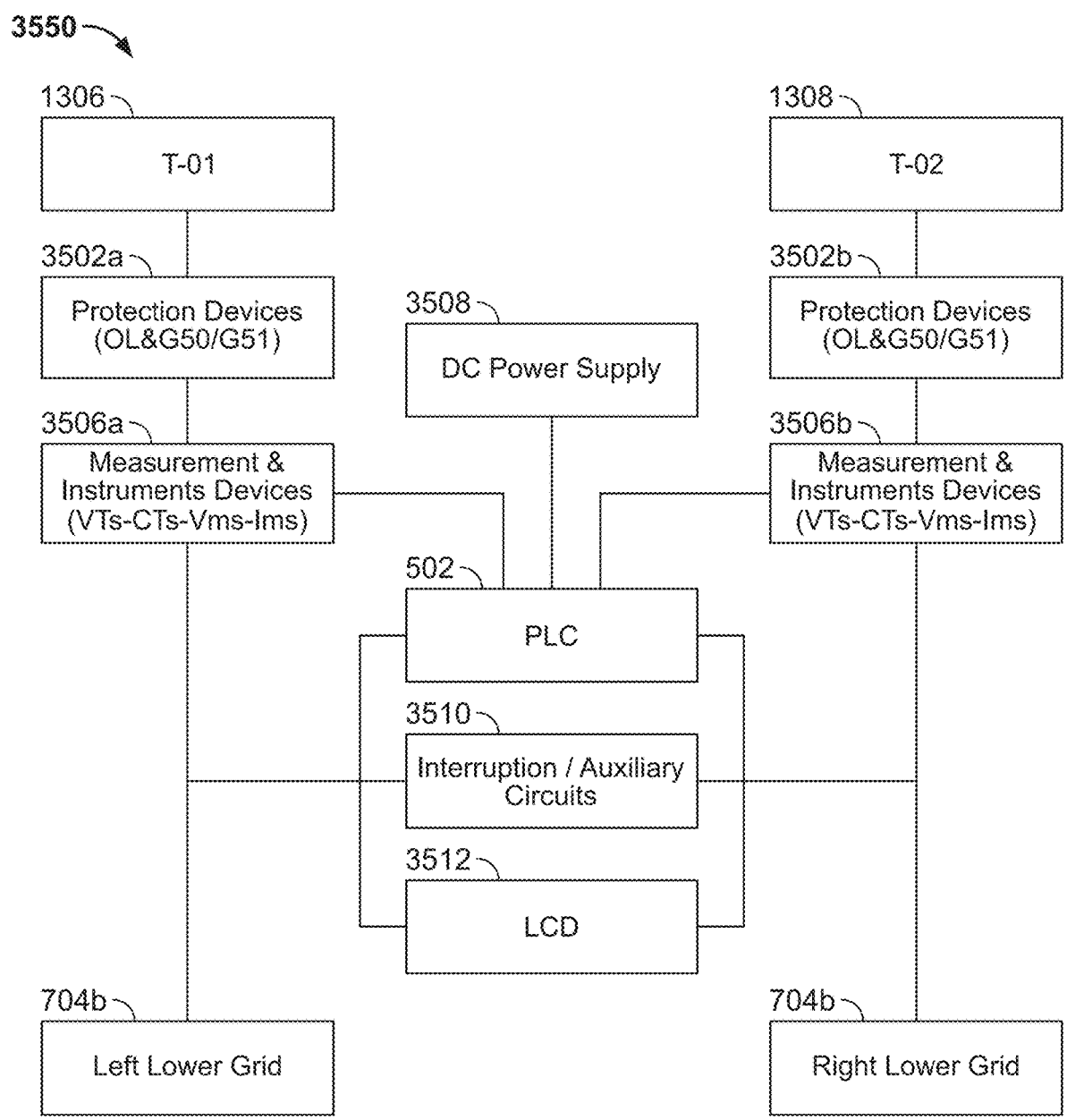
FIG. 35B is a schematic diagram of a protection circuit flowchart for transformers of the lower grids in accordance with embodiments of the present disclosure.

FIG. 35A is a schematic diagram of a protection circuit flowchart 3500 for transformers of the upper grids in accordance with embodiments of the present disclosure. FIG. 35B is a schematic diagram of a protection circuit flowchart 3550 for transformers of the lower grids in accordance with embodiments of the present disclosure. As described above, transformer T-01 1306 and T-02 1308 can provide power to the grids 702a,b and 704a,b. For the upper grids (FIG. 35A), the transformer T-01 1306 can be coupled to a protection and measurement circuitry 3502a. A rectifier 3504a can be used to convert the AC into DC for the grid voltage. Measurement devices 3506a can be used to measure VT and other electrical values on the left upper grid 702a. For the upper grids (FIG. 35A), the transformer T-02 1308 can be coupled to a protection and measurement circuitry 3502b. A rectifier 3504b can be used to convert the AC into DC for the grid voltage. Measurement devices 3506b can be used to measure VT and other electrical values on the right upper grid 702b. The PLC 502 can control operations and read data. DC power supply 3508 can provide power to the PLC 502. Interruption and auxiliary circuits 3510 can be used. LCD 3512 can be used as a display. For the lower grids (FIG. 35B), a similar structure can be used, but no rectifiers are needed.

Figure 36:
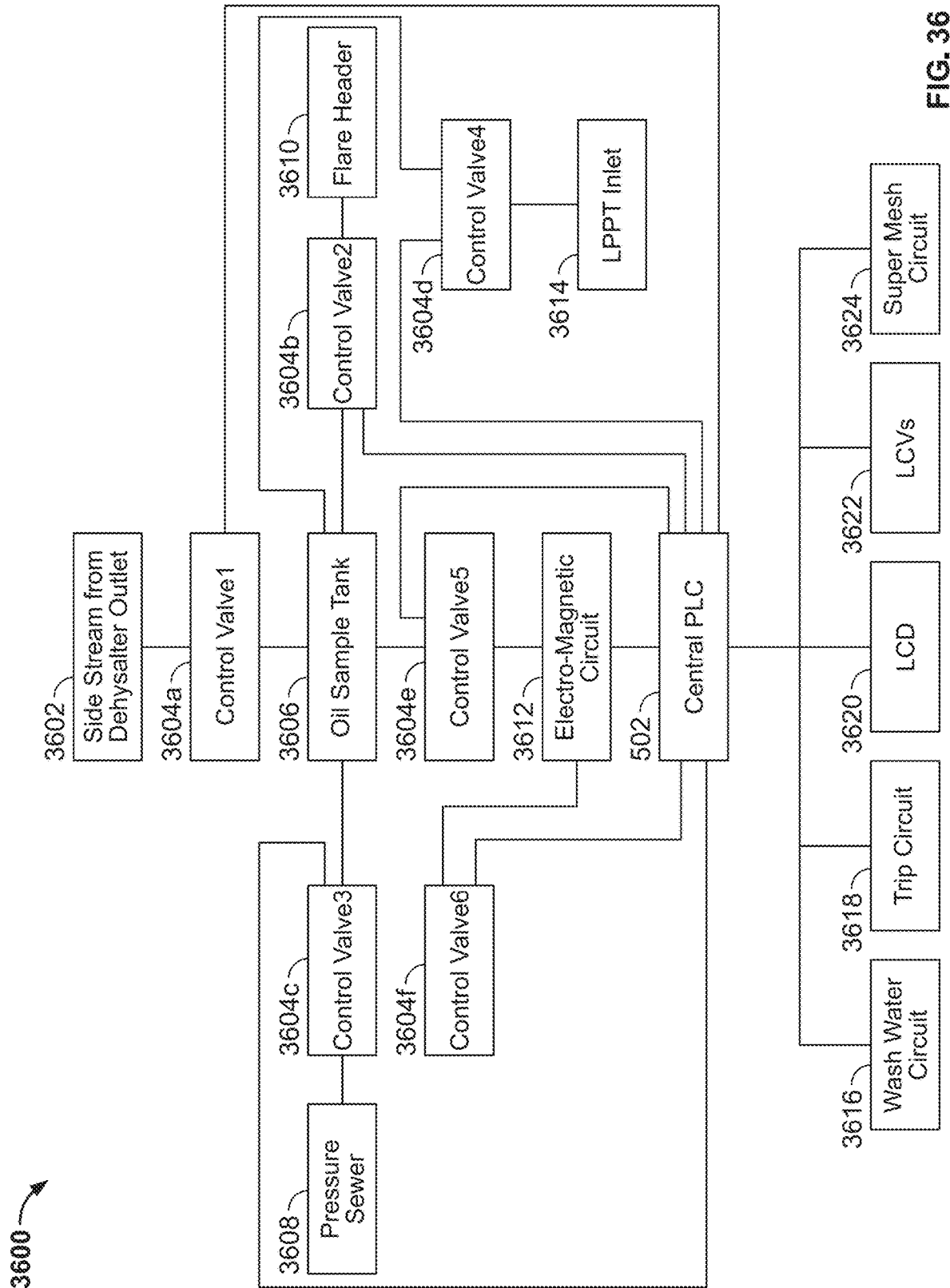
FIG. 36 is a schematic diagram of a smart salt inductor flowchart in accordance with embodiments of the present disclosure.

FIG. 36 is a schematic diagram of a smart salt inductor flowchart 3600 in accordance with embodiments of the present disclosure. The central PLC 502 can receive inputs from various devices and provide control outputs. For example, PLC 502 can control the control valves 1-6 3604a-f. Control valve 1 3604a controls side stream from dehysalter outlet 3602 and oil sample tank 3606. Control valve 2 3604b controls flare header 3610 and oil sample tank 3606. Control valve 3 3604c controls pressure sewer 3608 and oil sample tank 3606. Control valve 4 3604d controls LPPT inlet 3614 and oil sample tank 3606. Control valve 5 controls oil sample tank 3606 and electromagnetic circuit 3612. Control valve 6 controls pressure sewer 3608 and electromagnetic circuit 3612.

PLC 502 also can provide inputs to or receive input from wash water circuit 3616, trip circuit 3618, LCD 3620, LCVs 3622, and super mesh circuit 3624.

Figure 37:
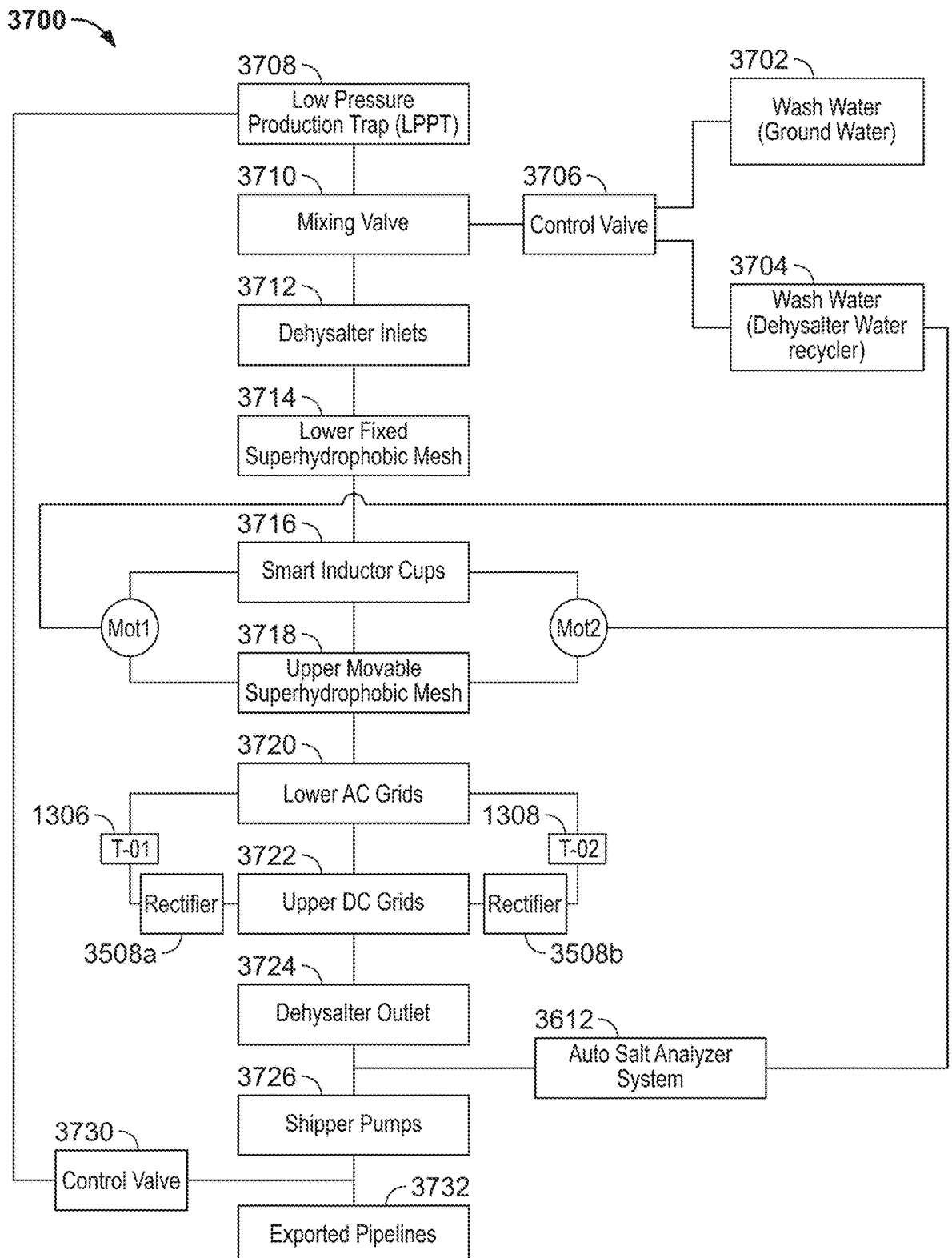
FIG. 37 is a schematic diagram of a dehysalter operational flowchart in accordance with embodiments of the present disclosure.

FIG. 37 is a schematic diagram of a dehysalter operational flowchart 3700 in accordance with embodiments of the present disclosure. Flowchart 3700 illustrates various components from top to bottom in order of operation. For example, crude can be introduced into mixing valve 3710 from LPPT 3708. The crude can be mixed with wash water from ground water 3702 or wash water from dehysalter water recycler 3704 through control valve 3706. The crude then enters the vessel 101 via dehysalter inlets 3712. The crude first encounters the lower fixed super-hydrophobic mesh 3714. Then the crude (with less water) encounters smart inductor cups 3716, which measures the amount of water in the crude and can control MOT1 and MOT2 to rotate upper movable super-hydrophobic mesh 3718 accordingly. The crude (with yet less water) can then encounter the lower electrified grids 3720 (which can be AC biased). Then, the crude encounters the upper grids 3722 (which can be DC biased). The transformers T-01 1306 and T-02 1308 can be used to supply power to the grids. The oil then exits the vessel 101 through the dehysalter outlet 3724. The auto salt analyzer system 3612 can measure the salt content in the oil that exits the dehysalter outlet 3724. Depending on the salt content, the oil can either be reintroduced into the vessel by control valve 3730 from shipper pumps 3726. Or the oil can be moved to pipelines 3732.

Figure 38:
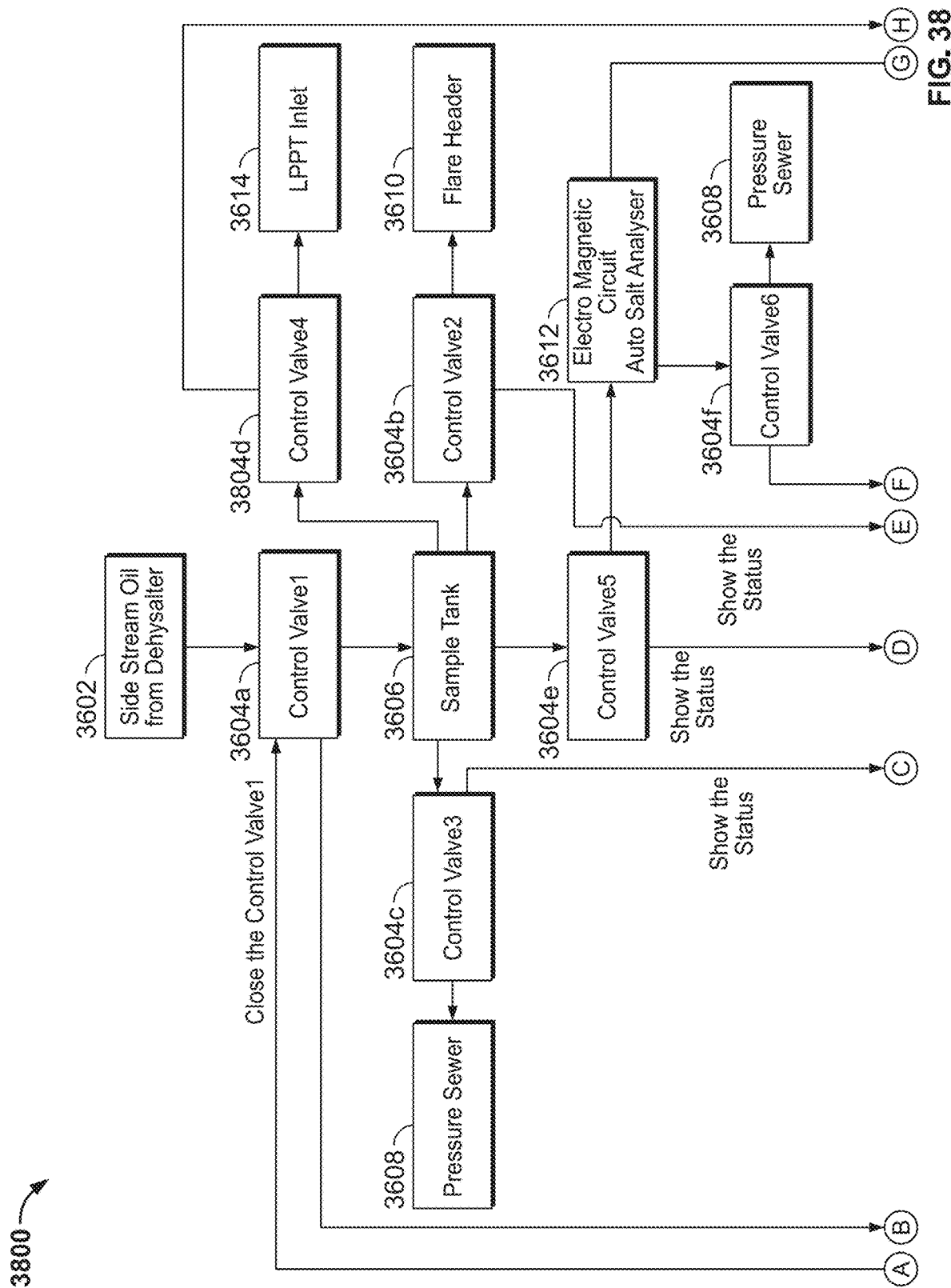
FIG. 38 is a schematic diagram of a programmable logic controller decision making flowchart for salt in crude analysis in accordance with embodiments of the present disclosure.
Figure 38:
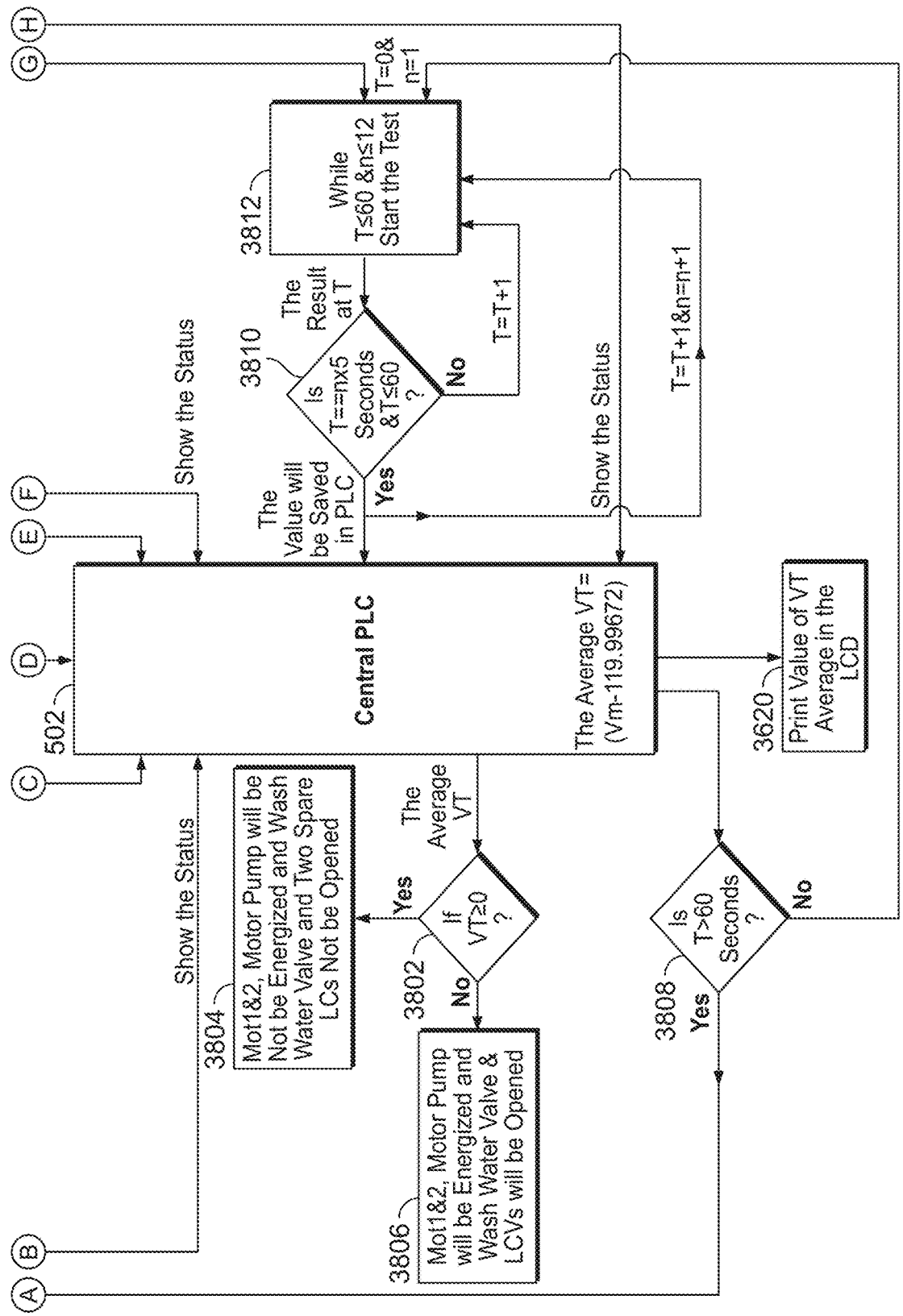

FIG. 38 is a schematic diagram of a programmable logic controller decision making flowchart 3800 for salt in crude analysis in accordance with embodiments of the present disclosure. The oil output from the dehysalter 100 can be analyzed by the auto salt analyzer 3612. Within some time period (e.g., T<=60 and n<=12), start the test 3812. For some period of time, the oil is tested using the auto salt analyzer circuitry 3612. The oil is tested for some period of time, as shown in 3810. E.g., after T=5×n seconds and T<=60 seconds, end the test. The value of Vt is stored in the PLC 502. The average Vt being greater than zero means that the MOT1 and MOT2 pump will not be energized, and wash water valve and two space LCVs will not be opened 3804 (thus, no dilution is added to the crude oil). If Vt is not greater than or equal to zero, then MOT1 and MOT2 will be energized, and wash water valve and LCVs will be opened 3806 to add water dilution to the crude.

If the average value of $Vt=(Vm-199.99672)$, and T>60s, then close control valve 1 (3808). If the average value of $Vt=(Vm-199.99672)$, and T<=60s, then restart or continue the salt analysis (3808).

The average value of Vt can be displayed on the display 3620.

Figure 39:
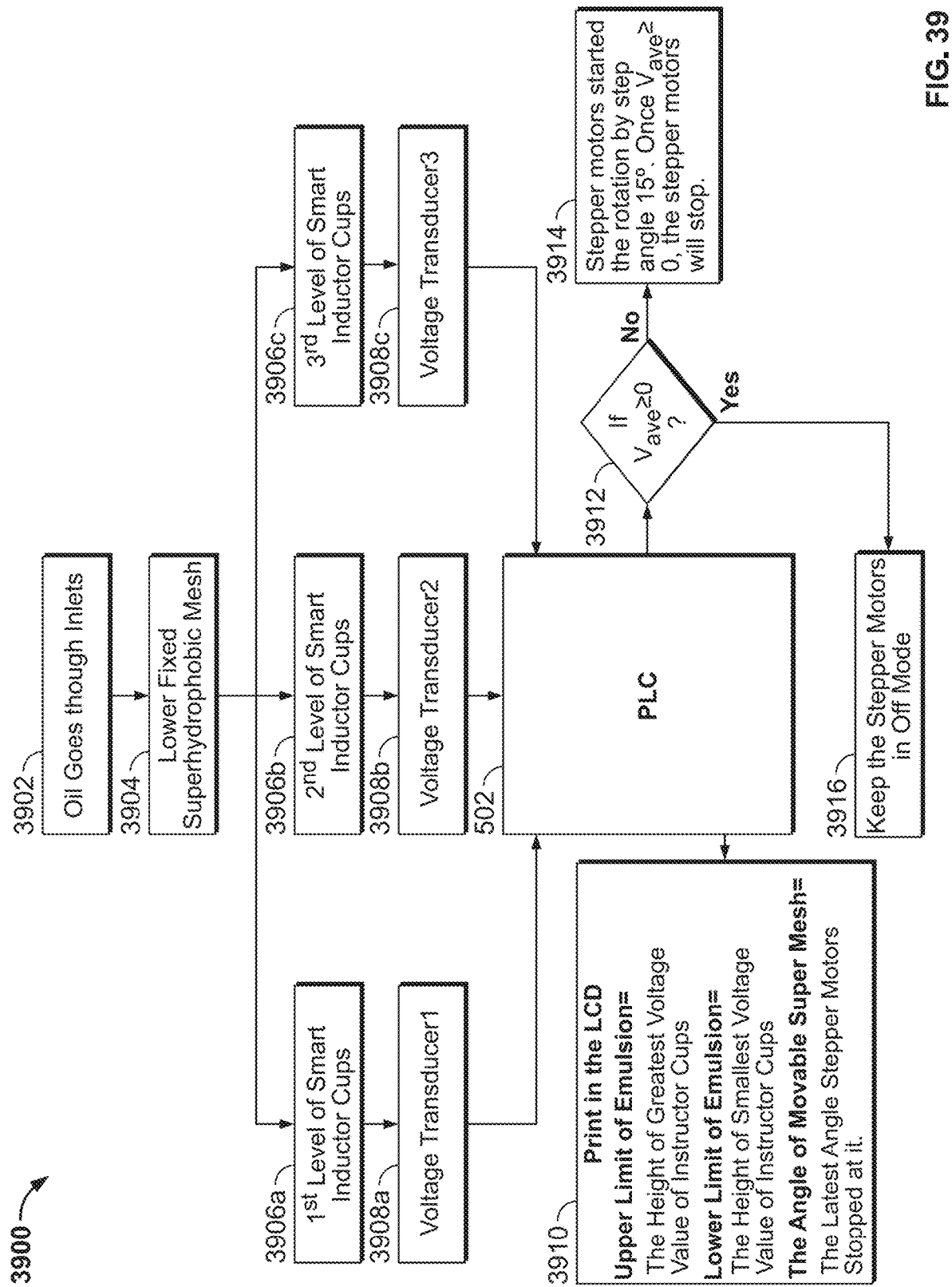
FIG. 39 is a schematic diagram of a programmable logic controller decision making flowchart for smart inductor cups in accordance with embodiments of the present disclosure.

FIG. 39 is a schematic diagram of a programmable logic controller decision making flowchart 3900 for smart inductor cups in accordance with embodiments of the present disclosure. The oil goes through the dehysalter inlets 3902, and contacts the fixed super-hydrophobic mesh (3904). As the oil contacts the first level of smart inductor cups 3906a, the electrical response is converted into a voltage by voltage transducer 3908a, and fed into the PLC 502. As the oil contacts the second level of smart inductor cups 3906b, the electrical response is converted into a voltage by voltage transducer 3908b, and fed into the PLC 502. As the oil contacts the third level of smart inductor cups 3906c, the electrical response is converted into a voltage by voltage transducer 3908c, and fed into the PLC 502. If Vavg>=0 (3912), then the stepper motors are kept in the offline mode (3916). If the Vavg is not >=0 (3912), then the stepper motors rotate the movable super-hydrophobic mesh by 15 degrees. Once Vavg>=0, then the stepper motors maintain the angle of the mesh. In the LCD 3910, display the upper limit of the emulsion (the height of the greatest voltage value of the inductor cups); the lower limit of emulsion (the height of the smallest voltage of the inductor cups); and the angle of the movable super-hydrophobic mesh (the last angle stepper motors stopped at).

FIG. 40 is a schematic diagram of an example transformer interface panel 4000 in accordance with embodiments of the present disclosure. The transformer interface panel 4000 provides an example of what the transformer interface indication information can provide to an operator. For example, the transformer interface panel 4000 can include a transformers status panel 4002 that shows the status of transformers T-01 and T-02. Transformers T-01 and T-02 can have an ON mode, OFF mode, and TRIP mode.

The transformer interface panel 4000 can also include smart inductor cup status indicator 4004, which shows the status of each layer of smart inductor cups, such as smart inductor cups 308. The voltage status of each layer of inductor cups can be shown individually, as well as the average voltage from all three layers of inductor cups. The transformer interface panel can also provide an "ON Spec" and "OFF Spec" indicator, which can be based on the average voltage from all three inductor cup layers.

The transformer interface panel 4000 can also include system alarms 4006. System alarms 4006 can provide a textual indication of one or more alarms for the system. Such alarms can include faults, circuit breaker trips or other electrical issues, wash water low levels, flare issues and danger alarms, etc.

The transformer interface panel 4000 can also include upper mesh and auto-salt analyzer status 4008. The upper mesh are controlled by stepper motors, and each stepper motor can include indicators for its status. The upper mesh angle(s) can also be indicated. The auto salt analyzer can also include indicators for "ON Spec" and "OFF Spec" for salt in crude levels.

The transformer interface panel 4000 can also include lower grids status 4010 and upper grids status 4012. The transformer interface panel 4000 can also include status indicators for grid transformers 4014.

Figure 41:
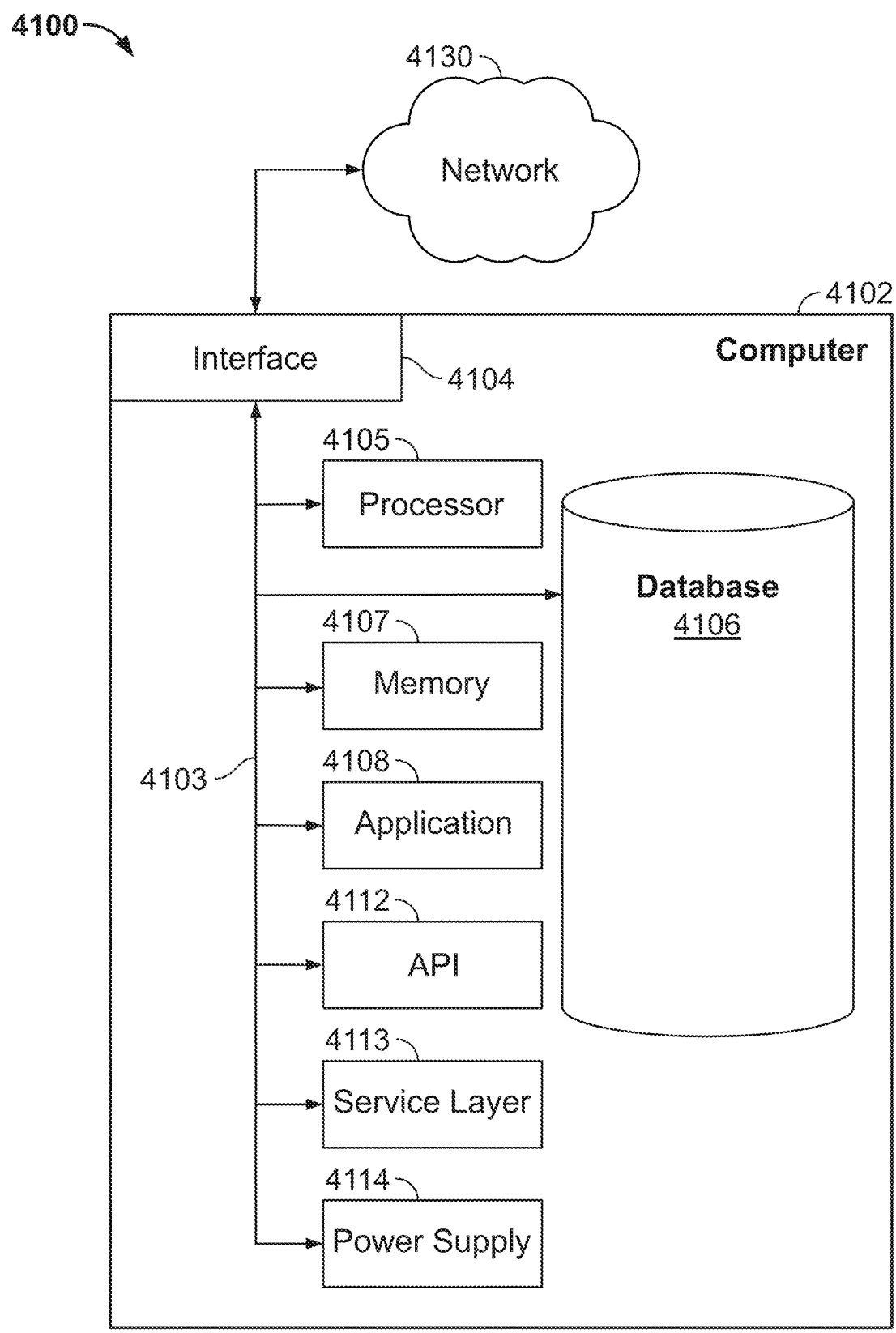
FIG. 41 is a block diagram illustrating an example computer system used to provide computational functionalities associated with described algorithms, methods, functions, processes, flows, and procedures as described in the present disclosure, according to some implementations of the present disclosure.

FIG. 41 is a block diagram of an example computer system 4100 used to provide computational functionalities associated with described algorithms, methods, functions, processes, flows, and procedures described in the present disclosure, according to some implementations of the present disclosure. The illustrated computer 4102 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 4102 can include input devices such as keypads, keyboards, and touch screens that can accept user information. Also, the computer 4102 can include output devices that can convey information associated with the operation of the computer 4102. The information can include digital data, visual data, audio information, or a combination of information. The information can be presented in a graphical user interface (UI) (or GUI).

The computer 4102 can serve in a role as a client, a network component, a server, a database, a persistency, or components of a computer system for performing the subject matter described in the present disclosure. The illustrated computer 4102 is communicably coupled with a network 4130. In some implementations, one or more components of the computer 4102 can be configured to operate within different environments, including cloud-computing-based environments, local environments, global environments, and combinations of environments.

At a top level, the computer 4102 is an electronic computing device operable to receive, transmit, process, store, and manage data and information associated with the described subject matter. According to some implementations, the computer 4102 can also include, or be communicably coupled with, an application server, an email server, a web server, a caching server, a streaming data server, or a combination of servers.

The computer 4102 can receive requests over network 4130 from a client application (for example, executing on another computer 4102). The computer 4102 can respond to the received requests by processing the received requests using software applications. Requests can also be sent to the computer 4102 from internal users (for example, from a command console), external (or third) parties, automated applications, entities, individuals, systems, and computers.

Each of the components of the computer 4102 can communicate using a system bus 4103. In some implementations, any or all of the components of the computer 4102, including hardware or software components, can interface with each other or the interface 4104 (or a combination of both) over the system bus 4103. Interfaces can use an application programming interface (API) 4112, a service layer 4113, or a combination of the API 4112 and service layer 4113. The API 4112 can include specifications for routines, data structures, and object classes. The API 4112 can be either computer-language independent or dependent. The API 4112 can refer to a complete interface, a single function, or a set of APIs.

The service layer 4113 can provide software services to the computer 4102 and other components (whether illustrated or not) that are communicably coupled to the computer 4102. The functionality of the computer 4102 can be accessible for all service consumers using this service layer. Software services, such as those provided by the service layer 4113, can provide reusable, defined functionalities through a defined interface. For example, the interface can be software written in JAVA, C++, or a language providing data in extensible markup language (XML) format. While illustrated as an integrated component of the computer 4102, in alternative implementations, the API 4112 or the service layer 4113 can be stand-alone components in relation to other components of the computer 4102 and other components communicably coupled to the computer 4102. Moreover, any or all parts of the API 4112 or the service layer 4113 can be implemented as child or sub-modules of another software module, enterprise application, or hardware module without departing from the scope of the present disclosure.

The computer 4102 includes an interface 4104. Although illustrated as a single interface 4104 in FIG. 41, two or more interfaces 4104 can be used according to particular needs, desires, or particular implementations of the computer 4102 and the described functionality. The interface 4104 can be used by the computer 4102 for communicating with other systems that are connected to the network 4130 (whether illustrated or not) in a distributed environment. Generally, the interface 4104 can include, or be implemented using, logic encoded in software or hardware (or a combination of software and hardware) operable to communicate with the network 4130. More specifically, the interface 4104 can include software supporting one or more communication protocols associated with communications. As such, the network 4130 or the interface's hardware can be operable to communicate physical signals within and outside of the illustrated computer 4102.

The computer 4102 includes a processor 4105. Although illustrated as a single processor 4105 in FIG. 41, two or more processors 4105 can be used according to particular needs, desires, or particular implementations of the computer 4102 and the described functionality. Generally, the processor 4105 can execute instructions and can manipulate data to perform the operations of the computer 4102, including operations using algorithms, methods, functions, processes, flows, and procedures as described in the present disclosure.

The computer 4102 also includes a database 4106 that can hold data for the computer 4102 and other components connected to the network 4130 (whether illustrated or not). For example, database 4106 can be an in-memory, conventional, or a database storing data consistent with the present disclosure. In some implementations, database 4106 can be a combination of two or more different database types (for example, hybrid in-memory and conventional databases) according to particular needs, desires, or particular implementations of the computer 4102 and the described functionality. Although illustrated as a single database 4106 in FIG. 41, two or more databases (of the same, different, or combination of types) can be used according to particular needs, desires, or particular implementations of the computer 4102 and the described functionality. While database 4106 is illustrated as an internal component of the computer 4102, in alternative implementations, database 4106 can be external to the computer 4102.

The computer 4102 also includes a memory 4107 that can hold data for the computer 4102 or a combination of components connected to the network 4130 (whether illustrated or not). Memory 4107 can store any data consistent with the present disclosure. In some implementations, memory 4107 can be a combination of two or more different types of memory (for example, a combination of semiconductor and magnetic storage) according to particular needs, desires, or particular implementations of the computer 4102 and the described functionality. Although illustrated as a single memory 4107 in FIG. 41, two or more memories 4107 (of the same, different, or combination of types) can be used according to particular needs, desires, or particular implementations of the computer 4102 and the described functionality. While memory 4107 is illustrated as an internal component of the computer 4102, in alternative implementations, memory 4107 can be external to the computer 4102.

The application 4108 can be an algorithmic software engine providing functionality according to particular needs, desires, or particular implementations of the computer 4102 and the described functionality. For example, application 4108 can serve as one or more components, modules, or applications. Further, although illustrated as a single application 4108, the application 4108 can be implemented as multiple applications 4108 on the computer 4102. In addition, although illustrated as internal to the computer 4102, in alternative implementations, the application 4108 can be external to the computer 4102.

The computer 4102 can also include a power supply 4114. The power supply 4114 can include a rechargeable or non-rechargeable battery that can be configured to be either user- or non-user-replaceable. In some implementations, the power supply 4114 can include power-conversion and management circuits, including recharging, standby, and power management functionalities. In some implementations, the power-supply 4114 can include a power plug to allow the computer 4102 to be plugged into a wall socket or a power source to, for example, power the computer 4102 or recharge a rechargeable battery.

There can be any number of computers 4102 associated with, or external to, a computer system containing computer 4102, with each computer 4102 communicating over network 4130. Further, the terms "client," "user," and other appropriate terminology can be used interchangeably, as appropriate, without departing from the scope of the present disclosure. Moreover, the present disclosure contemplates that many users can use one computer 4102 and one user can use multiple computers 4102.

Described implementations of the subject matter can include one or more features, alone or in combination.

Example 1 is system for dehydrating and desalting oil, the system including a vessel containing a crude oil inlet for introducing crude oil into an interior space of the vessel; a fixed super-hydrophobic mesh subsystem including at least one fixed, unmovable super-hydrophobic mesh, the fixed super-hydrophobic mesh subsystem residing within the interior space of the vessel; an inductor cup set system secured above the fixed super-hydrophobic mesh subsystem, the inductor cup set including at plurality of inductor cups, each of the plurality of inductor cups including a primary coil and a secondary coil, the inductor cups to determine an amount of water in the crude oil based on a comparison of the induced voltage between the primary coil and the secondary coil; a movable super-hydrophobic mesh subsystem including a super-hydrophobic mesh coupled to at least one stepper motor, the stepper motor to rotate the mesh by a predefined angle of rotation based on the comparison of the induced voltage determined by the inductor cups, the movable super-hydrophobic mesh subsystem residing above the inductor cup set within the interior of the vessel; and a metal grid subsystem above the movable super-hydrophobic mesh subsystem within the interior of the vessel, the metal grid subsystem including at least one metal grid electrically coupled to a transformer residing outside of the vessel, the electrified grid to electrostatically dehydrate the crude oil.

Example 2 may include the subject matter of example, wherein the fixed super-hydrophobic mesh subsystem includes a plurality of fixed, unmovable super-hydrophobic meshes.

Example 3 may include the subject matter of any of examples 1-2, wherein the fixed, unmovable super-hydrophobic mesh includes super-hydrophobic mesh.

Example 4 may include the subject matter of any of examples 1-3, wherein the inductor cup set subsystem includes three parallel sets of inductor cups separated from each other by a fixed distance.

Example 5 may include the subject matter of any of examples 1-4, wherein the movable super-hydrophobic mesh subsystem maintains a rotational angle of the mesh when the induced voltage at the primary coil matches the induced voltage at the secondary coil.

Example 6 may include the subject matter of any of examples 1-5, wherein the movable super-hydrophobic mesh subsystem rotates the mesh when the comparison between the induced voltage at the primary coil and the secondary coil results in a different induced voltage between the primary coil and the secondary coil.

Example 7 may include the subject matter of any of examples 1-6, wherein the metal grid subsystem includes a left lower grid; a right lower grid; a left upper grid; and a right upper grid.

Example 8 may include the subject matter of example 7, wherein the left lower grid and the right lower grid are biased using an alternating current.

Example 9 may include the subject matter of example 7, wherein the left upper grid and the right upper grid are biased using a direct current.

Example 10 may include the subject matter of example 9, wherein the metal grid subsystem includes a first rectifier circuit coupled to the left upper grid and a second rectified circuit coupled to the right upper grid.

Example 11 may include the subject matter of example 7, wherein the transformer is a first transformer, and the right upper grid and the left lower grid are electrically connected to the first transformer.

Example 12 may include the subject matter of example 11, wherein the right lower grid and the left upper grid are electrically connected to a second transformer, different from the first transformer.

Example 13 may include the subject matter of any of examples 1-12, wherein the vessel includes a first interior chamber to house the fixed super-hydrophobic mesh subsystem, the inductor cup set system, the movable super-hydrophobic mesh, and the metal grid subsystem, the vessel including a second interior chamber in fluid isolation from the first interior chamber, wherein the metal grid is coupled to a first electrode in the first interior chamber; the first electrode is coupled to a second electrode residing within the second interior chamber, the second electrode isolated from fluids in the first interior chamber; the first electrode coupled to a power cable through an exterior wall of the vessel, the power cable connected to the transformer and to supply electricity to the metal grid.

Example 14 is a method that includes directing crude oil into an interior chamber of a vessel of a dehydrator and desalter system; performing a first liquid phase separation of water from the crude oil using a fixed super-hydrophobic mesh subsystem that includes at least one fixed super-hydrophobic mesh; determining a residual water content in the crude oil using one or more inductor cup sets; determining, based on the residual water content in the crude oil from the one or more inductor cup sets, whether to rotate a movable super-hydrophobic mesh for a second liquid phase separation process; performing the second liquid phase separation of water from the crude oil using the movable super-hydrophobic mesh; performing a first electrostatic dehydration process on the crude oil using a first set of electrified metal grids; performing a second electrostatic dehydration process on the crude oil using a second set of electrified metal grids; and causing the crude oil to exit the vessel.

Example 15 may include the subject matter of example 14, further including testing the crude oil for salt content using an auto salt analyzer circuit.

Example 16 may include the subject matter of example 15, including adding water wash to the crude oil if the salt content in the crude oil is above a threshold amount.

Example 17 may include the subject matter of any of examples 14-16, wherein the first set of electrified metal grids is biased using an alternating current.

Example 18 may include the subject matter of any of examples 14-17, wherein the second set of electrified metal grids is biased using a direct current.

Example 19 may include the subject matter of any of examples 14-18 further including rotating the movable super-hydrophobic mesh by a predetermined angle of rotation based on an induced voltage mismatch between a primary inductor coil and a secondary inductor coil for at least one set of inductor cups.

Example 20 may include the subject matter of any of examples 14-19, wherein the first set of electrified metal grids is biased using an alternating current; and the second set of electrified metal grids is biased using a direct current.

Example 21 is an automatic salt-in-crude analysis system including an electromagnetic circuit including: a magnetic element including a first side and a second side, the first side separated from the second side by an air gap; a first winding wound around the first side of the magnetic element, a voltage source connected across the first winding to apply a first voltage across the first winding, a second winding wound around the second side of the magnetic element, and a voltage detection element to detect a second voltage across the second winding, the second voltage induced in the second winding by the first voltage applied across the first winding; an inlet pipe to direct crude oil from an oil tank through the air gap in the electromagnetic circuit; and a programmable logic controller to while crude oil is present in the air gap, compare the second voltage and the first voltage, determine whether an amount of salt in the crude oil is greater than a threshold amount of salt based on the comparison of the second voltage and the first voltage; and based on a determination that the amount of salt is above the threshold amount of salt, control a water wash to dilute crude oil in the oil tank.

Example 22 may include the subject matter of example 21, wherein the threshold amount of salt includes 10 pounds per thousand (PTB) barrels of oil.

Example 23 may include the subject matter of any of examples 21-22, wherein, based on a determination that the amount of salt is below the threshold amount of salt, the programmable logic controller is to determine that the oil does not contain detectable quantities of salt.

Example 24 may include the subject matter of any of examples 21-23, wherein, based on a determination that the amount of salt is equal to the threshold amount of salt, the programmable logic controller is to determine that the amount of salt is within a maximum amount of salt in crude oil limit.

Example 25 may include the subject matter of any of examples 21-24, wherein the programmable logic controller is to determine whether an amount of salt in the crude oil is greater than a threshold amount of salt based on a value of the second voltage.

Example 26 may include the subject matter of example 5, wherein a second voltage value below 119.99672 volts indicates an amount of salt above 10 pounds per thousand barrels of crude oil.

Example 27 may include the subject matter of example 25, wherein a second voltage value above 119.99672 volts indicates an amount of salt in crude oil that is not detectable.

Example 28 may include the subject matter of example 25, wherein a second voltage value of 119.99672 volts indicates an amount of salt that is less than or equal to 10 pounds per thousand barrels of crude oil.

Example 29 may include the subject matter of any of examples 21-28, wherein the dielectric includes air.

Example 30 may include the subject matter of any of examples 21-29, wherein the programmable logic controller to determine that the amount of salt in the crude oil is greater than 10 pounds per thousand barrels (PTB) of crude oil based on a difference between the second voltage and the first voltage; and control the water wash to dilute the crude oil by a predetermined amount based on the amount of salt in the crude oil being greater than 10 PTB.

Example 31 is a method of determining salt in crude using an electromagnetic circuit including a magnetic element including a first side and a second side, the first side separated from the second side by an air gap, a first winding wound around the first side of the magnetic element, a voltage source connected across the first winding to apply a first voltage across the first winding, a second winding wound around the second side of the magnetic element, and a voltage detection element to detect a second voltage across the second winding, the second voltage induced in the second winding by the first voltage applied across the first winding, the method include controlling, by a programmable logic controller, an inlet valve to direct crude oil from a dehysalter system into the air gap of an electromagnetic circuit; measuring, by the programmable logic controller, the second voltage across the second winding; comparing, by the programmable logic controller, the second voltage with the first voltage; determining, by the programmable logic controller, whether an amount of salt in the crude oil is greater than a threshold amount of salt based on the comparison of the second voltage and the first voltage; and based on a determination that the amount of salt is above the threshold amount of salt, controlling, by the programmable logic controller, a water wash to dilute crude oil in the oil tank.

Example 32 may include the subject matter of example 31, wherein the threshold amount of salt includes 10 pounds per thousand (PTB) barrels of oil.

Example 33 may include the subject matter of any of examples 31-32, wherein, based on a determination that the amount of salt is below the threshold amount of salt, the programmable logic controller is to determine that the oil does not contain detectable quantities of salt.

Example 34 may include the subject matter of any of examples 31-33, wherein, based on a determination that the amount of salt is equal to the threshold amount of salt, the programmable logic controller is to determine that the amount of salt is within a maximum amount of salt in crude oil limit.

Example 35 may include the subject matter of any of examples 31-34, wherein the programmable logic controller is to determine whether an amount of salt in the crude oil is greater than a threshold amount of salt based on a value of the second voltage.

Example 36 may include the subject matter of example 35, wherein a second voltage value below 119.99672 volts indicates an amount of salt above 10 pounds per thousand barrels of crude oil.

Example 37 may include the subject matter of example 35, wherein a second voltage value above 119.99672 volts indicates an amount of salt in crude oil that is not detectable.

Example 38 may include the subject matter of example 35, wherein a second voltage value of 119.99672 volts indicates an amount of salt that is less than or equal to 10 pounds per thousand barrels of crude oil.

Example 39 may include the subject matter of any of examples 31-38, wherein the dielectric includes air.

Example 40 may include the subject matter of any of examples 31-39, wherein the programmable logic controller to determine that the amount of salt in the crude oil is greater than 10 pounds per thousand barrels (PTB) of crude oil based on a difference between the second voltage and the first voltage; and control the water wash to dilute the crude oil by a predetermined amount based on the amount of salt in the crude oil being greater than 10 PTB.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs.

The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random-access memory (RAM), read-only memory (ROM), phase change memory (PRAM), static random-access memory (SRAM), dynamic random-access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperable coupled with a hardware processor configured to perform the computer-implemented method or the instructions stored on the non-transitory, computer-readable medium.

What is claimed is:

1. A system for dehydrating and desalting oil, the system comprising:
   a vessel containing a crude oil inlet for introducing crude oil into an interior space of the vessel;
   a fixed super-hydrophobic mesh subsystem comprising at least one fixed, unmovable super-hydrophobic mesh, the fixed super-hydrophobic mesh subsystem residing within the interior space of the vessel;
   an inductor cup set system secured above the fixed super-hydrophobic mesh subsystem, the inductor cup set comprising at plurality of inductor cups, each of the plurality of inductor cups comprising a primary coil and a secondary coil, the inductor cups to determine an amount of water in the crude oil based on a comparison of an induced voltage between the primary coil and the secondary coil;
   a movable super-hydrophobic mesh subsystem comprising a super-hydrophobic mesh coupled to at least one stepper motor, the stepper motor to rotate the mesh by a predefined angle of rotation based on the comparison of the induced voltage determined by the inductor cups, the movable super-hydrophobic mesh subsystem residing above the inductor cup set within the interior of the vessel; and
   a metal grid subsystem above the movable super-hydrophobic mesh subsystem within the interior of the vessel, the metal grid subsystem comprising at least one metal grid electrically coupled to a transformer residing outside of the vessel, the metal grid to electrostatically dehydrate the crude oil during operation.

2. The system of claim 1, wherein the fixed super-hydrophobic mesh subsystem comprises a plurality of fixed, unmovable super-hydrophobic meshes.

3. The system of claim 1, wherein the inductor cup set subsystem comprises three parallel sets of inductor cups separated from each other by a fixed distance.

4. The system of claim 1, wherein the movable super-hydrophobic mesh subsystem maintains a rotational angle of the mesh when the induced voltage at the primary coil matches the induced voltage at the secondary coil.

5. The system of claim 1, wherein the movable super-hydrophobic mesh subsystem rotates the mesh when the comparison between the induced voltage at the primary coil and the secondary coil results in a different induced voltage between the primary coil and the secondary coil.

6. The system of claim 1, wherein the metal grid subsystem comprises:
   a left lower grid;
   a right lower grid;
   a left upper grid; and
   a right upper grid.

7. The system of claim 6, wherein the left lower grid and the right lower grid are biased using an alternating current.

8. The system of claim 6, wherein the left upper grid and the right upper grid are biased using a direct current.

9. The system of claim 8, wherein the metal grid subsystem comprises a first rectifier circuit coupled to the left upper grid and a second rectifier circuit coupled to the right upper grid.

10. The system of claim 6, wherein the transformer is a first transformer, and the right upper grid and the left lower grid are electrically connected to the first transformer.

11. The system of claim 10, wherein the right lower grid and the left upper grid are electrically connected to a second transformer, different from the first transformer.

12. The system of claim 1, wherein the vessel comprises a first interior chamber to house the fixed super-hydrophobic mesh subsystem, the inductor cup set system, the movable super-hydrophobic mesh, and the metal grid subsystem, the vessel comprising a second interior chamber in fluid isolation from the first interior chamber, wherein:
   the metal grid is coupled to a first electrode in the first interior chamber;
   the first electrode is coupled to a second electrode residing within the second interior chamber, the second electrode isolated from fluids in the first interior chamber;

the first electrode coupled to a power cable through an exterior wall of the vessel, the power cable connected to the transformer and to supply electricity to the metal grid.

* * * * *